United States Patent
Yeo et al.

(10) Patent No.: US 11,844,094 B2
(45) Date of Patent: Dec. 12, 2023

(54) METHOD AND APPARATUS TO TRANSMIT AND RECEIVE SIGNAL FOR GROUPCAST IN WIRELESS COMMUNICATION SYSTEM

(71) Applicant: Samsung Electronics Co., Ltd., Suwon-si (KR)

(72) Inventors: Jeongho Yeo, Suwon-si (KR); Taehyoung Kim, Suwon-si (KR); Hyunseok Ryu, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 17/394,855

(22) Filed: Aug. 5, 2021

(65) Prior Publication Data
US 2022/0046588 A1 Feb. 10, 2022

(30) Foreign Application Priority Data

Aug. 7, 2020 (KR) ........................ 10-2020-0099500
Jan. 15, 2021 (KR) ........................ 10-2021-0006335

(51) Int. Cl.
*H04W 72/30* (2023.01)
*H04W 48/16* (2009.01)
*H04W 4/06* (2009.01)
*H04W 72/23* (2023.01)

(52) U.S. Cl.
CPC ............. *H04W 72/30* (2023.01); *H04W 4/06* (2013.01); *H04W 48/16* (2013.01); *H04W 72/23* (2023.01)

(58) Field of Classification Search
CPC ..... H04W 72/005; H04W 4/06; H04W 48/16; H04W 72/042; H04W 48/12; H04W 72/0453; H04L 12/189; H04L 5/0055; H04L 5/001
See application file for complete search history.

(56) References Cited

U.S. PATENT DOCUMENTS

| 2018/0367386 | A1  | 12/2018 | Liao |
| 2019/0363843 | A1  | 11/2019 | Gordaychik |
| 2020/0106566 | A1  | 4/2020  | Yeo et al. |
| 2021/0127359 | A1* | 4/2021  | Takeda ................. H04L 5/0092 |

FOREIGN PATENT DOCUMENTS

| KR | 10-2020-0036717 A    |   | 4/2020  |            |
| WO | 2020/033089 A1       |   | 2/2020  |            |
| WO | WO-2021231835 A1     | * | 11/2021 | .......... H04W 72/005 |

OTHER PUBLICATIONS

ITL, 3GPP TSG-RAN WG2 Meeting #103bis, R2-1815510, Considerations On Resource Pool in NR Sidelink for V2X, Chengdu, China, Oct. 8-12, 2018.
International Search Report dated Nov. 4, 2021, issued in International Application No. PCT/KR2021/010357.

* cited by examiner

*Primary Examiner* — Charles C Jiang
*Assistant Examiner* — Shawn D Miller
(74) *Attorney, Agent, or Firm* — Jefferson IP Law, LLP

(57) ABSTRACT

The disclosure relates to a 5G or 6G communication system for supporting higher data transmission rates than 4G communication systems such as LTE systems. A method performed by a base station in a wireless communication system is provided. The method includes generating a signal including configuration information for at least one bandwidth part (BWP) and transmitting the generated signal. At least part of the at least one BWP may be configured as a resource for multicast.

12 Claims, 15 Drawing Sheets

METHOD AND APPARATUS TO TRANSMIT AND RECEIVE SIGNAL FOR GROUPCAST IN WIRELESS COMMUNICATION SYSTEM

CROSS-REFERENCE TO RELATED APPLICATION(S)

This application is based on and claims priority under 35 U.S.C. § 119(a) of a Korean patent application number 10-2020-0099500, filed on Aug. 7, 2020, in the Korean Intellectual Property Office, and of a Korean patent application number 10-2021-0006335, filed on Jan. 15, 2021, in the Korean Intellectual Property Office, the disclosure of each of which is incorporated by reference herein in its entirety.

BACKGROUND

1. Field

The disclosure relates to wireless communication systems. More particularly, the disclosure relates to methods and devices for transmitting/receiving signals for groupcast and/or multicast.

2. Description of Related Art

Wireless communication technologies have been developed mainly for human services, such as voice, multimedia, and data communication. As 5th-generation (5G) communication systems are commercially available, connected devices are expected to explosively increase and to be connected to a communication network. Examples of things connected to a network may include vehicles, robots, drones, home appliances, displays, smart sensors installed in various infrastructures, construction machinery, and factory equipment. Mobile devices will evolve into various form factors, such as augmented reality glasses, virtual reality headsets, and hologram devices. In the 6th-generation (6G) era, efforts are being made to develop an enhanced 6G communication system to provide various services by connecting hundreds of billions of devices and things. For this reason, the 6G communication system is called a beyond 5G system.

In the 6G communication system expected to be realized around year 2030, the maximum transmission rate is tera (i.e., 1000 gigabit) bps, and the wireless latency is 100 microseconds (μsec). In other words, the transmission rate of the 6G communication system is 50 times faster than that of the 5G communication system, and the wireless latency is reduced to one tenth.

To achieve these high data rates and ultra-low latency, 6G communication systems are considered to be implemented in terahertz bands (e.g., 95 gigahertz (95 GHz) to 3 terahertz (3 THz) bands). As the path loss and atmospheric absorption issues worsen in the terahertz band as compared with millimeter wave (mmWave) introduced in 5G, technology that may guarantee signal reach, that is, coverage, would become more important. As major techniques for ensuring coverage, there need to be developed multi-antenna transmission techniques, such as new waveform, beamforming, massive multiple-input and multiple-output (MIMO), full dimensional MIMO (FD-MIMO), array antennas, or large-scale antennas, which exhibit better coverage characteristics than radio frequency (RF) devices and orthogonal frequency division multiplexing (OFDM). New technologies, such as a metamaterial-based lens and antennas, high-dimensional spatial multiplexing technology using an orbital angular momentum (OAM), and a reconfigurable intelligent surface (RIS), are being discussed to enhance the coverage of the terahertz band signals.

For 6G communication systems to enhance frequency efficiency and system network for 6G communication systems include full-duplex technology, there are being developed full-duplex technology in which uplink and downlink simultaneously utilize the same frequency resource at the same time, network technology that comprehensively use satellite and high-altitude platform stations (HAPSs), network architecture innovation technology that enables optimization and automation of network operation and supports mobile base stations, dynamic spectrum sharing technology through collision avoidance based on prediction of spectrum usages, artificial intelligence (AI)-based communication technology that uses AI from the stage of designing and internalizes end-to-end AI supporting function to thereby optimize the system, and next-generation distributed computing technology that realizes services that exceed the limitation of the UE computation capability by ultra-high performance communication and mobile edge computing (MEC) or clouds. Further, continuous attempts have been made to reinforce connectivity between device, further optimizing the network, prompting implementation of network entities in software, and increase the openness of wireless communication by the design of a new protocol to be used in 6G communication systems, implementation of a hardware-based security environment, development of a mechanism for safely using data, and development of technology for maintaining privacy.

Such research and development efforts for 6G communication systems would implement the next hyper-connected experience via hyper-connectivity of 6G communication systems which encompass human-thing connections as well as thing-to-thing connections. Specifically, the 6G communication system would be able to provide services, such as truly immersive extended reality (XR), high-fidelity mobile hologram, and digital replica. Further, services, such as remote surgery, industrial automation and emergency response would be provided through the 6G communication system thanks to enhanced security and reliability and would have various applications in medical, auto, or home appliance industries.

The above information is presented as background information only to assist with an understanding of the disclosure. No determination has been made, and no assertion is made, as to whether any of the above might be applicable as prior art with regard to the disclosure.

SUMMARY

In a wireless communication system, a base station may provide a groupcast service and/or a multicast service by transmitting the same data to several UEs. In this case, if a groupcast service and/or a multicast service is provided to each UE through separate data transmission/reception, inefficiency of frequency resources and time resources may result.

Aspects of the disclosure are to address at least the above-mentioned problems and/or disadvantages and to provide at least the advantages described below Accordingly, an aspect of the disclosure is to provide a method and device for efficiently performing data transmission/reception to provide a groupcast service and/or a multicast service.

Another aspect of the disclosure is to provide a method and device for transmitting and receiving signals for groupcast and/or multicast in a wireless communication system.

Another aspect of the disclosure is to provide a method and device for configuring and operating a bandwidth part for groupcast and/or multicast in a wireless communication system.

Another aspect of the disclosure is to provide a method and device for transmitting and receiving control information and data for groupcast and/or multicast in a wireless communication system.

Another aspect of the disclosure is to provide a method and device for transmitting and receiving signals for groupcast and/or multicast considering carrier aggregation in a wireless communication system.

Another aspect of the disclosure is to provide a method and device for transmitting and receiving signals for groupcast and/or multicast in a wireless communication system.

Another aspect of the disclosure is to provide a method and device for configuring and operating a bandwidth part for groupcast and/or multicast in a wireless communication system.

Another aspect of the disclosure is to provide a method and device for transmitting and receiving control information and data for groupcast and/or multicast in a wireless communication system.

Another aspect of the disclosure is to provide a method and device for transmitting and receiving signals for groupcast and/or multicast considering carrier aggregation in a wireless communication system.

Additional aspects will be set forth in part in the description which follows and, in part, will be apparent from the description, or may be learned by practice of the presented embodiments.

In accordance with an aspect of the disclosure, a method performed by a base station in a wireless communication system is provided. The method includes generating a signal including configuration information for at least one bandwidth part (BWP) and transmitting the generated signal. At least part of the at least one BWP may be configured as a resource for multicast.

In accordance with another aspect of the disclosure, a method performed by a terminal in a wireless communication system is provided. The method includes receiving a signal including configuration information for at least one bandwidth part (BWP), identifying the at least one BWP based on the configuration information, and receiving a multicast signal via at least part of the at least one BWP.

In accordance with another aspect of the disclosure, a base station in a wireless communication system is provided. The base station includes a transceiver and at least one processor. The at least one processor may be configured to generate a signal including configuration information for at least one bandwidth part (BWP) and transmit the generated signal via the transceiver. At least part of the at least one BWP may be configured as a resource for multicast.

In accordance with another aspect of the disclosure, a terminal in a wireless communication system is provided. The terminal includes a transceiver and at least one processor. The at least one processor may be configured to receive, via the transceiver, a signal including configuration information for at least one bandwidth part (BWP), identify the at least one BWP based on the configuration information, and receive, via the transceiver, a multicast signal via at least part of the at least one BWP.

In accordance with another aspect of the disclosure, a method performed by a transmitter is provided. The method includes generating a signal including configuration information for groupcast and transmitting the signal including the configuration information for groupcast. The configuration information for groupcast includes information for a bandwidth part (BWP) for groupcast. The BWP for groupcast includes an initial BWP or a BWP different from the initial BWP.

In accordance with another aspect of the disclosure, a method performed by a receiver is provided. The method includes receiving a signal from a transmitter and identifying configuration information for groupcast from the signal. The configuration information for groupcast includes information for a bandwidth part (BWP) for groupcast. The BWP for groupcast includes an initial BWP or a BWP different from the initial BWP.

In accordance with another aspect of the disclosure, a transmitter is provided. The transmitter includes a transceiver configured to transmit and receive a signal and a processor configured to generate a signal including configuration information for groupcast and transmit, through the transceiver, the signal including the configuration information for groupcast. The configuration information for groupcast includes information for a bandwidth part (BWP) for groupcast. The BWP for groupcast includes an initial BWP or a BWP different from the initial BWP.

In accordance with another aspect of the disclosure, a receiver in a wireless communication system is provided. The receiver includes a transceiver configured to receive a signal from a transmitter and a processor configured to identify configuration information for groupcast from the signal. The configuration information for groupcast includes information for a bandwidth part (BWP) for groupcast. The BWP for groupcast includes an initial BWP or a BWP different from the initial BWP.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
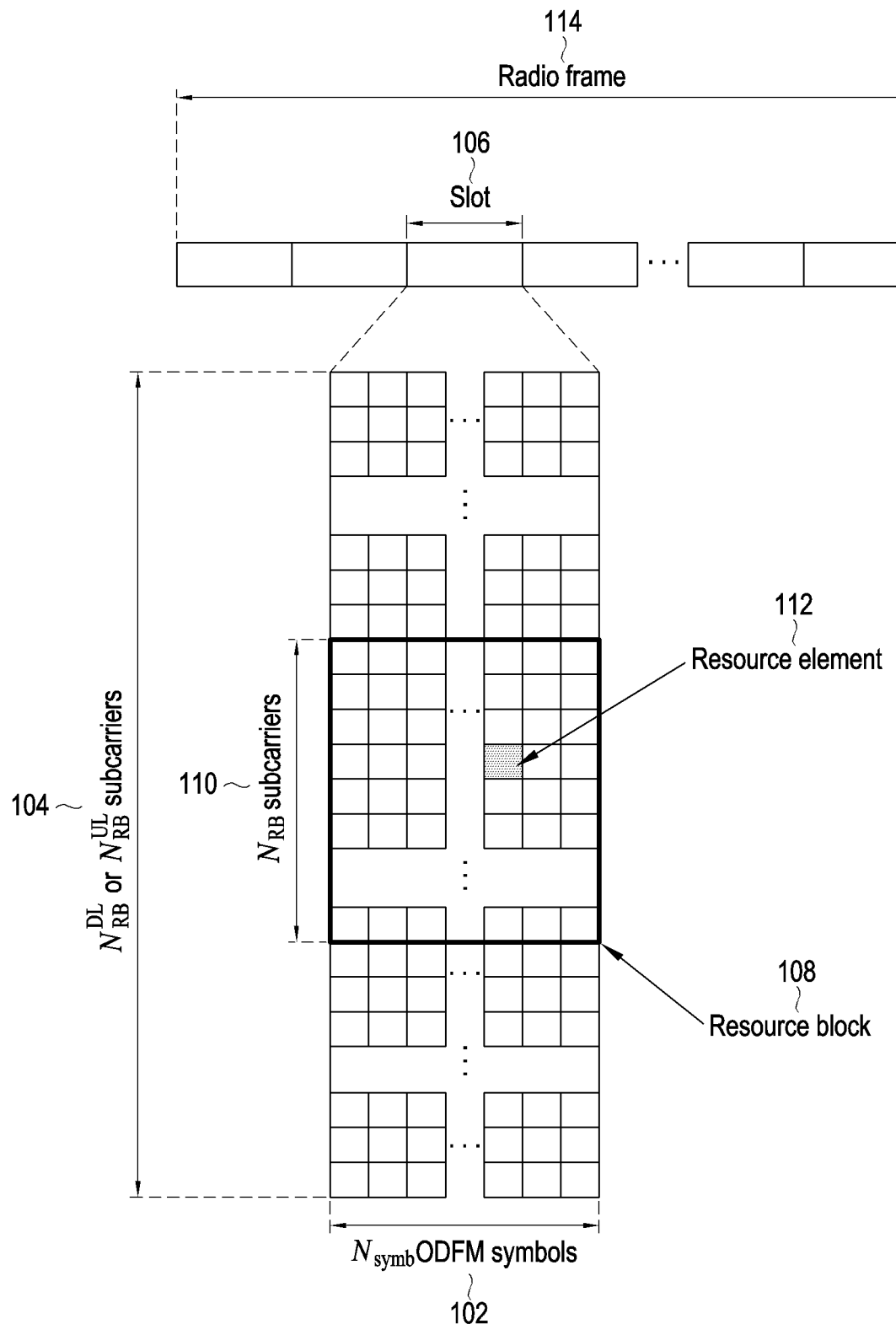
FIG. 1 is a view illustrating a downlink or uplink time-frequency domain transmission structure of a 5G (or new radio (NR)) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

New radio (NR) access technology, a new 5G communication technology, is designed to be able to freely multiplex various services in time and frequency resources and, accordingly, waveforms/numerology and reference signals may be allocated dynamically or freely as necessary in services. To provide an optimal service to a terminal (e.g., a user equipment (UE)) in wireless communication, it is critical to provide data transmission optimized via measurement of interference and the quality of channel, and thus, accurate measurement of the channel state is essential. However, unlike 4G communication in which no significant change occurs in channel and interference characteristics depending on frequency resources, 5G channels experience drastic changes in channel and interference characteristics depending on services and thus need support of a subset in light of frequency resource group (FRG) that allows them to be divided and measured. Meanwhile, types of services supported in the NR system may be divided into categories, such as enhanced mobile broadband (eMBB), massive machine type communications (mMTC), and ultra-reliable and low-latency communications (URLLC). eMBB, mMTC, and URLLC are services targeting high-rate transmission of high-volume data, minimized UE power consumption and access by multiple UEs, and high reliability and low latency, respectively. Different requirements may be applied depending on types of services applied to the UE.

As such, a plurality of services may be provided to users in the communication system and, to that end, there are required a method for providing the services in the same time interval according to characteristics and a device using the method.

Hereinafter, embodiments of the disclosure are described in detail with reference to the accompanying drawings.

In describing the embodiments, the description of technologies that are known in the art and are not directly related to the disclosure is omitted. This is for further clarifying the gist of the disclosure without making it unclear.

For the same reasons, some elements may be exaggerated or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart.

Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more CPUs in a device or a security multimedia card. According to embodiments of the disclosure, a " . . . unit" may include one or more processors.

Wireless communication systems evolve beyond voice-centered services to broadband wireless communication systems to provide high data rate and high-quality packet data services, such as 3rd generation partnership project (3GPP) high speed packet access (HSPA), long term evolution (LTE) or evolved universal terrestrial radio access (E-UTRA)), LTE-advanced (LTE-A), 3GPP2 high rate packet data (HRPD), ultra-mobile broadband (UMB), and institute of electrical and electronics engineers (IEEE) 802.16e communication standards. Further, for fifth generation (5G) wireless communication systems, 5G or new radio (NR) communication is being standardized.

As a representative broadband wireless communication system, the NR system adopts orthogonal frequency division multiplexing (OFDM) for downlink (DL) and uplink (UL). More specifically, the NR system employs cyclic-prefix OFDM (CP-OFDM) for downlink and two schemes, i.e., CP-OFDM and discrete Fourier transform spreading OFDM (DFT-S-OFDM) for uplink. Uplink means a wireless link where a terminal (e.g., a UE or a mobile station (MS)) transmits data or control signals to the base station (BS, or eNode B), and download means a wireless link where the base station transmits data or control signals to the terminal. Such multiple access scheme allocates and operates time-frequency resources carrying data or control information per user not to overlap, i.e., to maintain orthogonality, to thereby differentiate each user's data or control information. Hereinafter, it will be noted that the term "terminal" will be interchangeable with the term "UE" or "MS".

The NR system adopts hybrid automatic repeat request (HARQ) scheme that re-transmits corresponding data through the physical layer in case decoding fails at the initial stage of transmission. By the HARQ scheme, if the receiver fails to precisely decode data, the receiver transmits information (negative acknowledgement (NACK)) indicating the decoding failure to the transmitter so that the transmitter may re-transmit the corresponding data through the physical layer. The receiver raises the data reception capability by combining the data re-transmitted by the transmitter with the data for which decoding has failed before. Further, in case the receiver precisely decode data, the receiver may transmit information (acknowledgment (ACK)) indicating decoding succeeds to the transmitter so that the transmitter may transmit new data.

FIG. 1 is a view illustrating a basic structure of time-frequency domain which is radio resource domain where the data or control channel is transmitted on downlink or uplink in the NR system according to an embodiment of the disclosure.

Referring to FIG. 1, the horizontal axis refers to the time domain, and the vertical axis refers to the frequency domain. The minimum transmission unit in the time domain is the OFDM symbol, and $N_{symb}$ (102) OFDM symbols together form one slot 106. The length of the subframe is defined as 1.0 ms, and the radio frame 114 is defined as 10 ms. In the frequency domain, the minimum transmission unit is subcarrier, and the bandwidth of the overall system transmission band consists of a total of $N_{BW}$ (104) subcarriers. One frame may be defined as 10 ms. One subframe may be defined as 1 ms, and thus, one frame may consist of a total of 10 subframes. One slot may be defined as 14 OFDM symbols (that is, the number ($N_{symb}^{slot}$) of symbols per slot=14). One subframe may be composed of one or more slots, and the number of the slots included in one subframe may vary according to μ which is a value set for subcarrier spacing.

Figure 2:
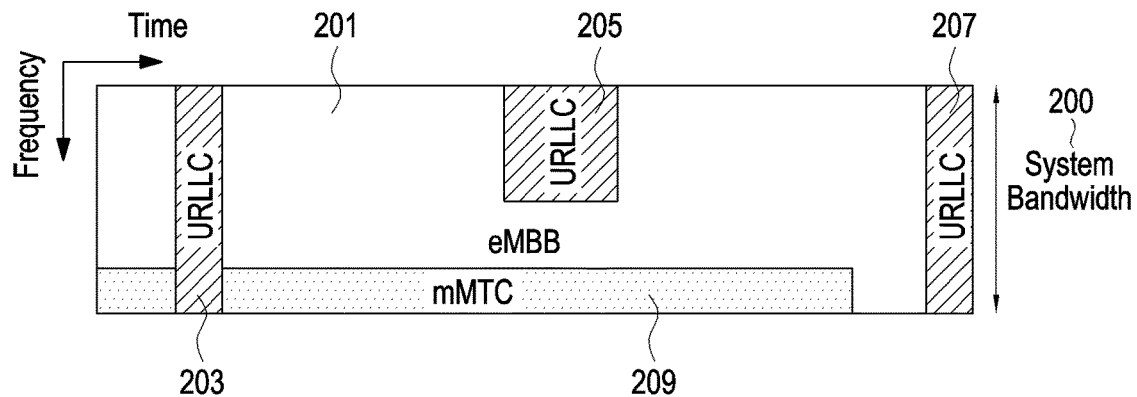
FIG. 2 is a view illustrating an example in which eMBB, URLLC, and mMTC data are allocated in frequency-time resources in a communication system according to an embodiment of the disclosure.

FIG. 2 illustrates an example in which the subcarrier spacing is set to μ=0 (204) and an example in which the subcarrier spacing is set to μ=1 according to an embodiment of the disclosure. When μ=0, one subframe may consist of one slot, and when μ=1, one subframe may consist of two slots. In other words, according to the set subcarrier spacing value μ, the number ($N_{slot}^{subframe,\mu}$) of slots per subframe may vary, and accordingly, the number ($N_{slot}^{frame,\mu}$) of slots per frame may differ. According to each subcarrier spacing μ, $N_{slot}^{subframe,\mu}$ and may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Before radio resource control (RRC) connected, the UE may be configured with an initial bandwidth part (BWP) for initial access by the base station via a master information block (MIB). More specifically, the UE may receive configuration information for a search space and control resource set (CORESET) in which physical downlink control channel (PDCCH) may be transmitted to receive system information (remaining system information, RMSI or system information block 1 which may correspond to SIB1) necessary for initial access through the MIB in the initial access phase. Each of the control region and search space configured with the MIB may be regarded as identity (ID) 0. The base station may provide the UE with configuration information, such as frequency allocation information, time allocation information, and numerology for control region #0, via the MIB. Further, the base station may provide the UE with configuration information for occasion and monitoring period for control region #0, i.e., configuration information for search space #0, via the MIB. The UE may regard the frequency range set as control region #0 obtained from the MIB, as the initial BWP for initial access. In this case, the identity (ID) of the initial BWP may be regarded as 0.

The MIB may include contain the following information.

```
<MIB>
-- ASN1START
-- TAG-MIB-START
MIB ::=                    SEQUENCE {
  systemFrameNumber          BIT STRING (SIZE (6)),
  subCarrierSpacingCommon       ENUMERATED {scs15or60, scs30or120},
  ssb-SubcarrierOffset        INTEGER (0..15),
  dmrs-TypeA-Position         ENUMERATED {pos2, pos3},
  pdcch-ConfigSIB1            ,
  cellBarred                ENUMERATED {barred, notBarred},
  intraFreqReselection          ENUMERATED {allowed, notAllowed},
  spare                 BIT STRING (SIZE (1))
}
-- TAG-MIB-STOP
-- ASN1STOP
```
MIB field descriptions
  cellBarred
    Value barred means that the cell is barred, as defined in TS 38.304 [20].
  dmrs-TypeA-Position
    Position of (first) DM-RS for downlink (see TS 38.211 [16], clause 7.4.1.1.2)
      and uplink (see TS 38.211 [16], clause 6.4.1.1.3).
  intraFreqReselection
    Controls cell selection/reselection to intra-frequency cells when the highest
      ranked cell is barred, or treated as barred by the UE, as specified in TS
      38.304 [20].
  pdcch-ConfigSIB1
    Determines a common ControlResourceSet (CORESET), a common search
      space and necessary PDCCH parameters. If the field ssb-SubcarrierOffset
      indicates that SIB1 is absent, the field pdcch-ConfigSIB1 indicates the
      frequency positions where the UE may find SS/PBCH block with SIB1 or
      the frequency range where the network does not provide SS/PBCH block
      with SIB1 (see TS 38.213 [13], clause 13).
  ssb-SubcarrierOffset
    Corresponds to kSSB (see TS 38.213 [13]), which is the frequency domain
      offset between SSB and the overall resource block grid in number of
      subcarriers. (See TS 38.211 [16], clause 7.4.3.1).
    The value range of this field may be extended by an additional most
      significant bit encoded within PBCH as specified in TS 38.213 [13].
    This field may indicate that this cell does not provide SIB1 and that there is
      hence no CORESET#0 configured in MIB (see TS 38.213 [13], clause 13).
      In this case, the field pdcch-ConfigSIB1 may indicate the frequency
      positions where the UE may (not) find a SS/PBCH with a control resource
      set and search space for SIB1 (see TS 38.213 [13], clause 13).
  subCarrierSpacingCommon
    Subcarrier spacing for SIB1, Msg.2/4 for initial access, paging and broadcast
      SI-messages. If the UE acquires this MIB on an FR1 carrier frequency, the
      value scs15or60 corresponds to 15 kHz and the value scs30or120
      corresponds to 30 kHz. If the UE acquires this MIB on an FR2 carrier
      frequency, the value scs15or60 corresponds to 60 kHz and the value
      scs30or120 corresponds to 120 kHz.
  systemFrameNumber
    The 6 most significant bits (MSB) of the 10-bit System Frame Number (SFN).
      The 4 LSB of the SFN are conveyed in the PBCH transport block as part of
      channel coding (i.e. outside the MIB encoding), as defined in clause 7.1 in
      TS 38.212 [17].

In a method for configuring a bandwidth part, UEs before RRC connected may receive configuration information for the initial BWP via MIB in the initial access phase. Specifically, the UE may be configured with a control region for a downlink control channel where downlink control information (DCI) for scheduling SIB may be transmitted from the MIB of the physical broadcast channel (PBCH). In this case, the bandwidth of the configured by the MIB may be regarded as the initial BWP, and the UE may receive the physical downlink shared channel (PDSCH), which transmits the SIB, via the configured initial BWP. The initial BWP may be utilized for other system information (OSI), paging, and random access as well as for receiving SIB.

If the UE is configured with one or more BWPs, the base station may indicate, to the UE, a change in BWP using the BWP indicator in the DCI.

The basic resource units in the time-frequency domains are the resource elements (REs) 112 (RE), and may be represented with the OFDM symbol index and the subcarrier index. The resource block (RB) 108 or physical resource block (PRB) is defined as $N_{symb}$ 102 contiguous OFDM symbols in the time domain and $N_{RB}$ subcarriers 110 in the frequency domain. Generally, the minimum transmission unit of data is the RB. Generally, in the NR system, $N_{symb}=14$, $N_{RB}=12$, and, $N_{BW}$ is proportional to the bandwidth of system transmission band. Data rate may increase in proportion to the number of RBs scheduled for the UE.

In the NR system, in the case of frequency division duplex (FDD) system in which downlink and uplink are distinguished with frequencies, the downlink transmission bandwidth and the uplink transmission bandwidth may differ from each other. The channel bandwidth refers to an RF bandwidth corresponding to the system transmission bandwidth. Tables 2 and 3 show some system transmission bandwidths and the relationship between subcarrier spacing and channel bandwidth defined in NR system, for frequency bands lower than 6 GHz and frequency bands higher than 6 GHz, respectively. For example, in an NR system with a channel bandwidth of 100 MHz and a subcarrier spacing of 30 kHz, the transmission bandwidth is composed of 273 RBs. In the following, N/A may be a bandwidth-subcarrier combination not supported by the NR system.

TABLE 2

Configuration of frequency range 1 (FR1)

| SCS (kHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 80 MHz NRB | 90 MHz NRB | 100 MHz NRB |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

TABLE 3

Configuration of frequency range 2 (FR2)

| Channel bandwidth BWChannel [MHz] | subcarrier spacing | 50 MHz | 100 MHz | 200 MHz | 400 MHz |
|---|---|---|---|---|---|
| Transmission bandwidth configuration NRB | 60 kHz | 66 | 132 | 264 | N/A |
| | 120 kHz | 32 | 66 | 132 | 264 |

In the NR system, the frequency range may be defined separately for FR1 and FR2 as in Table 4 below.

TABLE 4

| Frequency range designation | Corresponding frequency range |
|---|---|
| FR1 | 450 MHz-7125 MHz |
| FR2 | 24250 MHz-52600 MHz |

In the above, the ranges of FR1 and FR2 may be changed and applied. For example, the frequency range of FR1 may be changed from 450 MHz up to 6000 MHz.

Next, the synchronization signal (SS)/PBCH block in 5G is described.

The SS/PBCH block may mean a physical layer channel block composed of primary SS (PSS), secondary SS (SSS), and PBCH. Details are as follows.

PSS: A signal that serves as a reference for downlink time/frequency synchronization and provides part of the information for cell ID SSS: serves as a reference for downlink time/frequency synchronization, and provides the rest of the information for cell ID, which PSS does not provide. Additionally, it may serve as a reference signal for demodulation of PBCH.

PBCH: provides essential system information necessary for the UE to transmit and receive data channel and control channel. The essential system information may include search space-related control information indicating radio resource mapping information for a control channel and scheduling control information for a separate data channel for transmitting system information.

SS/PBCH block and SS/PBCH block are composed of a combination of PSS, SSS, and PBCH. One or more SS/PBCH blocks may be transmitted within 5 ms, and each transmitted SS/PBCH block may be distinguished with an index.

The UE may detect the PSS and SSS in the initial access phase and may decode the PBCH. The UE may obtain the MIB from the PBCH and may be therefrom configured with control region #0 (which may correspond to a control region having a control region index of 0). The UE may perform monitoring on control region #0, assuming that the selected SS/PBCH block and the demodulation reference signal (DMRS) transmitted in control region #0 are quasi-co-located (QCLed). The UE may receive system information as downlink control information transmitted in control region #0. The UE may obtain configuration information related to random access channel (RACH) required for initial access from the received system information. The UE may transmit the physical RACH (PRACH) to the base station considering the selected SS/PBCH index, and the base station receiving the PRACH may obtain information for the SS/PBCH block index selected by the UE. Through this process, the base station may know which block the UE has selected from the SS/PBCH blocks and monitors control region #0 related thereto.

Next, downlink control information (DCI) in the 5G system is described in detail.

Scheduling information for uplink data (or physical uplink shared channel (PUSCH) or downlink data (or physical downlink data channel (PDSCH) in the 5G system is transmitted from the base station through DCI to the UE. The UE may monitor the DCI format for fallback and the DCI format for non-fallback for PUSCH or PDSCH. The fallback DCI format may be composed of fixed fields predetermined between the base station and the UE, and the non-fallback DCI format may include configurable fields. The DCI may include other various formats and, it may be known whether the DCI is one for power control or one for slot format indicator (SFI) depending on the format.

DCI may be transmitted through the PDCCH, which is a physical downlink control channel, via channel coding and modulation. A cyclic redundancy check (CRC) is added to the DCI message payload, and the CRC is scrambled with the radio network temporary identifier (RNTI) that is the identity of the UE. Different RNTIs may be used for the purposes of the DCI message, e.g., UE-specific data transmission, power control command, or random access response. In other words, the RNTI is not explicitly transmitted, but the RNTI is included in the CRC calculation process and transmitted. Upon receiving the DCI message transmitted on the PDCCH, the UE identifies the CRC using the allocated RNTI, and when the CRC is correct, the UE may be aware that the message has been transmitted to the UE. The PDCCH is mapped and transmitted in a control resource set (CORESET) configured in the UE.

For example, DCI scheduling a PDSCH for system information (SI) may be scrambled to SI-RNTI. DCI scheduling a PDSCH for a random access response (RAR) message may be scrambled to RA-RNTI. DCI scheduling a PDSCH for a paging message may be scrambled with P-RNTI. DCI providing a slot format indicator (SFI) may be scrambled to SFI-RNTI. DCI providing transmit power control (TPC) may be scrambled to TPC-RNTI. DCI for scheduling a UE-specific PDSCH or PUSCH may be scrambled with cell RNTI (C-RNTI). The scramble of the RNTI value to the DCI may mean that the RNTI value is added to the CRC bit added to the DCI by an XOR operation (0+0=0, 1+0=1, 1+1=0). Here, the XOR operation may be a modulo-2 operation. If the number of bits of CRC of DCI is different from the number of bits of RNTI, an operation may be performed with the LSB or MSB of the one with more bits. For example, when the CRC of DCI has 24 bits and the RNTI has 16 bits, the RNTI may be scrambled to the LSB 16 bits of the CRC.

DCI format 0_0 may be used as fallback DCI for scheduling PUSCH, and in this case, CRC may be scrambled to C-RNTI. DCI format 0_0 in which CRC is scrambled to C-RNTI may include, e.g., the following information.

TABLE 5

Identifier for DCI formats - [1] bit
Frequency domain resource assignment -
$\lceil \log_2 (N_{RB}^{ULBWP}(N_{RB}^{ULBWP} + 1)/2) \rceil$ bits
Time domain resource assignment - X bits
Frequency hopping flag - 1 bit.
Modulation and coding scheme - 5 bits
New data indicator - 1 bit
Redundancy version - 2 bits
HARQ process number - 4 bits
TPC command for scheduled PUSCH - [2] bits
UL/ supplementary UL (SUL) indicator - 0 or 1 bit DCI format 0_1 may be used as non-fallback DCI for scheduling PUSCH, and in this case, CRC may be scrambled to C-RNTI. DCI format 0_1 in which CRC is scrambled to C-RNTI may include, e.g., the following information.

TABLE 6

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
For resource allocation type 0, $\lceil N_{RB}^{UL,BWP}/P \rceil$ bits
For resource allocation type 1, $\lceil \log_2(N_{RB}^{UL,BWP}(N_{RB}^{UL,BWP} + 1)/2 \rceil$ bits TABLE 6-continued Time domain resource assignment - 1, 2, 3, or 4 bits
Virtual resource block (VRB)-to- physical resource block (PRB) mapping - 0 or 1 bit, only for resource allocation type 1.
0 bit if only resource allocation type 0 is configured;
1 bit otherwise.
Frequency hopping flag - 0 or 1 bit, only for resource allocation type 1.
0 bit if only resource allocation type 0 is configured;
1 bit otherwise.
Modulation and coding scheme - 5 bits
New data indicator - 1 bit
Redundancy version - 2 bits
HARQ process number - 4 bits
1st downlink assignment index - 1 or 2 bits
1 bit for semi-static HARQ-ACK codebook;
2 bits for dynamic HARQ-ACK codebook with single HARQ-ACK codebook.
2nd downlink assignment index - 0 or 2 bits
2 bits for dynamic HARQ-ACK codebook with two HARQ-ACK sub-codebooks;
0 bit otherwise.
TPC command for scheduled PUSCH - 2 bits
SRS resource indicator - $\left\lceil \log_2\left(\sum_{k=1}^{L_{max}} \binom{N_{SRS}}{k}\right) \right\rceil$ or $\lceil \log_2 (N_{SRS}) \rceil$ bits $\left\lceil \log_2\left(\sum_{k=1}^{L_{max}} \binom{N_{SRS}}{k}\right) \right\rceil$ bits for non-codebook based PUSCH transmission;
$\lceil \log_2 (N_{SRS}) \rceil$ bits for codebook based PUSCH transmission.
Precoding information and number of layers - up to 6 bits
Antenna ports - up to 5 bits
SRS request - 2 bits
CSI request - 0, 1, 2, 3, 4, 5, or 6 bits
code block group (CBG) transmission information - 0, 2, 4, 6, or 8 bits
Physical tracking reference signal (PTRS)-demodulation reference signal (DMRS) association - 0 or 2 bits.
beta offset indicator - 0 or 2 bits
DMRS sequence initialization - 0 or 1 bit DCI format 1_0 may be used as fallback DCI for scheduling PDSCH, and in this case, CRC may be scrambled to C-RNTI. DCI format 1_0 in which CRC is scrambled to C-RNTI may include, e.g., the following information.

TABLE 7

Identifier for DCI formats - [1] bit
Frequency domain resource assignment -
$\lceil \log_2 (N_{RB}^{DLBWP}(N_{RB}^{DLBWP} + 1)/2) \rceil$ bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
Physical uplink control channel (PUCCH) resource indicator - 3 bits
PDSCH-to-HARQ feedback timing indicator - [3] bits DCI format 1_1 may be used as non-fallback DCI for scheduling PDSCH, and in this case, CRC may be scrambled to C-RNTI. DCI format 1_1 in which CRC is scrambled to C-RNTI may include, e.g., the following information.

TABLE 8

Carrier indicator - 0 or 3 bits
Identifier for DCI formats - [1] bits
Bandwidth part indicator - 0, 1 or 2 bits
Frequency domain resource assignment
For resource allocation type 0, $\lceil (N_{RB}^{DLBWP}/P) \rceil$ bits
For resource allocation type 1, $\lceil \log_2 (N_{RB}^{DLBWP}(N_{RB}^{DLBWP} + 1)/2) \rceil$ bits
Time domain resource assignment - 1, 2, 3, or 4 bits
VRB-to-PRB mapping - 0 or 1 bit, only for resource allocation type 1.
0 bit if only resource allocation type 0 is configured;
1 bit otherwise.
PRB bundling size indicator - 0 or 1 bit
Rate matching indicator - 0, 1, or 2 bits
Zero power channel state information reference signal (ZP CSI-RS) trigger - 0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits TABLE 8-continued Transmission configuration indication - 0 or 3 bits
SRS request - 2 bits
Code block group (CBG) transmission information - 0, 2, 4, 6, or 8 bits
CBG flushing out information - 0 or 1 bit
DMRS sequence initialization - 1 bit Hereinafter, a method for allocating time domain resources for a data channel in a 5G communication system is described.

The base station may configure the UE with a table for time domain resource allocation information for a downlink data channel (PDSCH) and an uplink data channel (PUSCH) via higher layer signaling (e.g., RRC signaling). For PDSCH, a table including up to maxNrofDL-Allocations=16 entries may be configured and, for PUSCH, a table including up to maxNrofUL-Allocations=16 entries may be configured. The time domain resource allocation information may include, e.g., PDCCH-to-PDSCH slot timing (which is designated K0 and corresponds to the time interval between the time of reception of the PDCCH and the time of transmission of the PDSCH scheduled by the received PDCCH) or PDCCH-to-PUSCH slot timing (which is designated K2 and corresponds to the time interval between the time of PDCCH and the time of transmission of the PUSCH scheduled by the received PDCCH), information for the position and length of the start symbol where the PDSCH or PUSCH is scheduled in the slot, and the mapping type of PDSCH or PUSCH. For example, information as illustrated in Tables 9 and 10 below may be provided from the base station to the UE.

TABLE 9

PDSCH-TimeDomainResourceAllocationList information element
PDSCH-TimeDomainResourceAllocationList ::=                    SEQUENCE
(SIZE(1..maxNrofDL-Allocations)) OF PDSCH-TimeDomainResourceAllocation
PDSCH-TimeDomainResourceAllocation ::= SEQUENCE {
  k0                         INTEGER(0..32)                       OPTIONAL,
-- Need S
  (PDCCH-to-PDSCH timing, slot unit)
    mappingType              ENUMERATED {typeA, typeB},
  (PDSCH mapping type)
    startSymbolAndLength     INTEGER (0..127)
    (Start symbol and length of PDSCH)
}

TABLE 10

PUSCH-TimeDomainResourceAllocation information element
PUSCH-TimeDomainResourceAllocationList ::= SEQUENCE
(SIZE(1..maxNrofUL-Allocations)) OF PUSCH-TimeDomainResourceAllocation
PUSCH-TimeDomainResourceAllocation ::= SEQUENCE {
  k2                    INTEGER(0..32)        OPTIONAL, -- Need S
  (PDCCH-to-PUSCH timing, slot unit)
    mappingType         ENUMERATED {typeA, typeB},
  (PUSCH mapping type)
    startSymbolAndLength   INTEGER (0..127)
    (Start symbol and length of PUSCH)
}

The base station may provide the UE with one of the entries in the table for the time domain resource allocation information via L1 signaling (e.g., DCI) (e.g., it may be indicated with the 'time domain resource allocation' field in the DCI). The UE may obtain time domain resource allocation information for the PDSCH or PUSCH based on the DCI received from the base station.

A downlink control channel in the 5G communication system is described below in greater detail with reference to the drawings.

FIG. 2 is a view illustrating an example control region in which a downlink control channel is transmitted in a 5G wireless communication system according to an embodiment of the disclosure.

Figure 5:
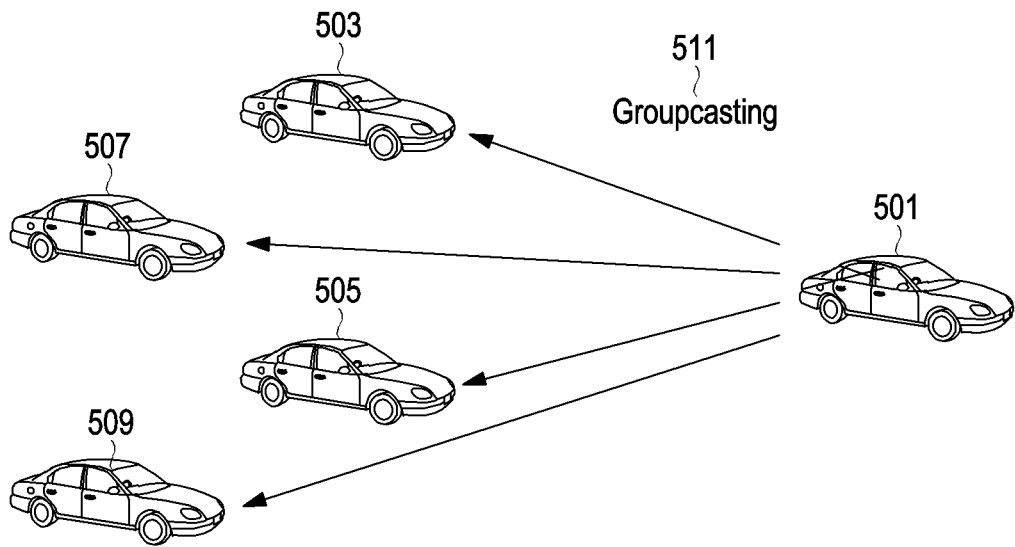
FIG. 5 is a view illustrating an example of groupcasting in which one terminal transmits common data to a plurality of terminals according to an embodiment of the disclosure.

Referring to FIG. 2, it illustrates an example in which two control regions (control region #1 201 and control region #2 202) are configured in one slot 220 on the time axis, and a UE bandwidth part 210 is configured on the frequency axis. The control regions 201 and 202 may be configured to a particular frequency resource 203 in the overall UE bandwidth part 210 on the frequency axis. One or more OFDM symbols may be configured on the time axis, which may be defined as control resource set duration 204. In the example of FIG. 5, control region #1 201 is configured as a control region length of two symbols, and control region #2 202 is configured as a control region length of one symbol.

The above-described 5G control region may be configured via higher layer signaling (e.g., system information, MIB, or RRC signaling) from the base station to the UE. Configuring a UE with a control region means providing the UE with such information as the identifier (ID) of the control region, the frequency position of the control region, and symbol length of the control region. For example, the higher layer signaling may include the information set forth in Table 11 below.

In Table 11, tci-StatesPDCCH (simply referred to as transmission configuration indication (TCI) state) configuration information may include information for one or more SS/PBCH block indexes QCLed with the DMRS transmitted in a corresponding control region or channel state information reference signal (CSI-RS) index information.

For example, each piece of control information included in DCI format 1_1 that is scheduling control information (DL grant) for downlink data may be as follows.

Carrier indicator: indicates which carrier the data scheduled by DCI is transmitted on—0 or 3 bits Identifier for DCI formats: indicates the DCI format. Specifically, an indicator for identifying whether the corresponding DCI is for downlink or uplink.—[1] bits Bandwidth part indicator: indicates a change in bandwidth part, if any.—0, 1 or 2 bits Frequency domain resource assignment: Resource allocation information indicating frequency domain resource allocation. The resource expressed varies depending on whether the resource allocation type is 0 or 1.

Time domain resource assignment: Resource allocation information indicating time domain resource allocation. This may indicate one configuration of a pre-defined PDSCH time domain resource allocation list or higher layer signaling -1, 2, 3, or 4 bits VRB-to-PRB mapping: indicates a mapping relationship between the virtual resource block (VRB) and the physical resource block (PRB)—0 or 1 bit PRB bundling size indicator: indicates the size of physical resource block bundling assuming that the same precoding is applied—0 or 1 bit Rate matching indicator: indicates which rate match group is applied among the rate match groups configured via a higher layer applied to PDSCH—0, 1, or 2 bits

TABLE 11

```
ControlResourceSet ::=                SEQUENCE {
  -- Corresponds to L1 parameter 'CORESET-ID'
    controlResourceSetId              ControlResourceSetId,
(Control region identity)
    frequencyDomainResources          BIT STRING (SIZE (45)),
(Frequency-axis resource allocation information)
    duration                          INTEGER (1..maxCoReSetDuration),
(Time-axis resource allocation information)
    cce-REG-MappingType               CHOICE {
(CCE-to-REG mapping scheme)
      interleaved                     SEQUENCE {
        reg-BundleSize                ENUMERATED {n2, n3, n6},
      (REG bundle size)
        precoderGranularity           ENUMERATED {sameAsREG-
bundle, allContiguousRBs},
        interleaverSize               ENUMERATED {n2, n3, n6}
        (Interleaver size)
        shiftIndex
INTEGER(0..maxNrofPhysicalResourceBlocks-1)
        OPTIONAL
(Interleaver shift)
      },
      nonInterleaved                  NULL
    },
    tci-StatesPDCCH                   SEQUENCE(SIZE (1..maxNrofTCI-
StatesPDCCH)) OF TCI-StateId         OPTIONAL,
    (QCL configuration information)
    tci-PresentInDCI                  ENUMERATED {enabled}
                                      OPTIONAL, -- Need S
}
```

ZP CSI-RS trigger: triggers the zero power channel state information reference signal—0, 1, or 2 bits Transport block (TB)-related configuration information: indicates modulation and coding scheme (MCS), new data indicator (NDI) and redundancy version (RV) for one or two TBs.

Modulation and coding scheme (MCS): indicates the coding rate and modulation scheme used for data transmission. In other words, this may indicate the coding rate value that may indicate TBS and channel coding information along with information for whether it is quadrature phase shift keying (QPSK), 16 quadrature amplitude modulation (QAM), 64QAM, or 256QAM.

New data indicator: indicates whether HARQ initial transmission or re-transmission.

Redundancy version: indicates the redundancy version of HARQ.

HARQ process number: indicates HARQ process number applied to PDSCH—4 bits

Downlink assignment index: An index for generating a dynamic HARQ-ACK codebook when reporting HARQ-ACK for PDSCH—0 or 2 or 4 bits TPC command for scheduled PUCCH: Power control information applied to PUCCH for HARQ-ACK report for PDSCH—2 bits PUCCH resource indicator: Information indicating the resource of PUCCH for HARQ-ACK report for PDSCH—3 bits PDSCH-to-HARQ_feedback timing indicator: Configuration information for the slot in which PUCCH for HARQ-ACK report for PDSCH is transmitted—3 bits Antenna ports: Information indicating the antenna port of the PDSCH DMRS and the DMRS CDM group in which the PDSCH is not transmitted—4, 5 or 6 bits Transmission configuration indication: Information indicating beam-related information for PDSCH—0 or 3 bits SRS request: Information requesting SRS transmission—2 bits CBG transmission information: Information indicating which code block group (CBG) of data is transmitted through PDSCH when code block group-based retransmission is configured—0, 2, 4, 6, or 8 bits CBG flushing out information: Information indicating whether the code block group previously received by the UE may be used for HARQ combining—0 or 1 bit DMRS sequence initialization: indicates DMRS sequence initialization parameter—1 bit In the case of data transmission through PDSCH or PUSCH, time domain resource assignment may be transferred by information for a slot in which PDSCH/PUSCH is transmitted and the number L of symbols in which PDSCH/PUSCH is mapped with the start symbol position S in the slot. Here, S may be a relative position from the start of the slot, L may be the number of contiguous symbols, and S and L may be determined from a start and length indicator value (SLIV) defined as in Equation 1 below.

if $(L-1) \le$ then $$SLIV = 14 \cdot (L-1) + S$$

else $$SLIV = 14 \cdot (14-L+1) + (14-1-S) \quad \text{Equation 1}$$

where $0 < L \le 14-S$

In the NR system, the UE may be configured with information for the slot in which PDSCH/PUSCH is transmitted and PDSCH/PUSCH mapping type and SLIV value in one row via RRC configuration (e.g., the information may be configured in the form of a table). Thereafter, in the time domain resource allocation of the DCI, the base station may transfer, to the UE, the SLIV value, PDSCH/PUSCH mapping type, and information for the slot in which PDSCH/PUSCH is transmitted by indicating the index value in the configured table.

In the NR system, type A and type B are defined as PDSCH mapping types. In PDSCH mapping type A, the first symbol among DMRS symbols is located in the second or third OFDM symbol of the slot. In PDSCH mapping type B, the first symbol among DMRS symbols of the first OFDM symbol in the time domain resource allocated by PUSCH transmission is located.

Downlink data may be transmitted on PDSCH, which is a physical channel for downlink data transmission. PDSCH may be transmitted after the control channel transmission period, and the specific mapping position in the frequency domain, modulation scheme, or other scheduling information are determined based on the DCI transmitted through the PDCCH.

Through the MCS among the control information constituting the DCI, the base station notifies the UE of the modulation scheme that has applied to the PDSCH to be transmitted and the size of data to be transmitted (transport block size; TBS). In an embodiment, the MCS may be composed of 5 bits or more or fewer bits. The TBS corresponds to the size before applying channel coding for error correction to the data (transport block; TB) to be transmitted by the base station.

In the disclosure, a transport block (TB) may include a medium access control (MAC) header, a MAC control element, one or more MAC service data units (SDUs), and padding bits. Alternatively, TB may denote a unit of data delivered from the MAC layer to the physical layer or a MAC protocol data unit (PDU).

The NR system supports the following modulation schemes: quadrature phase shift keying (QPSK), 16 quadrature amplitude modulation (16QAM), 64QAM, and 256 QAM, and their respective modulation orders (Qm) are 2, 4, 6, and 8. In other words, QPSK, 16QAM, 64QAM, and 256QAM may transmit 2 bits per symbol, 4 bits per symbol, 6 bits per symbol, and 8 bits per symbol, respectively.

Figure 3:
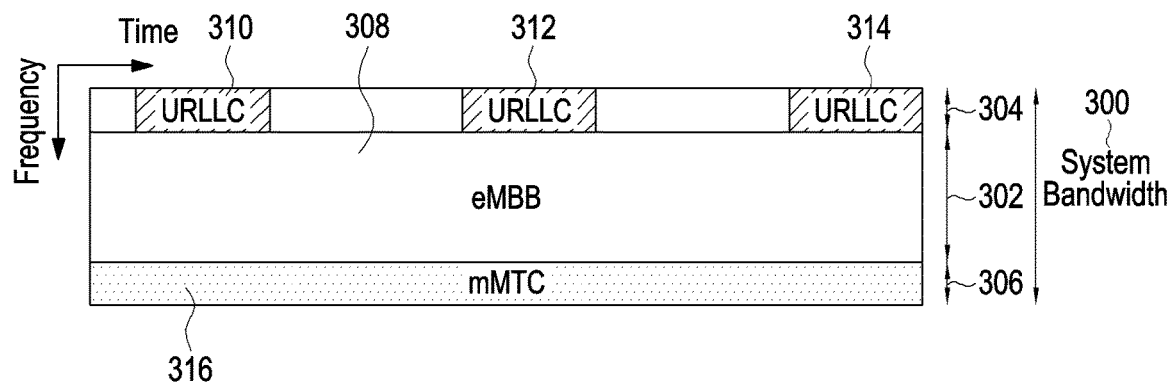
FIG. 3 is a view illustrating another example in which eMBB, URLLC, and mMTC data are allocated in frequency-time resources in a communication system according to an embodiment of the disclosure.
Figure 4:
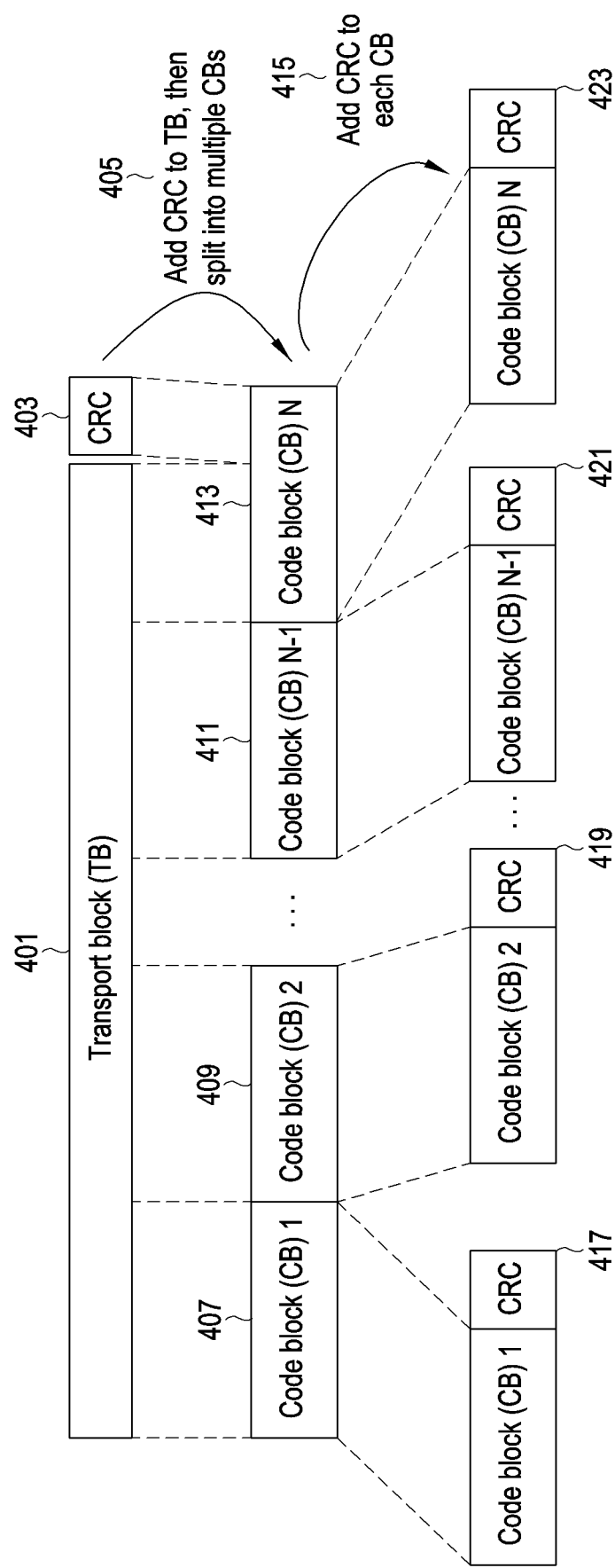
FIG. 4 is a view illustrating an example in which one transport block is divided into several code blocks and a CRC is added according to an embodiment of the disclosure.

FIGS. 3 and 4 are views illustrating an example in which data of eMBB, URLLC, and mMTC data, which are services considered in 5G or NR systems, are allocated in frequency-time resources.

Referring to FIGS. 3 and 4, it may be identified how frequency and time resources are allocated for information transmission in each system.

FIG. 3 is a view illustrating an example in which eMBB, URLLC, and mMTC data are allocated in the entire system frequency band according to an embodiment of the disclosure.

Referring to FIG. 3, it illustrates an example in which data for eMBB, URLLC, and mMTC are allocated in the entire system frequency band 300. If URLLC data 303, 305, and 307 needs to be generated and transmitted while eMBB 301 and mMTC 309 are allocated in a specific frequency band and transmitted, URLLC data 303, 305, and 307 may be transmitted with the portions, in which eMBB 301 and mMTC 309 have already been allocated, emptied or not transmitted. Among the above services, URLLC requires a decrease in latency time. Thus, URLLC data may be allocated (303, 305, and 307) in the portion of the resource 301, in which eMBB has been allocated. If URLLC is additionally allocated and transmitted in the eMBB-allocated resource, eMBB data may not be transmitted in the duplicate frequency-time resource, so that the transmission performance of eMBB data may be lowered. In other words, a failure to transmit eMBB data may occur due to the allocation of the URLLC.

FIG. 4 is a view illustrating an example in which eMBB, URLLC, and mMTC data are allocated, with the system frequency band divided according to an embodiment of the disclosure.

Referring to FIG. 4, the entire system frequency band 400 may be divided into subbands 402, 404, and 406 which may be used for transmitting data and services. The information related to configuration of the subbands may be predetermined, and the information may be transmitted from the base station to the UE through higher level signaling. Alternatively, the system frequency band may be divided into the subbands by the base station or a network node in an arbitrary manner, so that services may be provided without transmitting separate subband configuration information to the UE. FIG. 4 illustrates an example in which subbands 402, 404, and 406 are used for transmission of eMBB data 408, URLLC data 410, 412, and 414, and mMTC data 416, respectively.

To describe the methods and devices proposed in the embodiment, the terms "physical channel" and "signal" in the NR system may be used. However, the content of the disclosure may be applied to other wireless communication systems than the NR system.

Hereinafter, embodiments of the disclosure are described in detail with reference to the accompanying drawings. When determined to make the subject matter of the disclosure unclear, the detailed description of the known art or functions may be skipped. The terms as used herein are defined considering the functions in the disclosure and may be replaced with other terms according to the intention or practice of the user or operator. Therefore, the terms should be defined based on the overall disclosure.

According to the disclosure, downlink (DL) refers to a wireless transmission path of signal transmitted from the base station to the terminal, and uplink (UL) refers to a wireless transmission path of signal transmitted from the terminal to the base station.

Although NR system is described in connection with embodiments of the disclosure, as an example, embodiments of the disclosure may also apply to other communication systems with similar technical background or channel form. Further, embodiments of the disclosure may be modified in such a range as not to significantly depart from the scope of the disclosure under the determination by one of ordinary skill in the art and such modifications may be applicable to other communication systems.

In the disclosure, the terms "physical channel" and "signal" may be used interchangeably with "data" or "control signal." For example, PDSCH is a physical channel through which data is transmitted, but in the disclosure, PDSCH may be data.

As used herein, the term "higher layer signaling" may refer to a method for transmitting signals from the base station to the UE using a downlink data channel of the physical layer or from the UE to the base station using an uplink data channel of the physical layer and may be interchangeably used with "RRC signaling" or MAC control element (CE)."

FIG. 5 is a view illustrating an example process in which one transport block is divided into several code blocks and a CRC is added according to an embodiment of the disclosure.

Referring to FIG. 5, a CRC 503 may be added to the head or tail of one transport block (TB) 501 which is to be transmitted on uplink or downlink. The CRC 503 may have a fixed number of bits, e.g., 16 bits or 25 bits, or a variable number of bits depending on, e.g., channel context, and be used to determine whether channel coding succeeds. The CRC (503)-added TB 501 may be divided into several code blocks (CBs) 507, 509, 511, and 513 (505). The maximum sizes of the code blocks may be previously determined and, in this case, the last code block 513 may be smaller than the other code blocks 507, 509, and 511. However, this is only an example, and according to another example, 0, a random value, or 1 may be inserted into the last code block 513, so that the last code block 513 and the other code blocks 507, 509 and 511 have the same length.

CRCs 517, 519, 521, and 523 may be added to the code blocks 507, 509, 511, and 513, respectively (515). The CRC may have a fixed number of bits, e.g., 16 bits or 24 bits, and be used to determine whether channel coding succeeds.

The TB 501 and a cyclic generator polynomial may be used to generate the CRC 503, and the cyclic generator polynomial may be defined in various ways. For example, assuming that a cyclic generator polynomial for a 24-bit CRC meets: gCRC24A(D)=$D^{24}+D^{23}+D^{18}+D^{17}+D^{14}+D^{11}+D^{10}+D^{7}+D^{6}+D^{5}+D^{4}+D^{3}+D+1$, and L=24, for TB data $a_0, a_1, a_2, \ldots, a_{A-1}$, CRC $p_0, p_1, p_2, \ldots, p_{L-1}$ may be determined as the value whose remainder is 0 when $a_0 D^{A+23}+a_1 D^{A+22}+ \ldots +a_{A-1}D^{24}+p_0 D^{23}+p_1 D^{22}+ \ldots +p_{22}D^1+p_{23}$ is divided by gCRC24A(D). In the above-described example, it is assumed that the CRC length L is 24 as an example, but the CRC length L may be determined to have a different value, e.g., 12, 16, 24, 32, 40, 48, or 64.

After the CRC is added to the TB through this process, the TB+CRC may be divided into N CBs 507, 509, 511, and 513. CRCs 517, 519, 521, and 523 may be added to the CBs 507, 509, 511, and 513, respectively (515). The CRCs added to the CBs may have different lengths than the CRC added to the TB, or a different cyclic generator polynomial may be used to generate the CRC. The CRC 503 added to the TB and the CRCs 517, 519, 521, and 523 added to the codeblocks may be omitted depending on the type of channel code to be applied to the codeblocks. For example, if a low-density parity code (LDPC) code, not turbo code, is applied to the codeblocks, the CRCs 517, 519, 521, and 523 to be added to the codeblocks may be omitted.

However, even when the LDPC is applied, the CRCs 517, 519, 521, and 523 may be added to the codeblocks. Further, when a polar code is used, the CRCs may also be added or omitted.

As described above in connection with FIG. 5, the maximum length of one codeblock is determined depending on the type of channel coding applied to the TB to be transmitted, and depending on the maximum length of the codeblock, the TB and the CRC added to the TB may be divided into codeblocks.

In legacy LTE systems, CB CRCs are added to the divided CBs, and the data bits of the CBs and the CRCs are encoded with channel code, so that coded bits are determined, and the number of bits to be rate-matched is determined as previously agreed on coded bits.

In NR systems, the TB size (TBS) may be calculated by the following steps.

Step 1: $N_{RE}'$ which is the number of REs allocated for PDSCH mapping in one PRB in the allocated resource is calculated.

$N_{RE}'$ may be calculated as $N_{sc}^{RB} \cdot N_{symb}^{sh} - N_{DMRS}^{PRB} - N_{oh}^{PRB}$. Here, $N_{sc}^{RB}$ is 12, and $N_{symb}^{sh}$ may indicate the number of OFDM symbols allocated to the PDSCH. $N_{DMRS}^{PRB}$ is the number of REs in one PRB occupied by DMRSs of the same CDM group. $N_{oh}^{PRB}$ is the number of REs occupied by the overhead in one PRB configured by higher signaling, and may be set to one of 0, 6, 12, and 18 Thereafter, the total number $N_{RE}$ of REs allocated to the PDSCH may be calculated. $N_{RE}$ is calculated as min(156, $N_{RR}') \cdot n_{PRB}$, and $n_{PRB}$ denotes the number of PRBs allocated to the UE.

Step 2: $N_{info}$, which is the number of bits of temporary information, may be calculated as $N_{RE}*R*Q_m*v$. Here, R is the code rate, Qm is the modulation order, and information for this value may be transmitted using the MCS bit field of DCI and a pre-arranged table. v is the number of allocated layers. If $N_{info} \leq 3824$, the TBS may be calculated through step 3 below. Otherwise, the TBS may be calculated through step 4.

Step 3: By $$N'_{info} = \max\left(24, 2^n * \left\lfloor \frac{N_{info}}{2^n} \right\rfloor\right)$$

and $n = \max(3, \lfloor \log_2(N_{info}) \rfloor - 6)$, $N_{info}'$ may be calculated. The TBS may be determined to be a value closest to $N_{info}'$ among values not smaller than $N_{info}'$ in Table 12 below.

TABLE 12

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |

TABLE 12-continued

| Index | TBS |
|---|---|
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Step 4: By $$N'_{info} = \max\left(3840, 2^n \times \text{round}\left(\frac{N_{info} - 24}{2^n}\right)\right)$$

and $n = \lfloor \log_2(N_{info} - 24) \rfloor - 5$, $N_{info}'$ may be calculated. The TBS may be determined by $N_{info}'$ and [pseudo-code 1] below. In the following, C corresponds to the number of code blocks included in one TB.

[Start of Pseudo-code 1]

if $R \leq 1/4$ $$TBS = 8*C*\left\lceil\frac{N'_{info} + 24}{8*C}\right\rceil - 24, \text{ where } C = \left\lceil\frac{N'_{info} + 24}{3816}\right\rceil$$

else if $N'_{info} > 8424$ $$TBS = 8*C*\left\lceil\frac{N'_{info} + 24}{8*C}\right\rceil - 24, \text{ where } C = \left\lceil\frac{N'_{info} + 24}{8424}\right\rceil$$

else $$TBS = 8*\left\lceil\frac{N'_{info} + 24}{8} - \right\rceil - 24$$

end if
end if
[End of Pseudo-code 1]

When one CB is input to the LDPC encoder in the NR system, it may be output, with parity bits added. In this case, the amount of parity bits may vary depending on an LDPC base graph. A method for sending all of the parity bits generated by LDPC coding for a specific input may be referred to as full buffer rate matching (FBRM), and a method for limiting the number of transmittable parity bits may be referred to as limited buffer rate matching (LBRM). When a resource is allocated for data transmission, the output of the LDPC encoder is created as a circular buffer, and the bits of the created buffer are repeatedly transmitted as much as the allocated resource. In this case, the length of the circular buffer may be designated $N_{cb}$.

When the number of all of the parity bits generated by LDPC coding is N, in the FBRM method, $N_{cb}=N$. In the LBRM method, $N_{cb}$ is min (N, $N_{ref}$), $N_{ref}$ is given as $$\left\lfloor\frac{TBS_{LBRM}}{C \cdot R_{LBRM}}\right\rfloor,$$

and $R_{LBRM}$ may be determined as 2/3. To obtain $TBS_{LBRM}$, the above-described method for obtaining TBS is used, assuming the maximum number of layers and maximum modulation order supported by the UE in the cell. The maximum modulation order Qm is assumed to be 8, if an MCS table supporting 256QAM is used for at least one BWP in the cell, or otherwise, 6 (64QAM). The code rate is assumed to be the maximum code rate, i.e., 948/1024. $N_{RE}$ is assumed to be $156 \cdot n_{PRB}$, and $n_{PRB}$ is assumed to be $n_{PRB, LBRM}$. $n_{PRB, LBRM}$ may be given in Table 13 below.

TABLE 13

| Maximum lumber of PRBs across all configured BWPs of a carrier | $n_{PRB, LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

The maximum data rate supported by the UE in the NR system may be determined through Equation 2 below.

$$\text{data rate (in Mbps)} = 10^{-6} \cdot \sum_{j=1}^{J}\left(v_{Layers}^{(j)} \cdot Q_m^{(j)} \cdot f^{(j)} \cdot R_{max} \cdot \frac{N_{PRB}^{BW(j),\mu} \cdot 12}{T_s^\mu} \cdot (1 - OH^{(j)})\right) \quad \text{Equation 2}$$

In Equation 2, J is the number of carriers bundled by carrier aggregation, $R_{max}=948/1024$, $v_{Layers}^{(i)}$ is the maximum number of layers, $Q_m^{(j)}$ is the maximum modulation order, $f^{(j)}$ is the scaling index, and μ is the subcarrier spacing. As $f^{(j)}$, one of 1, 0.8, 0.75, and 0.4 may be reported by the UE and μ may be given in Table 14 below.

TABLE 14

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

$T_s^\mu$ is the average OFDM symbol length, $T_s^\mu$ may be calculated as $$\frac{10^{-3}}{14 \cdot 2^\mu},$$

and $N_{PRR}^{BW(j),\mu}$ is the maximum number of RBs in BW(j). $OH^{(j)}$, as an overhead value, may be given as 0.14 for downlink and 0.18 for uplink in FR1 (band below 6 GHz), and as 0.08 for downlink and 0.10 for uplink in FR2 (band above 6 GHz). Through Equation 2, the maximum data rate in downlink in a cell having a 100 MHz frequency bandwidth at a 30 kHz subcarrier spacing may be calculated as Table 15 below.

TABLE 15

| $f^{(j)}$ | $v_{Layers}^{(j)}$ | $Q_m^{(j)}$ | Rmax | $N_{PRB}^{BW(f),\mu}$ | $T_s^\mu$ | $OH^{(j)}$ | data rate |
|---|---|---|---|---|---|---|---|
| 1 | 4 | 8 | 0.92578125 | 273 | 3.57143−05 | 0.14 | 2337.0 |
| 0.8 | 4 | 8 | 0.92578125 | 273 | 3.57143−05 | 0.14 | 1869.6 |
| 0.75 | 4 | 8 | 0.92578125 | 273 | 3.57143−05 | 0.14 | 1752.8 |
| 0.4 | 4 | 8 | 0.92578125 | 273 | 3.57143−05 | 0.14 | 934.8 |

In contrast, the actual data rate that the UE may measure in actual data transmission may be a value obtained by dividing the amount of data by the data transmission time. This may be a value obtained by dividing TBS by the transmission time interval (TTI) length for 1 TB transmission or dividing the sum of TBSs by the TTI length for 2 TB transmission. As an example, as assumed to obtain Table 15, the maximum actual data rate in downlink in the cell having the 100 MHz frequency band in the 30 kHz subcarrier spacing may be determined as shown in Table 16 according to the number of PDSCH symbols allocated.

TABLE 16

| $N_{symb}^{sh}$ | $N_{DMRS}^{PRB}$ | $N'_{RE}$ | $N_{RE}$ | $N_{info}$ | n | $N'_{info}$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,101.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.5 | 14 | 999,424 | 119 | 999,576 | 0.392857 | 2,544.38 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

The maximum data rate supported by the UE may be identified via Table 7, and the actual data rate following the allocated TBS may be identified via Table 8. In some cases, the actual data rate may be larger than the maximum data rate depending on scheduling information.

In wireless communication systems, in particular new radio (NR) systems, a data rate supportable by the UE may be agreed on between the base station and the UE. This may be calculated using, e.g., the maximum frequency band, maximum modulation order, and maximum number of layers supported by the UE. However, the calculated data rate may be different from a value calculated from the size of the transport block (TB) (transport block size (TBS)) and transmission time interval (TTI) used for actual data transmission.

Thus, the UE may be assigned a larger TBS than the value corresponding to the data rate supported by the UE and, to prevent this, a limit may be imposed on the TBS schedulable depending on the data rate supported by the UE.

Figure 6:
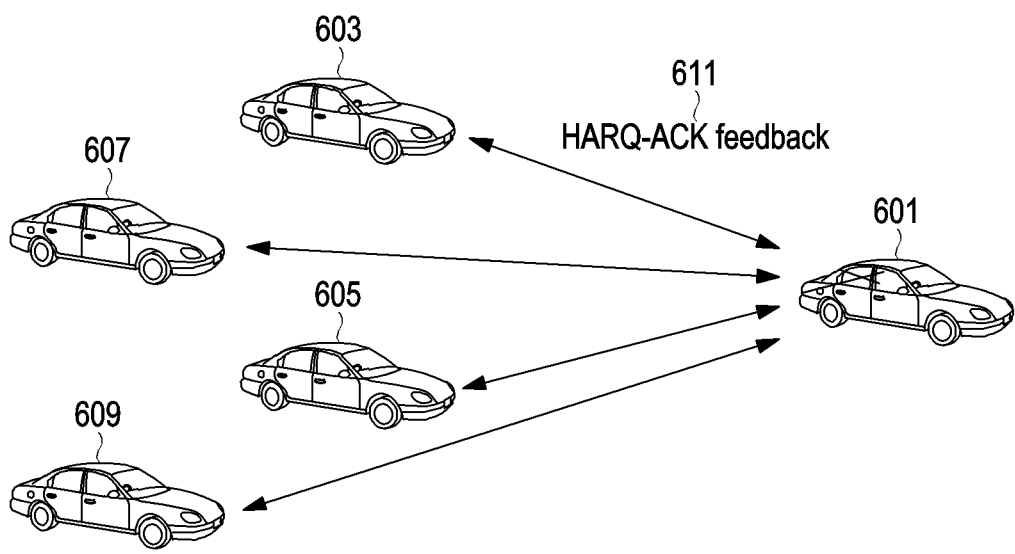
FIG. 6 is a view illustrating a process in which a plurality of terminals that receive common data in groupcasting transmit information related to data reception success or data reception failure to a terminal that transmits the common data according to an embodiment of the disclosure.

FIG. 6 is a view illustrating an example in which a synchronization signal (SS) and a physical broadcast channel (PBCH) of an NR system are mapped in the frequency and time domains according to an embodiment of the disclosure.

A primary synchronization signal (PSS) 601, a secondary synchronization signal (SSS) 603, and a PBCH 605 are mapped over 4 OFDM symbols, and the PSS and SSS are mapped to 12 RBs, and the PBCH is mapped to 20 RBs.

Referring to FIG. 6, how the frequency band of 20 RBs changes according to subcarrier spacing (SCS). The resource region in which the PSS, SSS, and PBCH are transmitted may be referred to as an SS/PBCH block. The SS/PBCH block may be referred to as an SSB block.

Figure 7:
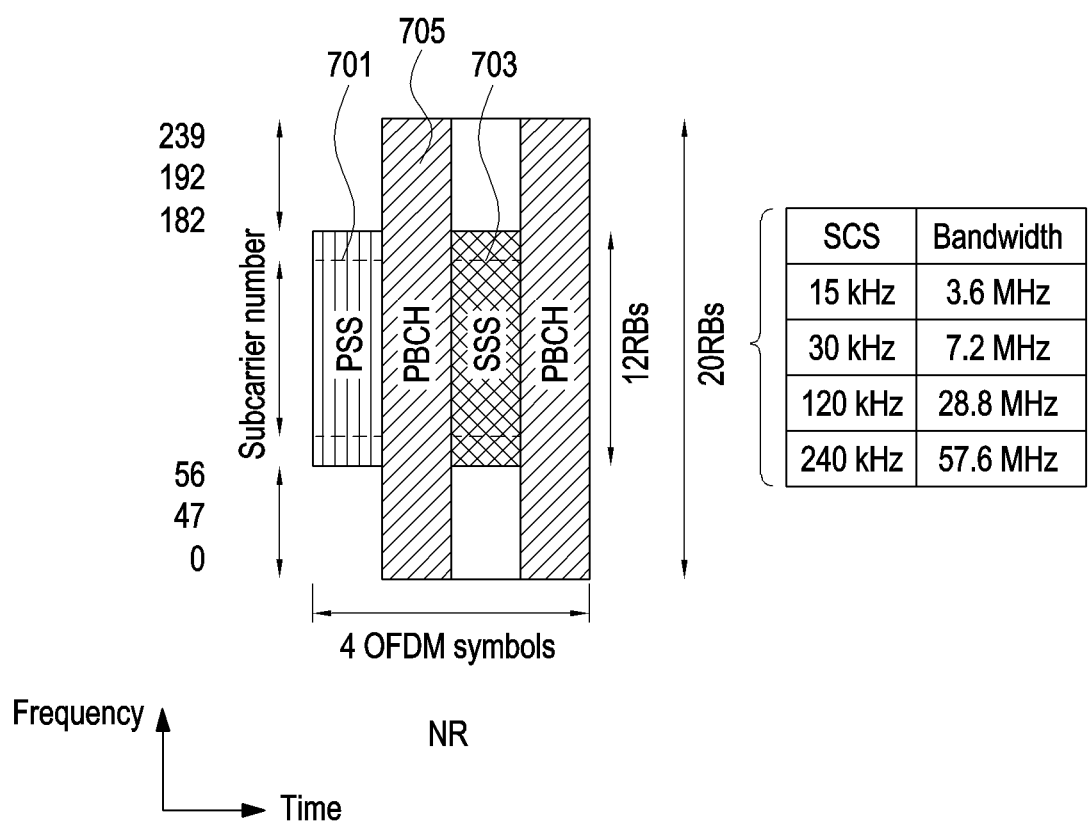
FIG. 7 is a view illustrating a state in which a synchronization signal and a physical broadcast channel of an NR system are mapped in the frequency and time domains according to an embodiment of the disclosure.

FIG. 7 is a view illustrating a symbol in which an SS/PBCH block may be transmitted according to a subcarrier spacing according to an embodiment of the disclosure.

Referring to FIG. 7, the subcarrier spacing may be set to 15 kHz, 30 kHz, 120 kHz, or 240 kHz, and the position of the symbol in which the SS/PBCH block (or SSB block) may be positioned may be determined according to each subcarrier spacing. FIG. 7 illustrates the position of the symbol in which the SSB may be transmitted according to the subcarrier spacing in the symbols within 1 ms, and the SSB need not be always transmitted in the region shown in FIG. 7. The position in which the SSB block is transmitted may be configured in the UE through system information or dedicated signaling.

Since the UE is generally far from the base station, the signal transmitted from the UE is received by the base station after a propagation delay. The propagation delay time is a value obtained by dividing the path through which a radio wave is transmitted from the UE to the base station by the speed of light, and may typically be a value obtained by dividing the distance between the UE and the base station by the speed of light. According to an embodiment, if the UE is located 100 km away from the base station, a signal transmitted from the UE is received by the base station after about 0.34 msec. The signal transmitted from the base station is also received by the UE after about 0.34 msec. As described above, the arrival time of a signal transmitted from the UE to the base station may vary depending on the distance between the UE and the base station. Therefore, when multiple UEs in different locations transmit signals simultaneously, the times when the signals arrive at the base station may differ from each other. To allow the signals from several UEs to simultaneously arrive at the base station, the time of transmission of uplink signal may be rendered to differ per UE. In 5G, NR and LTE systems, this is called timing advance.

Figure 8:
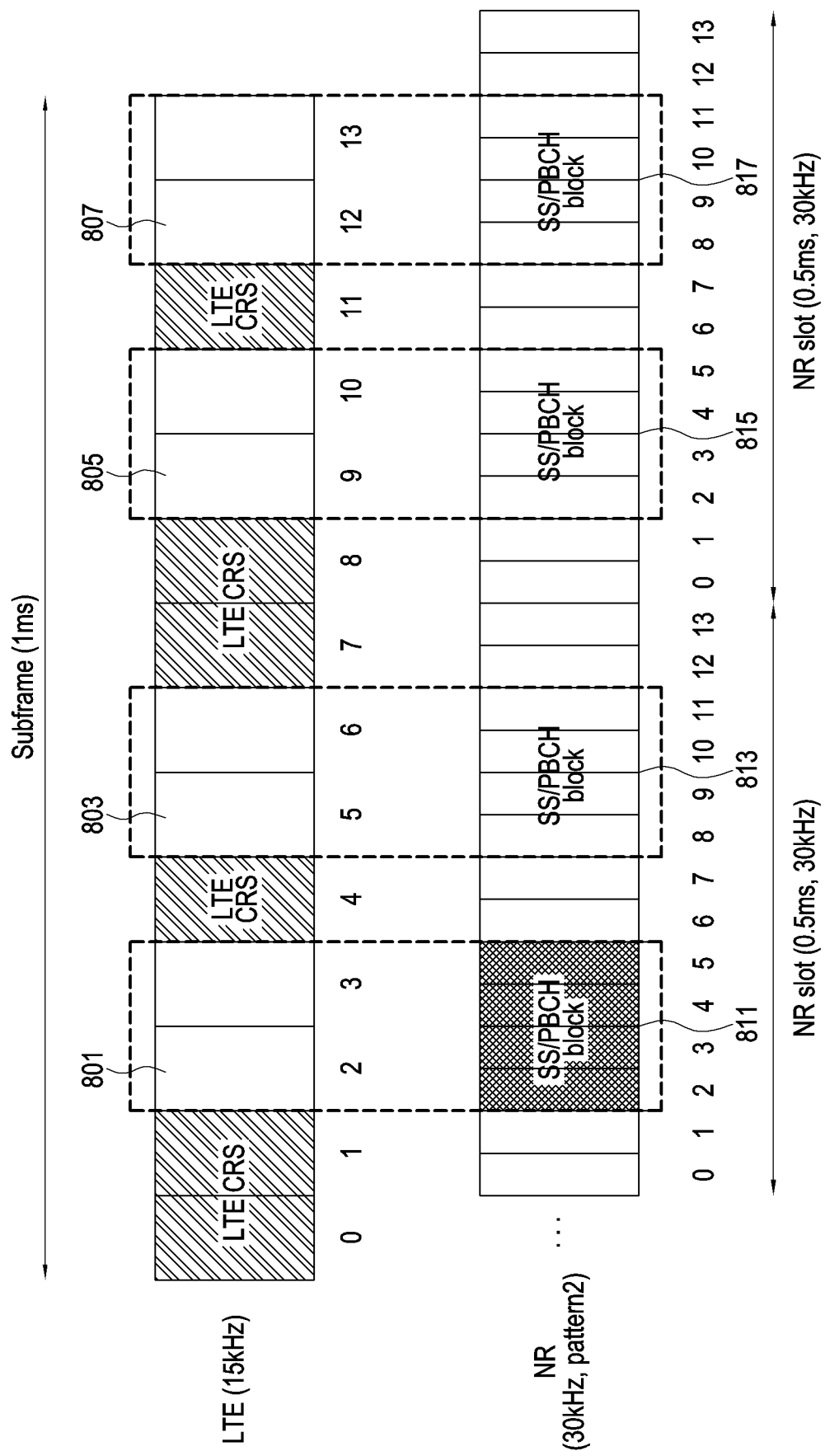
FIG. 8 is a view illustrating an example in which one SS/PBCH block is mapped to which symbols in a slot according to an embodiment of the disclosure.

FIG. 8 is a view illustrating a processing time of a UE according to a timing advance when the UE receives a first signal and the UE transmits a second signal in a 5G or NR system according to an embodiment of the disclosure.

Hereinafter referring to FIG. 8, the processing time of the UE according to the timing advance is described in detail. When the base station transmits an uplink scheduling grant (UL grant) or a downlink control signal and data (DL grant and DL data) to the UE at slot n 802, the UE may receive the uplink scheduling grant or downlink control signal and data at slot n 804. In this case, the UE may receive the signal, a propagation delay (Tp) 810 later than the time the base station transmits the signal. In this embodiment, when the UE receives a first signal at slot n 804, the UE transmits a second signal at slot n+4 806. When the UE transmits a signal to the base station, the UE may transmit an HARQ ACK/NACK for the uplink data or downlink data at a timing 806 which is a timing advance (TA) 812 earlier than slot n+4 for the signal received by the UE to allow the signal to arrive at the base station at a specific time (808). Thus, according to the instant embodiment, the time during which the UE may prepare to transmit uplink data after receiving the uplink scheduling grant or the UE may prepare to transfer an HARQ ACK or NACK after receiving downlink data may be a time corresponding to three slots except for TA (814).

To determine the above-described timing, the base station may calculate the absolute value of the TA of the UE. The base station may calculate the absolute value of the TA by adding to, or subtracting from, the TA first transferred to the UE in the random access phase, variation in the subsequent TA transferred via higher layer signaling, when the UE initially accesses the base station. In the disclosure, the absolute value of the TA may be a value obtained by subtracting the start time of the nth TTI for reception by the UE from the start time of the nth TTI for transmission by the UE.

Meanwhile, one of the important criteria for performance of a cellular wireless communication system is packet data latency. In LTE systems, signal transmission/reception is performed in units of subframes which have a transmission time interval (TTI) of 1 ms. The LTE system operated as described above may support UEs (short-TTI UEs) having a shorter TTI than 1 ms. Meanwhile, in 5G or NR systems, the TTI may be shorter than 1 ms. Short-TTI UEs are suitable for services, such as voice over LTE (VoLTE) services and remote control services where latency is important. Further, the short-TTI UE becomes a means capable of realizing mission-critical Internet of things (IoT) on a cellular basis.

In the 5G or NR system, when the base station transmits a PDSCH including downlink data, the DCI for scheduling the PDSCH indicates the K1 value, which is a value corresponding to information for the timing when the UE transmits HARQ-ACK information for the PDSCH Unless it is instructed to transmit HARQ-ACK information earlier than symbol L1 including the timing advance, the UE may transmit it to the base station. In other words, the HARQ-ACK information may be transmitted from the UE to the base station at the same time, or later than, the symbol L1 including the timing advance. When it is instructed to transmit HARQ-ACK information earlier than symbol L1 including the timing advance, the HARQ-ACK information may not be valid HARQ-ACK information in HARQ-ACK transmission from the UE to the base station.

Symbol L1 may be the first symbol at which cyclic prefix (CP) begins $T_{proc,1}$ after the last time of the PDSCH. $T_{proc,1}$ may be calculated as in Equation 3 below.

$$T_{proc,1} = ((N_1 + d_{1,1} + d_{1,2})(204830\ 144) \cdot \kappa 2^{-\mu}) \cdot T_C \quad \text{Equation 3}$$

In Equation 3 above, N1, d1,1, d1,2, K, μ, and TC may be defined as follows.

If HARQ-ACK information is transmitted over PUCCH (uplink control channel), d1,1=0, and if HARQ-ACK information is transmitted over PUSCH (uplink shared channel, data channel), d1,1=1.

When the UE is configured with a plurality of activated configuration carriers or carriers, the maximum timing difference between carriers may be reflected in the second signal transmission.

In the case of PDSCH mapping type A, that is, when the first DMRS symbol position is the third or fourth symbol of the slot, if the position index i of the last symbol of the PDSCH is less than 7, d1,2=7−i.

In the case of PDSCH mapping type B, that is, when the first DMRS symbol position is the first symbol of the PDSCH, if the length of the PDSCH is 4 symbols, d1,2=3, and if the length of the PDSCH is 2 symbols, d1,2=3+d, where d is the number of symbols in which the PDSCH and the PDCCH including the control signal for scheduling the corresponding PDSCH overlap.

N1 is defined as in Table 17 below according to μ. μ=0, 1, 2, and 3 mean subcarrier spacing is 15 kHz, 30 kHz, 60 kHz, and 120 kHz, respectively.

TABLE 17

| | PDSCH decoding time N₁ [symbols] | |
|---|---|---|
| μ | No additional PDSCH DMRS configured | additional PDSCH DMRS configured |
| 0 | 8 | 13 |
| 1 | 10 | 13 |
| 2 | 17 | 20 |
| 3 | 20 | 24 |

For the N1 value provided in Table 17 above, a different value may be used according to UE capability. The following definitions are used:
$T_c = 1/(\Delta f_{max} \cdot N_f)$, $\Delta f_{max} = 480 \cdot 10^3$ Hz, $N_f = 4096$, $\kappa = T_s/T_c = 64$, $T_s = 1/(\Delta f_{ref} \cdot N_{f,ref})$,
$\Delta f_{ref} = 15 \cdot 10^3$ Hz, $N_{ref} = 2048$ Further, in the 5G or NR system, when the base station transmits control information including an uplink scheduling grant, the K2 value corresponding to information for the timing when the UE transmits uplink data or PUSCH may be indicated.

Unless it is instructed to transmit PUSCH earlier than symbol L2 including the timing advance, the UE may transmit it to the base station. In other words, the PUSCH may be transmitted from the UE to the base station at the same time, or later than, the symbol L2 including the timing advance. When it is instructed to transmit the PUSCH earlier than symbol L2 including the timing advance, the UE may disregard the uplink scheduling grant control information from the base station.

Symbol L2 may be the first symbol at which the CP of the PUSCH symbol, which needs to be transmitted $T_{proc,2}$ after the last time of the PDCCH including the scheduling grant, begins. $T_{proc,2}$ may be calculated as in Equation 4 below.

$$T_{proc,2} = ((N_2 + d_{2,1})(2048 + 144) \cdot \kappa 2^{-\mu}) \cdot T_C \quad \text{Equation 4}$$

In Equation 4 above, N2, d2,1, K, μ, and TC may be defined as follows.

If the first symbol among PUSCH-allocated symbols includes only DMRS, d2,1=0, otherwise d2,1=1.

When the UE is configured with a plurality of activated configuration carriers or carriers, the maximum timing difference between carriers may be reflected in the second signal transmission.

N2 is defined as in Table 18 below according to μ. μ=0, 1, 2, and 3 mean subcarrier spacing is 15 kHz, 30 kHz, 60 kHz, and 120 kHz, respectively.

TABLE 18

| μ | (PUSCH preparation time) N₂ [symbols] |
|---|---|
| 0 | 10 |
| 1 | 12 |
| 2 | 23 |
| 3 | 36 |

For the N2 value provided in Table 18 above, a different value may be used according to UE capability. The following definitions are used: $T_c=1/(\Delta f_{max} \cdot N_f)$, $\Delta f_{max}=480 \cdot 10^3$ Hz, $N_f=4096$, $\kappa=T_s/T_c=64$, $T_s=1/(\Delta f_{ref} \cdot N_{f,ref})$, $\Delta f_{ref}=15 \cdot 10^3$ Hz, $N_{ref}=2048$, The 5G or NR system may configure a frequency band part (BWP) within one carrier to allow a specific UE to transmit and receive within the configured BWP. This may be so intended to reduce power consumption of the UE. The base station may configure a plurality of BWPs, and may change the activated BWP in the control information. The time which the UE may use when the BWP is changed may be defined as shown in Table 19 below.

TABLE 19

| Frequency Range | Scenario | Type 1 delay (us) | Type 2 delay (us) |
|---|---|---|---|
| 1 | 1 | 600 | 2000 |
|   | 2 | 600 | 2000 |
|   | 3 | 600 | 2000 |
|   | 4 | 400 | 950 |
| 2 | 1 | 600 | 2000 |
|   | 2 | 600 | 2000 |
|   | 3 | 600 | 2000 |
|   | 4 | 400 | 950 |

In Table 19, frequency range 1 means a frequency band below 6 GHz, and frequency range 2 means a frequency band above 6 GHz. In the above-described embodiment, type 1 and type 2 may be determined according to UE capability. Scenarios 1, 2, 3, and 4 in the above-described embodiment are given as illustrated in Table 20 below.

TABLE 20

|  | Center frequency variable | Center frequency fixed |
|---|---|---|
| Frequency bandwidth variable | Scenario 3 | Scenario 2 |
| Frequency bandwidth fixed | Scenario 1 | Scenario 4 if subcarrier spacing is changed |

Figure 9:
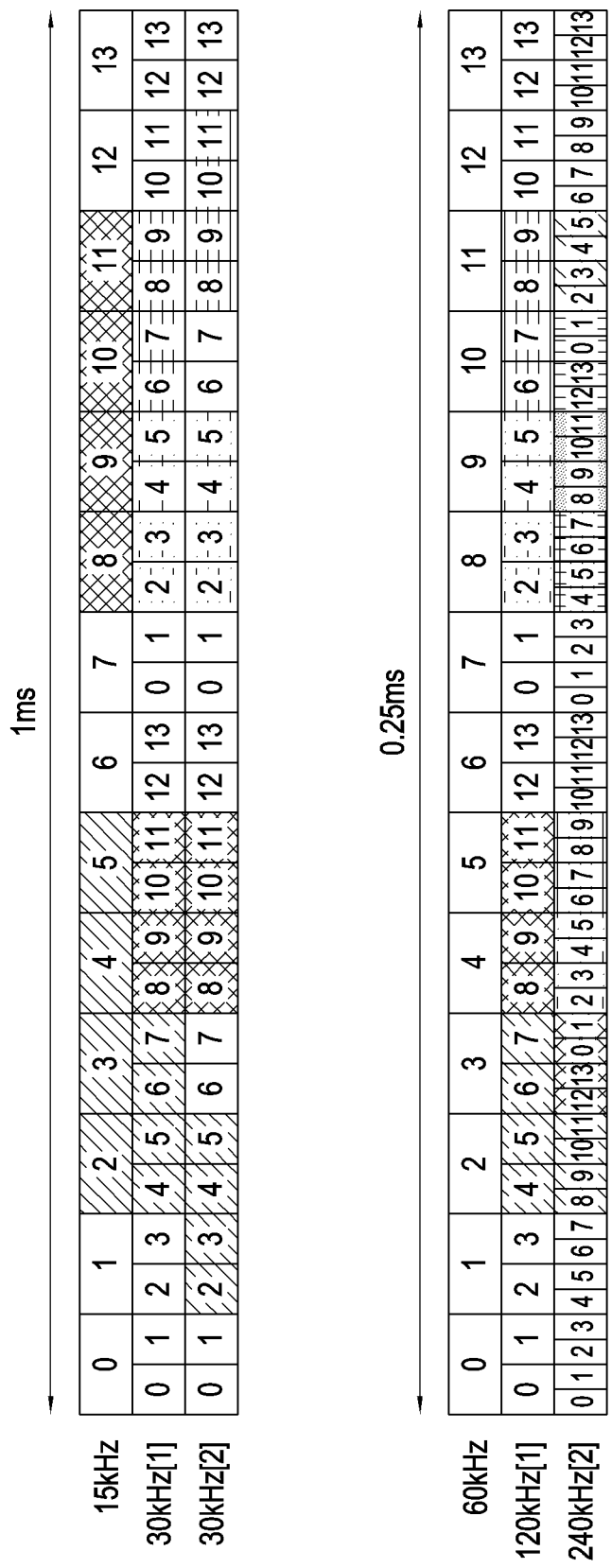
FIG. 9 is a diagram illustrating an example in which an SS/PBCH block may be transmitted in which symbol among symbols within 1 ms according to subcarrier spacing according to an embodiment of the disclosure.

FIG. 9 is a view illustrating an example in which data (e.g., TBs) are scheduled and transmitted according to a slot, an HARQ-ACK feedback for the corresponding data is received, and retransmission is performed according to the feedback according to an embodiment of the disclosure.

Referring to FIG. 9, TB1 900 is initially transmitted in slot 0 902, and an ACK/NACK feedback 904 therefor is transmitted in slot 4 906. If the initial transmission of TB1 fails and a NACK is received, retransmission 910 for TB1 may be performed in slot 8 908. In the above, the time point at which the ACK/NACK feedback is transmitted and the time point at which the retransmission is performed may be predetermined or may be determined according to a value indicated by control information and/or higher layer signaling.

FIG. 9 illustrates an example in which TB1 to TB8 are sequentially scheduled and transmitted from slot 0 to TB8. For example, TB1 to TB8 may be transmitted, with HARQ process ID 0 to HARQ process ID 7 assigned thereto. If only four HARQ process IDs may be used by the base station and the UE, it may be impossible to consecutively transmit eight different TBs.

Meanwhile, various embodiments of the disclosure propose various schemes for a groupcast service or a multicast service, which are described in detail as follows.

According to various embodiments, when one UE transmits the same data to a plurality of UEs or when a base station transmits the same data to a plurality of UEs is referred to as groupcast or multicast, and it should be noted that according to various embodiments the terms "groupcast" and "multicast" may be interchangeably used.

Further, in various embodiments of the disclosure, the term "base station (BS)" may refer to any component (or a set of components) configured to provide wireless access, such as a transmission point (TP), a transmit-receive point (TRP), an enhanced node B (eNodeB or eNB), a 5G base station (gNB), a macrocell, a femtocell, Wi-Fi access point (AP), or other wireless-enabled devices, based on the type of the wireless communication system. Base stations may provide wireless access according to one or more radio protocols, e.g., 5G 3GPP new radio interface/access (NR), long-term evolution (LTE), LTE advanced (LTE-A), high-speed packet access (HSPA), or Wi-Fi 802.11 a/b/g/n/ac.

Further, in various embodiments of the disclosure, the term "UE" may refer to any component, such as "user equipment (UE)," "mobile station," "subscriber station," "remote terminal," "wireless terminal," "receive point," or "user device." For convenience, the term "UE" is used to refer to a device that accesses a base station regardless of whether it needs to be considered as a mobile device (such as a mobile phone or a smart phone) or a stationary device (such as a desktop computer or vending machine).

An example signal transmission/reception scheme for a groupcast service in a wireless communication system is described below with reference to FIG. 10.

Figure 10:
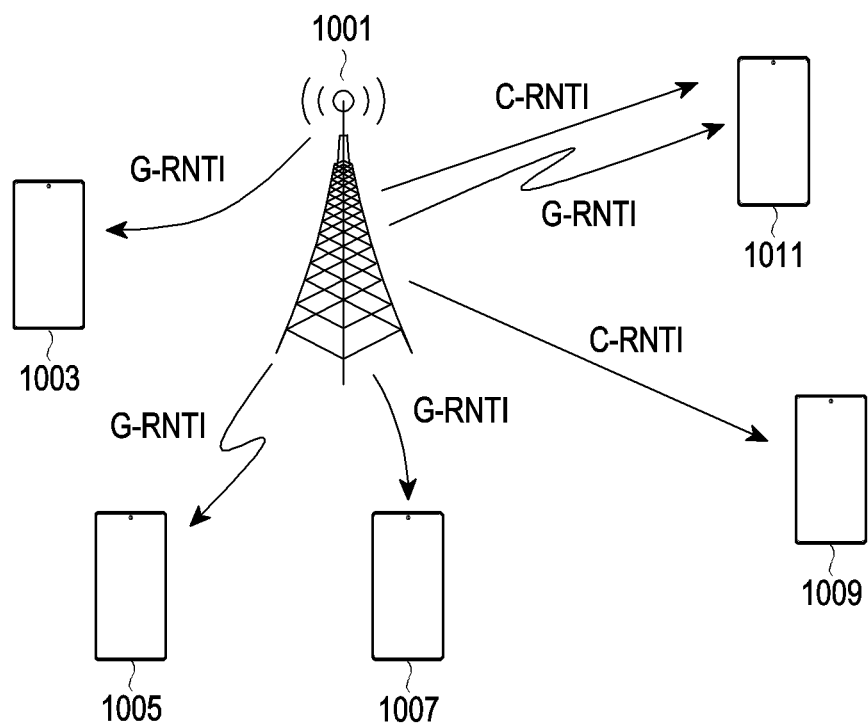
FIG. 10 is a view schematically illustrating an example of a signal transmission/reception scheme for a groupcast service in a wireless communication system according to an embodiment of the disclosure.

FIG. 10 is a view schematically illustrating an example of a signal transmission/reception scheme for a groupcast service in a wireless communication system according to an embodiment of the disclosure.

An example of groupcast in which a base station 1001 transmits the same control information and the same data to a plurality of UEs, e.g., UEs 1003, 1005, 1007, and 1011 is described in connection with FIG. 10. The base station provides G-RNTI, which may be used to receive control information for groupcast, to the UEs 1003, 1005, 1007, and 1011 via a system information block (SIB), preset information, or a preset message. Here, the G-RNTI is a group radio network temporary identifier (G-RNTI).

Each of the UEs 1003, 1005, 1007, and 1011 may receive the G-RNTI transmitted from the base station 1001 and receive control information for groupcast using the G-RNTI. The G-RNTI may be scrambled to a cyclic redundancy identify (CRC) of control information for groupcast, e.g., downlink control information (DCI), and transmitted.

Referring to FIG. 10, a UE 1009 may access the base station 1001 and receive a cell radio network temporary identifier (C-RNTI) from the base station 1001. A UE 1011 may access the base station 1001 and may receive the C-RNTI and G-RNTI for groupcast from the base station 1001.

When the same control information and data are transmitted and one or more UEs may receive the same control information and data may be referred to as groupcast for the control information and data. When C-RNTI or a specific RNTI is received by a UE, e.g., the UE 1009 or the UE 1011 of FIG. 10, and only specific UEs may receive control information and data using the C-RNTI or the specific RNTI may be referred to as unicast for the control information and data.

In various embodiments, the UE may be configured to receive control channel signals and data channel signals for groupcast from transmit end A, and control channel signals and data channel signals for unicast from transmit end B. According to an embodiment, transmit end A and transmit end B may be the same or different transmit ends. In various embodiments, each of transmit end A and transmit end B may be a base station, a vehicle, or a general terminal.

When each of transmit end A and transmit end B is a base station, groupcast data and unicast data may be transmitted from the base station through a Uu link.

When each of transmit end A and transmit end B is a vehicle or a general UE, the groupcast transmission and the unicast transmission may be sidelink transmissions. In this case, each of transmit end A and transmit end B may be a UE operating as a leader node or an anchor node in the group, may perform groupcast transmission for at least one other UE in the group, and may perform the operation of receiving control information from the at least one other UE. According to an embodiment, transmit end A may be a vehicle, and transmit end B may be a base station. Although various embodiments are described under the assumption that transmit end A and transmit end B are a single transmit end, embodiments of the disclosure may also be applied even when transmit end A and transmit end B are different transmit ends.

The UE may receive, from the base station or another UE in the group (here, the other UE in the group may be a leader node), an RNTI (in the following description, it should be noted that the RNTI corresponding to the unique ID may be interchangeably used with, e.g., G-RNTI or group-common RNTI, or group identifier, for receiving control channel signals and data channel signals for groupcast) corresponding to a unique identifier (ID) for receiving control channel signals and data channel signals for groupcast. The UE may receive a control channel signal for groupcast using the G-RNTI, and may receive a data channel signal based on the control channel signal for groupcast.

In various embodiments, control channel for data scheduling may be interchangeably used with physical downlink control channel (PDCCH) or a physical sidelink control channel (PSCCH), data channel may be interchangeably used with physical downlink shared channel (PDSCH) or physical sidelink shared channel (PSSCH), and feedback channel may be interchangeably used with physical uplink control channel (PUCCH) or PSCCH. According to various embodiments, although control information for scheduling, received by the UE, is assumed to be DCI as an example, the control information for scheduling may be implemented in other various forms than DCI.

A configuration of a bandwidth part (BWP) in a 5G communication system is described below in detail. For ease of description, it should be noted that the terms "bandwidth part" and "BWP" are interchangeably used below.

Figure 11:
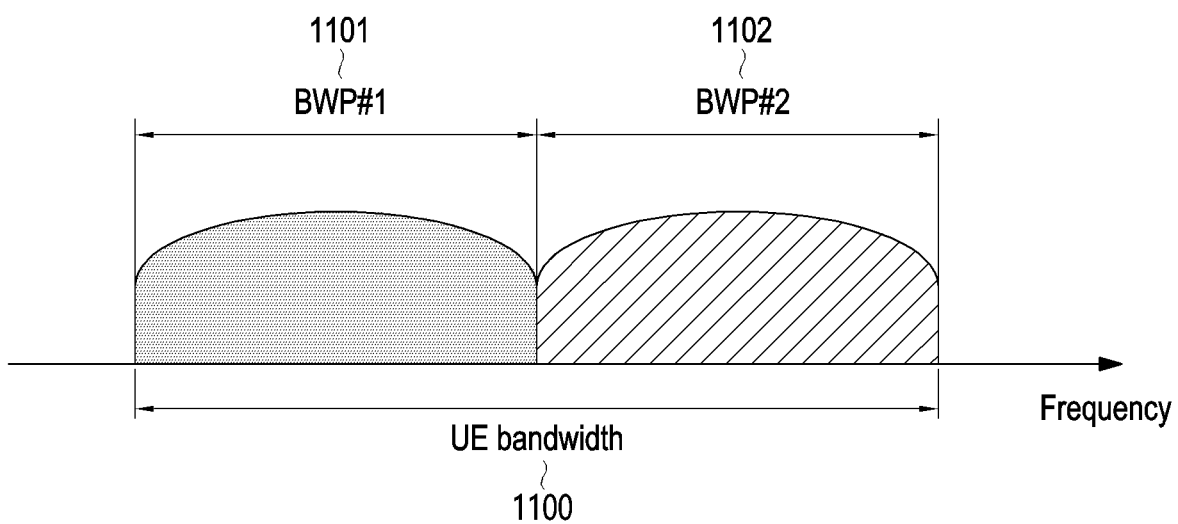
FIG. 11 is a view schematically illustrating a structure of a bandwidth part in a wireless communication system according to an embodiment of the disclosure.

FIG. 11 is a view schematically illustrating a structure of a bandwidth part in a wireless communication system according to an embodiment of the disclosure.

It should be noted that the structure of the bandwidth part shown in FIG. 11 is an example configuration of the bandwidth part of the 5G communication system.

Referring to FIG. 11, it illustrates an example in which a UE bandwidth 1100 is divided into two bandwidth parts, e.g., bandwidth part #1 (BWP #1) 1101 and bandwidth part #2 (BWP #2) 1102. The base station may configure one or more bandwidth parts in the UE and may configure information as shown in Table 21 below, for each bandwidth part.

TABLE 21

| BWP ::= | SEQUENCE { |
| bwp-Id | BWP-Id, |
| (Bandwidth part identifier) | |
| locationAndBandwidth | INTEGER (1..65536), |

TABLE 21-continued

| (Bandwidth part location) | |
| subcarrierSpacing | ENUMERATED {n0, n1, n2, n3, n4, n5}, |
| (Subcarrier spacing) | |
| cyclicPrefix | ENUMERATED { extended } |
| (Cyclic prefix) | |
| } | |

In Table 21, "locationAndBandwidth" denotes the position and bandwidth in the frequency domain of the corresponding bandwidth part, "cyclicPrefix" denotes whether an extended cyclic prefix (CP) is used for the bandwidth part, and "subcarrierSpacing" denotes the subcarrier spacing (SC) to be used in the bandwidth part.

Various embodiments are not limited to the examples illustrated in FIG. 11 and Table 21, and in addition to the configuration information, various bandwidth-related parameters may be configured in the UE. The information may be delivered by the base station to the UE through higher layer signaling, e.g., radio resource control (RRC) signaling. At least one bandwidth part among one or more bandwidth parts configured in the UE may be activated. Whether to activate the bandwidth parts configured in the UE may be transmitted semi-statically by the base station to the UE through RRC signaling or dynamically through downlink control information (DCI).

According to an embodiment, before RRC connected, the UE may receive an initial bandwidth part (BWP) for initial access from the base station through a master information block (MIB). Specifically, the UE may receive configuration information for the search space and control resource set (CORESET) in which a PDCCH signal may be transmitted for receiving system information (e.g., remaining system information (RMSI) or system information block 1 (SIB1)) necessary for initial access via the MIB in the initial access phase. In describing various embodiments, the terms "control resource set" and "CORESET" may be used interchangeably.

Each of the control resource set and a search space configured through the MIB may be regarded as an identifier (or identity (ID) 0. The control resource set and the search space configured through the MIB may be a common control resource set and a common search space, respectively. The base station may provide the UE with configuration information, such as frequency allocation information, time allocation information, and numerology for control resource set #0, via the MIB. Further, the base station may provide the UE with configuration information for paging occasion and monitoring period for control resource set #0, i.e., configuration information for search space #0, via the MIB. The UE may regard the frequency range set as control resource set #0 obtained from the MIB, as the initial BWP for initial access. In this case, the identity (ID) of the initial BWP may be regarded as 0.

Meanwhile, the configuration of the bandwidth part supported in 5G may be used for various purposes.

According to an embodiment, when the bandwidth supported by the UE is smaller than the system bandwidth, operations related thereto may be supported through the bandwidth part configuration. For example, as the base station configures the UE with the frequency position of the bandwidth part, the UE may transmit/receive data in a specific frequency position in the system bandwidth.

According to an embodiment, for the purpose of supporting different numerologies, the base station may configure the UE with a plurality of bandwidth parts. For example, to support data transmission/reception using a subcarrier spacing of 15 kHz and a subcarrier spacing of 30 kHz for some UE, the base station may configure the UE with two bandwidths, as subcarrier spacings of 15 kHz and 30 kHz. The different bandwidth parts may be frequency division multiplexed and, when data is transmitted/received at a specific subcarrier spacing, the bandwidth part set as the specific subcarrier spacing may be activated.

According to an embodiment, for the purpose of reducing power consumption of the UE, the base station may configure the UE with bandwidth parts having different sizes of bandwidths. For example, when the UE supports a bandwidth exceeding the threshold bandwidth, e.g., a bandwidth of 100 MHz, and transmits/receives data always using the bandwidth, significant power consumption may occur. In particular, it is very inefficient in terms of power consumption to monitor an unnecessary downlink control channel using a large bandwidth of 100 MHz in a situation where there is no traffic. Therefore, for the purpose of reducing power consumption of the UE, the base station may configure the UE with a relatively small bandwidth, e.g., a bandwidth part less than the threshold bandwidth, e.g., a bandwidth of 20 MHz. In a no-traffic situation, the UE may perform monitoring in the 20 MHz bandwidth and, if data occurs, the UE may transmit/receive data in the 100 MHz bandwidth according to an instruction from the base station.

In a method for configuring a bandwidth part, UEs before RRC connected may receive configuration information for an initial bandwidth via an MIB in the initial access phase. Specifically, the UE may be configured with a control resource set for downlink control channel through which DCI for scheduling system information block (SIB) may be transmitted from the MIB of physical broadcast channel (PBCH). The bandwidth of the control resource set configured via the MIB may be regarded as the initial bandwidth part, and the UE may receive physical downlink shared channel (PDSCH) signals for SIB transmission. The initial bandwidth part may be utilized for other purposes, such as other system information (OSI), paging, and random access, as well as for receiving SIB.

If the UE is configured with one or more bandwidth parts, the base station may instruct the UE to change the bandwidth part using the bandwidth part indicator (field) in the DCI. As an example, when the currently activated bandwidth part of the UE is bandwidth part #1 701 in FIG. 11, the base station may indicate, to the UE, bandwidth part #2 702 with the bandwidth part indicator in the DCI, and the UE may change the bandwidth part to bandwidth part #2 702, indicated with the bandwidth part indicator in the received DCI.

As described above, since DCI-based bandwidth part changing may be indicated by the DCI scheduling PDSCH or physical uplink shared channel (PUSCH), the UE, if receiving a bandwidth part change request, is supposed to be able to receive or transmit the PDSCH signal or PUSCH signal, scheduled by the DCI, in the changed bandwidth part.

To that end, there are specified requirements for delay time $T_{BWP}$ required upon changing bandwidth part, which may be defined as shown in Table 22 below.

TABLE 22

| | NR Slot length | BWP switch delay $T_{BWP}$ (slots) | |
|---|---|---|---|
| μ | (ms) | Type 1[Note 1] | Type 2[Note 1] |
| 0 | 1 | [1] | [3] |
| 1 | 0.5 | [2] | [5] |
| 2 | 0.25 | [3] | [9] |
| 3 | 0.125 | [6] | [17] |

Note 1:
Depends on UE capability.

Note 2:
If the BWP switch involves changing of SCS, the BWP switch delay is determined by the larger one between the SCS before BWP switch and the SCS after BWP switch.

As shown in Table 22, the requirements for the bandwidth part change delay time support type 1 or type 2 according to the UE's capability. The UE may report a supportable bandwidth part delay time type to the base station.

If the UE receives, in slot n, DCI including a bandwidth part change indicator according to the above-described requirements for bandwidth part change delay time, the UE may complete a change to the new bandwidth part, indicated by the bandwidth part change indicator, at a time not later than slot $n+T_{BWP}$, and may perform transmission/reception on the data channel scheduled by the DCI in the changed, new bandwidth part. Upon scheduling data channel in the new bandwidth part, the base station may determine time domain resource allocation for data channel considering the UE's bandwidth part change delay time $T_{BWP}$. In other words, in determining the time domain resource allocation for a data channel when scheduling data channel with the new bandwidth part, the base station may schedule a time after the bandwidth part change delay, for the data channel. Thus, the UE may not expect that the DCI indicating the bandwidth part change indicates a slot offset (K0 or K2) smaller than the bandwidth part change delay time $T_{BWP}$.

If the UE receives DCI (e.g., DCI format 1_1 or 0_1) indicating a bandwidth part change, the UE may perform no transmission or reception operation during a time interval from the third symbol of the slot when the PDCCH signal including the DCI is received to the start time of the slot indicated as the slot offset (K0 or K2) indicated in the time domain resource allocation indicator field in the DCI. For example, if the UE receives the DCI indicating a bandwidth part change in slot n, and the slot offset value indicated by the DCI is K, the UE may perform no transmission or reception operation from the third symbol of slot n to a symbol before slot n+K (i.e., the last symbol of slot n+K−1).

A method for allocating frequency domain resources for a data channel in a 5G communication system is described.

5G supports two types, e.g., resource allocation type 0 and resource allocation type 1, as methods for indicating frequency domain resource allocation information for a downlink data channel, e.g., PDSCH, and an uplink data channel, e.g., PUSCH.

Resource Allocation Type 0

RB allocation information may be provided from the base station to the UE in the form of a bitmap for a resource block group (RBG). In this case, the RBG may be composed of a set of contiguous virtual RBs, and the size P of the RBG may be determined based on a value set as a higher layer parameter (rbg-Size) and the bandwidth part size defined in Table 23 below.

TABLE 23

| Bandwidth Part Size | Configuration 1 | Configuration 2 |
|---|---|---|
| 1-36 | 2 | 4 |
| 37-72 | 4 | 8 |

TABLE 23-continued

| Bandwidth Part Size | Configuration 1 | Configuration 2 |
|---|---|---|
| 73-144 | 8 | 16 |
| 145-275 | 16 | 16 |

The total number $N_{RBG}$ of RBGs of bandwidth part i whose size is $N_{BWP}^{size}$ may be defined as in Equation 5 below.

$$N_{RBG}=\lceil N_{BWP,i}^{size}+(N_{BWP,i}^{start} \bmod P))/P \rceil \quad \text{Equation 5}$$

Here, when the size of the first RBG is $RBC_0^{size}=P-N_{BWP,i}^{start} \bmod P$, the size of the last RBG is $(N_{BWP,i}^{start}+N_{BWP,i}^{size}) \bmod P>0$, $RBC_0^{size}=(N_{BWP,i}^{start}+N_{BWP,i}^{size}) \bmod P$, and the sizes of the remaining RBGs are all P.

Each bit included in the $N_{RBG}$ bit-size bitmap may correspond to a respective RBG. For example, the RBGs may be indexed in ascending order of frequency, starting from the position of lowest position of the bandwidth part. For $N_{RBG}$ RBGs in the bandwidth part, RBG #0 to RBG #($N_{RBG}-1$) may be mapped to the most significant bit (MSB) to the least significant bit (LSB) of the RBG bitmap. When a specific bit value in the bitmap is, e.g., 1, the UE may determine that an RBG corresponding to the bit value has been assigned and, when the specific bit value in the bitmap is, e.g., 0, the UE may determine that no RBG is assigned corresponding to the bit value.

Resource Allocation Type 1

RB allocation information may be provided from the base station to the UE, as information for the start position and length for the VRBs contiguously assigned. In this case, interleaving or non-interleaving may be further applied to the contiguously assigned VRBs. The resource allocation field of resource allocation field type 1 may be configured with a resource indication value (RIV), and the RIV may be composed of the start position ($RB_{start}$) of the VRBs and the length ($L_{RBS}$) of the contiguously allocated RBs. Specifically, the RIV in the bandwidth part of the $N_{BWP}^{size}$ size may be defined as in Equation 6 below.

if $(L_{RBs}-1) \leq \lfloor N_{BWP}^{size}/2 \rfloor$ then $RIV=N_{BWP}^{size}(L_{RBs}-1)+RB_{start}$ else $RIV=N_{BWP}^{size}(N_{BWP}^{size}-L_{RBs}+1)+(N_{BWP}^{size}-1-RB_{start})$ where $L_{RBs} \geq 1$ and shall not exceed $N_{BWP}^{size}-RB_{start}$ Equation 6

The base station may configure the UE with a resource allocation type through higher layer signaling (e.g., the higher layer parameter resourceAllocation may be set to one of resourceAllocationType0, resourceAllocationType1, or dynamicSwitch). If the UE is configured with both resource allocation types 0 and 1 (or if the higher layer parameter resourceAllocation is set to dynamicSwitch in the same way), it may be indicated whether the bit corresponding to the MSB of the field indicating resource allocation in the DCI format indicating scheduling is resource allocation type 0 or resource allocation type 1, resource allocation information may be indicated via the remaining bits except for the bit corresponding to the MSB based on the indicated resource allocation type and, based thereupon, the UE may interpret the resource allocation field information for the DCI field. If the UE is configured with either resource allocation type 0 or resource allocation type 1 (or if the higher layer parameter resourceAllocation is set to either resourceAllocationType0 or resourceAllocationType1 in the same manner), resource allocation information may be indicated based on the resource allocation type in which a field is configured indicating the resource allocation in the DCI format indicating scheduling and, based thereupon, the UE may interpret the resource allocation field information for the DCI field.

Downlink control channels of the 5G communication system are described below.

Figure 12:
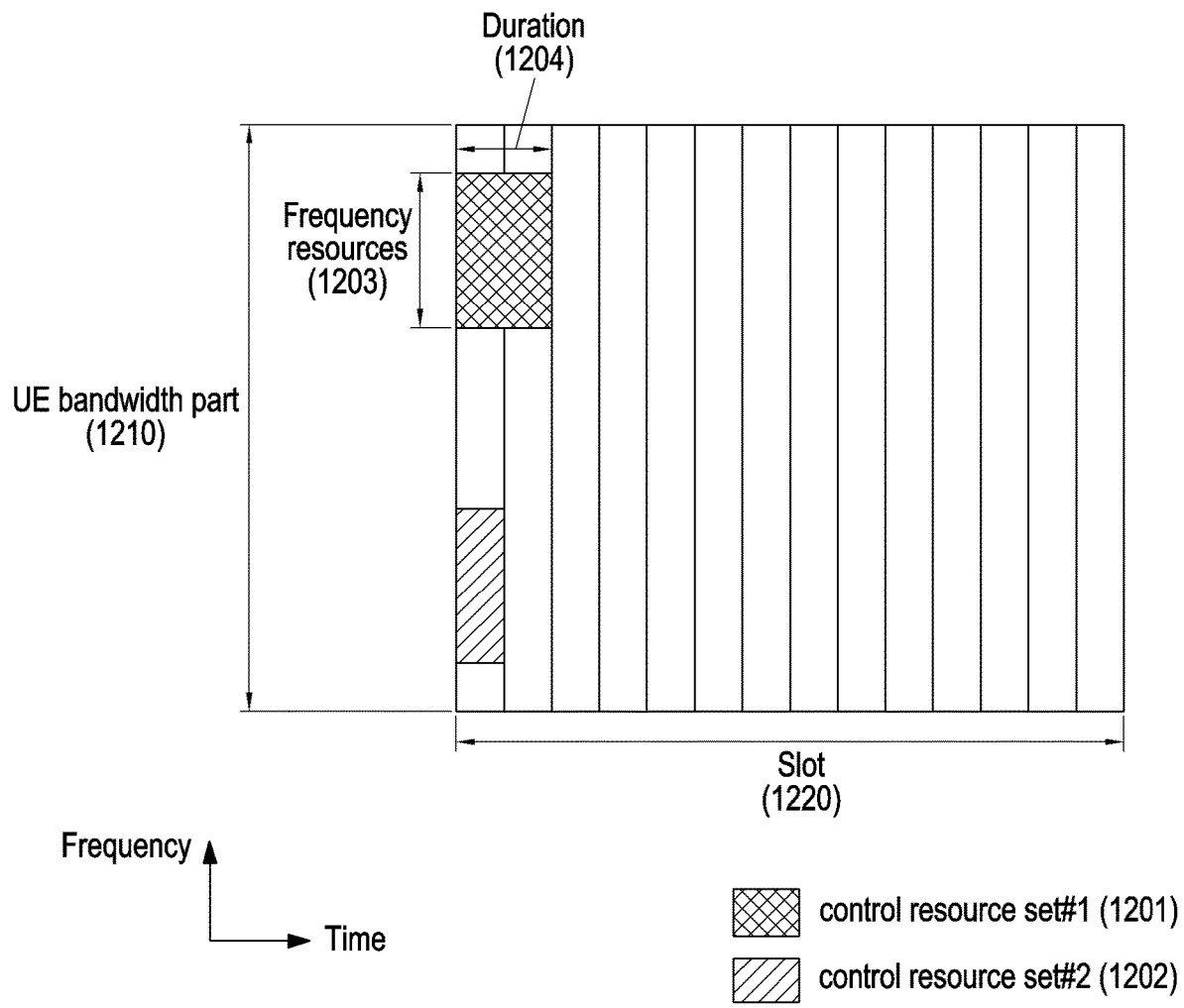
FIG. 12 is a view schematically illustrating a structure of a control resource set in a wireless communication system according to an embodiment of the disclosure.

FIG. 12 is a view schematically illustrating a structure of a control resource set in a wireless communication system according to an embodiment of the disclosure.

Specifically, referring to FIG. 12, it illustrates an example control resource set in which a downlink control channel is transmitted in a 5G wireless communication system. FIG. 12 illustrates an example in which a UE bandwidth part 1210 is configured on the frequency axis, and two control resource sets (control resource set #1 1201 and control resource set #2 1202) are configured in one slot 1220 on the time axis. The control resource sets may be configured in specific frequency resources of the entire UE bandwidth part 1210 on the frequency axis. In the example shown in FIG. 12, a specific frequency resource 1203 is configured in control resource set #1 1201. The control resource set may be composed of one or more OFDM symbols on the time axis, which may be defined as control resource set duration 1204.

Referring to FIG. 12, control resource set #1 1201 is configured with a control resource set duration of two symbols, and control resource set #2 1202 is configured with a control resource set duration of one symbol.

As described above, in 5G, a control resource set may be configured by higher layer signaling (e.g., system information, MIB, or RRC signaling) or DCI from the base station to the UE. Configuring the UE with a control resource set means providing the UE with information such as a control resource set identity, frequency position of the control resource set, and symbol length of the control resource set.

Configuration information for the control resource set may include, e.g., information shown in Table 24 below.

TABLE 24

| | |
|---|---|
| ControlResourceSet ::= | SEQUENCE { |
| -- Corresponds to L1 parameter 'CORESET-ID' | |
| controlResourceSetId | |
| ControlResourceSetId, | |
| (Control Resource Set Identity) | |
| frequencyDomainResources | BIT STRING (SIZE (45)), |
| (Frequency domain resources allocation information) | |
| duration | INTEGER |
| (1..maxCoReSetDuration), | |
| (Time domain resources allocation information) | |
| cce-REG-MappingType | CHOICE { |
| (CCE -to -REG mapping type) | |

TABLE 24-continued

```
    interleaved
SEQUENCE {
        reg-BundleSize
    ENUMERATED {n2, n3, n6}
    REG bundle size)
        precoderGranularity
    ENUMERATED {sameAsREG-bundle, allContiguousRBs},
        interleaverSize
    ENUMERATED {n2, n3, n6}
        (interleaver size)
        shiftIndex
    INTEGER (0..maxNrofPhysicalResourceBlocks-1)
        OPTIONAL
        (interleaver shift)
    },
    nonInterleaved                                NULL
    },
    tci-StatesPDCCH
    SEQUENCE(SIZE (1..maxNrofTCI-StatesPDCCH) ) OF TCI-StateId
        OPTIONAL,
    (QCL configuration information)
    tci-PresentInDCI                          ENUMERATED
{enabled}
OPTIONAL, -- Need S
}
```

In Table 24, tci-StatesPDCCH (referred to as transmission configuration indication (TCI) state for convenience of description) configuration information may include information for one or more synchronization signal (SS)/physical broadcast channel (PBCH) block (i.e., synchronization signal block (SSB)) indexes or channel state information reference signal (CSI-RS) index quasi-co-located (QCLed) with the demodulation reference signal (DMRS) transmitted in the corresponding control resource set.

A resource structure in a wireless communication system is described below with reference to FIG. 13 according to an embodiment of the disclosure.

Figure 13:
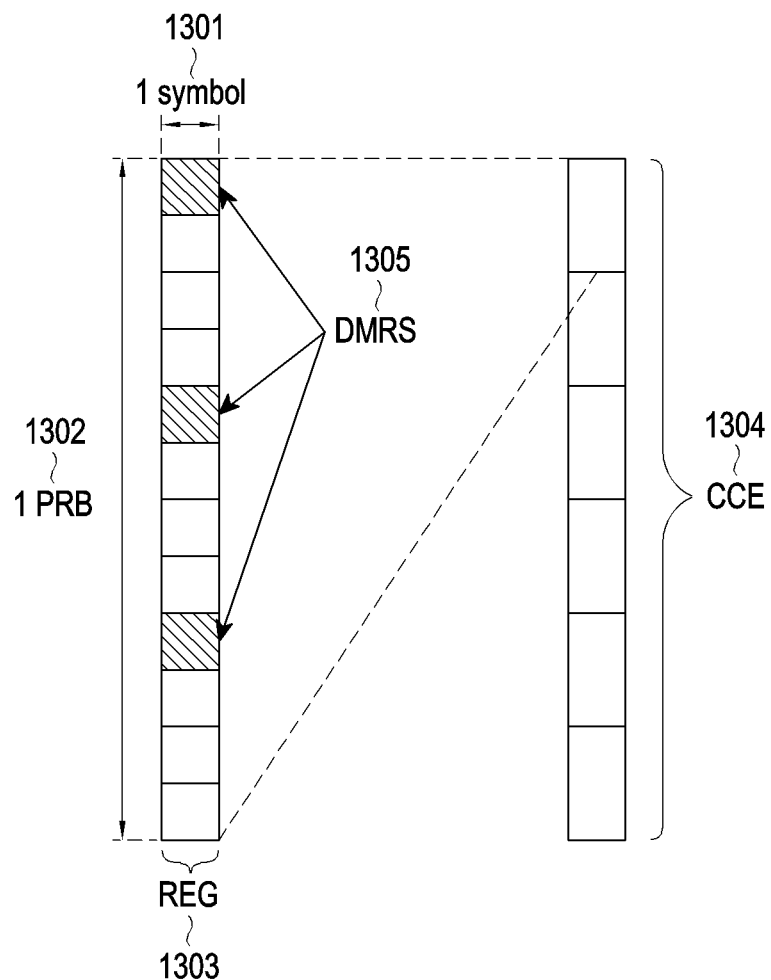
FIG. 13 is a view schematically illustrating a resource structure in a wireless communication system according to an embodiment of the disclosure.

FIG. 13 is a view schematically illustrating a resource structure in a wireless communication system according to an embodiment of the disclosure.

Specifically, FIG. 13 illustrates an example basic unit of time and frequency resources constituting a downlink control channel that may be used in 5G.

Referring to FIG. 13, the basic unit of time and frequency resources constituting the downlink control channel (e.g., PDCCH) may be referred to as a REG 1303, and the REG 1303 may be defined with one OFDM symbol 1301 on the time axis and with one physical resource block (PRB) 1302, i.e., 12 subcarriers, on the frequency axis. The base station may configure a downlink control channel allocation unit by concatenating REGs 1303.

Referring to FIG. 13, when the basic unit for allocating a downlink control channel in 5G is referred to as a control channel element (CCE) 1304, one CCE 1304 may be composed of a plurality of REGs 1303. For example, referring to FIG. 13, the REG 1303 may be composed of 12 REs and, if one CCE 1304 is composed of, e.g., 6 REGs 1303, one CCE 1304 may be composed of 72 REs. If a downlink control resource set is configured, the corresponding region may be composed of a plurality of CCEs 1304, and a specific downlink control channel may be mapped to one or more CCEs 1304 depending on the aggregation level (AL) in the control resource set and transmitted. The CCEs 1304 in the control resource set are distinguished with numbers, and in this case, the numbers of the CCEs 1304 may be assigned according to a logical mapping scheme.

Referring to FIG. 13, the basic unit, i.e., the REG 1303, of the download control channel may contain REs to which the DCI is mapped and the region to which the DMRS 1305, a reference signal for decoding the REs, is mapped. Referring to FIG. 13, three DMRSs 1305 may be transmitted in one REG 1303, for example. The number of CCEs necessary to transmit a PDCCH signal may be 1, 2, 4, 8, or 16 depending on the aggregation level, and different numbers of CCEs may be used to implement link adaptation of downlink control channel. For example, if AL=L, one downlink control channel may be transmitted via L CCEs. The UE needs to detect a signal while being unaware of information for downlink control channel and, for blind decoding, a search space is defined which indicates a set of CCEs. The search space is a set of candidate control channels constituted of CCEs that the UE needs to attempt to decode on the given aggregation level, and since there are several aggregation levels to bundle up 1, 2, 4, 8, or 16 CCEs, the UE has a plurality of search spaces. A search space set (Set) may be defined as a set of search spaces at all set aggregation levels.

Search spaces may be classified into a common search space and a UE-specific search space. A predetermined group of UEs or all the UEs may investigate the common search space of the PDCCH to receive cell-common control information, e.g., paging message, or dynamic scheduling for system information. For example, PDSCH scheduling allocation information for transmitting an SIB containing, e.g., cell service provider information may be received by investigating the common search space of the PDCCH. In the case of the common search space, since a certain group of UEs or all the UEs need receive the PDCCH signal, it may be defined as a set of CCEs previously agreed on. Scheduling allocation information for the UE-specific PDSCH or PUSCH may be received by inspecting the UE-specific search space of PDCCH. The UE-specific search space may be UE-specifically defined with a function of various system parameters and the identification information (identity) for the UE.

In 5G, the parameters for the search space for the PDCCH may be configured in the UE by the base station through higher layer signaling (e.g., SIB, MIB, or RRC signaling). For example, the base station may configure the UE with, e.g., the number of PDCCH candidates at each aggregation level L, monitoring period for search space, monitoring occasion of symbol unit in slot for search space, search space type (common search space or UE-specific search space), combination of RNTI and DCI format to be monitored in the search space, and control resource set index to be monitored in the search space. For example, configuration information for the search space for the PDCCH may include information as shown in Table 25.

TABLE 25

```
SearchSpace ::=                              SEQUENCE {
    -- Identity of the search space. SearchSpaceId = 0 identifes the
SearchSpace configured via PBCH (MIB) or ServingCellConfigCommon.
    searchSpaceId                            SearchSpaceId,
    (search space ID)
    controlResourceSetId
    ControlResourceSetId,
    (control resource set ID)
    monitoringSlotPeriodicityAndOffset       CHOICE {
    (monitoring slot periodicity and offset)
        sl1
        NULL,
        s12
        INTEGER (0..1),
        s14
        INTEGER (0..3),
        s15
        INTEGER (0..4),
        s18
        INTEGER (0..7),
        sl10
        INTEGER (0..9),
        s116
        INTEGER (0..15),
        s120
        INTEGER (0..19)
    }
                                             OPTIONAL,
    duration(monitoring length)              INTEGER (2..2559)
    monitoringSymbolsWithinSlot              BIT STRING
(SIZE (14)),
                                             OPTIONAL,
    (monitoring symbols within slot)
    nrofCandidates                           SEQUENCE {
    (number of PDCCH candidates per aggregation level)
        aggregationLevel1                    ENUMERTED
{n0, n1, n2, n3, n4, n5, n6, n8},
        aggregationLevel2                    ENUMERATED
{n0, n1, n2, n3, n4, n5, n6, n8},
        aggregationLevel4                    ENUMERATED
{n0, n1, n2, n3, n4, n5, n6, n8},
        aggregationLevel8                    ENUMERATED
{n0, n1, n2, n3, n4, n5, n6, n8},
        aggregationLevel16                   ENUMERATED
{n0, n1, n2, n3, n4, n5, n6, n8},
    },
    searchSpaceType                          CHOICE {
    (search space type)
    -- Configures this search space as common search space (CSS) and
DCI formats to monitor.
    common
    SEQUENCE {
    (common search space)
    }
    ue-Specific
    SEQUENCE {
    (UE-specific search space)
    -- Indicates whether the UE monitors in this USS for DCI
formats 0-0 and 1-0 or for formats 0-1 and 1-1.
        formats
        ENUMERATED {formats0-0-And-1-0, formats0-1-And-1-1 },
        . . .
    }
}
```

According to the configuration information as shown in Table 25, the base station may configure the UE with one or more search space sets. According to an embodiment, the base station may configure the UE with search space set 1 and search space set 2 and configure it to monitor DCI format A, scrambled to X-RNTI in search space set 1, in the common search space and to monitor DCI format B, scrambled to Y-RNTI in search space set 2, in the UE-specific search space. In the X-RNTI and Y-RNTI, "X" and "Y" may correspond to one of various RNTIs to be described below.

According to the configuration information shown in Table 25, one or more search space sets may be present in the common search space or the UE-specific search space. For example, search space set #1 and search space set #2 may be configured in the common search space, and search space set #3 and search space set #4 may be configured in the UE-specific search space.

In the common search space, a combination of DCI format and RNTI as follows may be monitored. It should be noted that various embodiments are not limited to the following examples.

DCI format 0 0/1 0 with CRC scrambled by C-RNTI, CS-RNTI, MCS-C-RNTI, SP-CSI-RNTI, RA-RNTI, TC-RNTI, P-RNTI, or SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, or TPC-PUCCH-RNTI DCI format 2 3 with CRC scrambled by TPC-SRS-RNTI In the UE-specific search space, a combination of DCI format and RNTI as follows may be monitored. It should be noted that various embodiments are not limited to the following examples.

DCI format 0 0/1 0 with CRC scrambled by C-RNTI, CS-RNTI, or TC-RNTI

DCI format 1 0/1 1 with CRC scrambled by C-RNTI, CS-RNTI, or TC-RNTI

The RNTIs specified herein may be defined and used as follows.

C-RNTI (Cell RNTI): for scheduling UE-specific PDSCH

Modulation coding scheme C-RNTI (MCS-C-RNTI): for scheduling UE-specific PDSCH

Temporary cell RNTI (TC-RNTI): for scheduling UE-specific PDSCH

Configured scheduling RNTI (CS-RNTI): for scheduling semi-statically configured UE-specific PDSCH Random access RNTI (RA-RNTI): for scheduling PDSCH in the random access phase Paging RNTI (P-RNTI): for scheduling PDSCH where paging is transmitted System information RNTI (SI-RNTI): for scheduling PDSCH where system information is transmitted Interruption RNTI (INT-RNTI): for indicating whether to puncture PDSCH Transmit power control for PUSCH RNTI (TPC-PUSCH-RNTI): for indicating power control command for PUSCH Transmit power control for PUCCH RNTI (TPC-PUCCH-RNTI): for indicating power control command for PUCCH Transmit power control for SRS RNTI (TPC-SRS-RNTI): for indicating power control command for SRS According to various embodiments, DCI formats may be defined as shown in Table 26 below.

TABLE 26

| DCI format | Usage |
| --- | --- |
| 0_0 | Scheduling of PUSCH n one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

Meanwhile, in 5G, the search space of the aggregation level L in the control resource set p and the search space set s may be represented as Equation 7 below.

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \mod \lfloor N_{CCE,p} / L \rfloor \right\} + i \qquad \text{Equation 7}$$

L: aggregation level
$n_{CI}$: carrier index
$N_{CCE,p}$: the total number of CCEs present in the control resource set p
$n_{s,f}^{\mu}$: slot index
$M_{p,s,max}^{(L)}$: the number of PDCCH candidates of aggregation level L
$m_{s,n_{CI}} = 0, \ldots, M_{p,s,max}^{(L)} - 1$: PDCCH candidate index of aggregation level L
i=0, ..., L-1
$Y_{p,n_{s,f}^{\mu}} = (A_p \cdot Y_{p,n_{s,f}^{\mu}-1}) \mod D$, $Y_{p_i-1} = n_{RSN} \neq 0$, $A_0 = 39827$, $A_1 = 39829$, $A_2 = 39839$,
D=6553
$n_{RNTI}$: UE identifier In Equation 7 above, $Y_{p,n_{s,f}^{\mu}}$ may be 0 in the case of the common search space.

In the case of the UE-specific search space, $Y_{p,n_{s,f}^{\mu}}$ may be a value that changes depending on the UE's identity (C-RNTI or ID configured in the UE by the base station) and the time index.

Discontinuous reception (DRX) in a wireless communication system according to an embodiment is described with below reference to FIG. 14.

Figure 14:
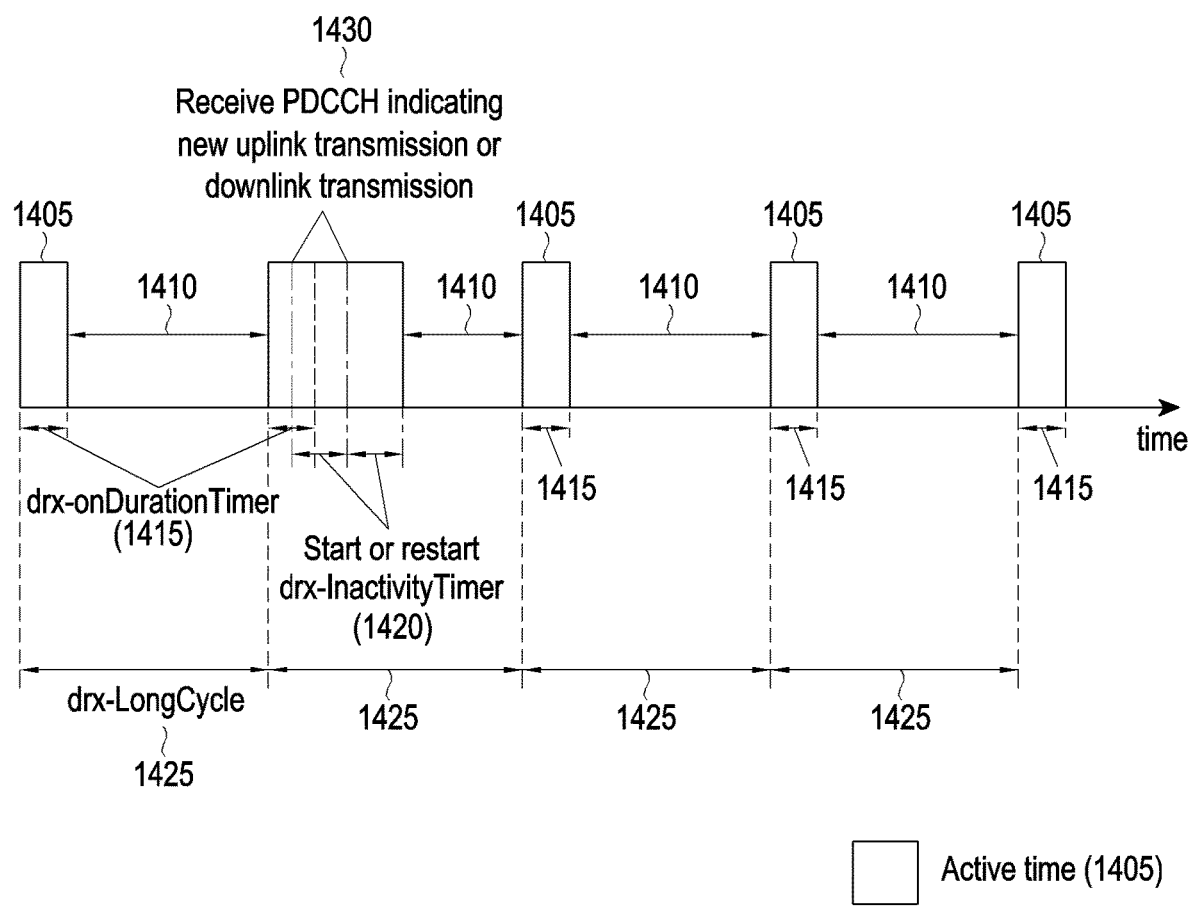
FIG. 14 is a view schematically illustrating a DRX operation in a wireless communication system according to an embodiment of the disclosure.

FIG. 14 is a view schematically illustrating a DRX operation in a wireless communication system according to an embodiment of the disclosure.

Specifically, DRX is an operation in which a UE using a service discontinuously receives data in an RRC connected state in which a radio link is established between a base station and the UE. DRX is also referred to as DRX in RRC connected state (i.e., C-DRX).

When DRX is applied, the UE turns on the receiver at a specific time to monitor control channel, and if there is no data received for a certain period of time, turns off the receiver to reduce power consumption of the UE. DRX may be controlled by a medium access control (MAC) layer device based on various parameters and timers.

Referring to FIG. 14, an active time 1405 is a time during which the UE wakes up every DRX cycle and monitors PDCCH. The active time 1405 may be defined as follows.
   drx-onDurationTimer or drx-InactivityTimer or drx-RetransmissionTimerDL or drx-RetransmissionTimerUL or ra-ContentionResolutionTimer is running, or
   a scheduling request is sent on PUCCH and is pending, or
   A PDCCH indicating a new transmission addressed to the C-RNTI of the MAC entity has not been received after successful reception of a Random Access Response for the Random Access Preamble not selected by the MAC entity among the contention-based Random Access Preamble.

The DRX-related timers, such as drx-onDurationTimer, drx-InactivityTimer, drx-RetransmissionTimerDL, drx-RetransmissionTimerUL, and ra-ContentionResolutionTimer, are timers whose values are set by the base station, and have the function of configuring the UE to monitor PDCCH in the circumstance where a predetermined condition is met.

Further, the drx-onDurationTimer 1415 is a parameter for setting a minimum time during which the UE is awake in the DRX cycle. The drx-InactivityTimer 1420 is a parameter for setting an additional time during which the UE is awake when a PDCCH indicating new uplink transmission or downlink transmission is received (1430). The drx-RetransmissionTimerDL is a parameter for setting a maximum time during which the UE is awake to receive downlink retransmission in the downlink HARQ procedure. The drx-RetransmissionTimerUL is a parameter for setting a maximum time during which the UE is awake to receive an uplink retransmission grant in the uplink HARQ procedure. The above-described drx-onDurationTimer, drx-InactivityTimer, drx-RetransmissionTimerDL and drx-RetransmissionTimerUL may be set as, e.g., time, number of subframes, number of slots, and the like. The ra-ContentionResolutionTimer is a parameter for monitoring PDCCH in the random access procedure.

The inActive time 1410 is a time set to allow the UE not to monitor PDCCH while performing DRX or a time set not to receive a PDCCH and may be the rest of the entire time during which DRX is performed, except for the active time 1405. If the UE does not monitor PDCCH during the active time 1405, the UE may enter a sleep or inactive state to reduce power consumption.

The DRX cycle means a cycle in which the UE wakes up and monitors PDCCH. In other words, the DRX cycle means a time interval from when the UE monitors a PDCCH to when the UE monitors a next PDCCH or an occurrence cycle of on-duration. There are two types of DRX cycles: a short DRX cycle and a long DRX cycle. The short DRX cycle may be optionally applied.

The long DRX cycle 1425 is the longer of the two DRX cycles configured in the UE. The UE starts the drx-onDurationTimer 1415 again, the long DRX cycle 1425 after the start point (e.g., start symbol) of the drx-onDurationTimer 1415 while operating in the long DRX cycle. When operating in the long DRX cycle 1425, the UE may start the drx-onDurationTimer 1415 in a slot after drx-SlotOffset in a subframe meeting Equation 8 below. Here, the drx-SlotOffset means a delay before starting the drx-onDurationTimer 1415. The drx-SlotOffset may be set to, e.g., time or number of slots, and the like.

$$[(SFN \times 10) + \text{subframe number}] \text{modulo}(\text{drx-Long-Cycle}) = \text{drx-StartOffset} \qquad \text{Equation 8}$$

Here, the drx-LongCycleStartOffset may include the long DRX cycle 1425 and the drx-StartOffset, and may be used to define a subframe where the long DRX cycle 1425 starts. The drx-LongCycleStartOffset may be set as, e.g., time, number of subframes, number of slots, and the like.

The short DRX cycle is the shorter of two DRX cycles defined in the UE. The UE operates in the long DRX cycle 1425 and, if a predetermined event, e.g., reception 1430 of a PDCCH indicating new uplink transmission or downlink transmission, in the active time 1405, the UE starts or restarts the drx-InactivityTimer 1420 and, if the drx-InactivityTimer 1420 expires or a DRX command MAC CE is received, the UE may operate in the short DRX cycle.

For example, in FIG. 14, the UE may start the drx-ShortCycleTimer at the time of expiration of the previous drx-onDurationTimer 1415 or drx-InactivityTimer 1420 and may operate in the short DRX cycle until the drx-ShortCycleTimer expires. When the UE receives (1430) a PDCCH indicating new uplink transmission or downlink transmission, the UE may extend the active time 1405 or delay arrival of the inActive time 1410 in anticipation of future additional uplink transmission or downlink transmission. While operating in the short DRX cycle, the UE restarts the drx-onDurationTimer 1415, the short DRX cycle after the start point of the previous On duration. Thereafter, when the drx-ShortCycleTimer expires, the UE operates back in the long DRX cycle 1425.

When operating in the short DRX cycle, the UE may start the drx-onDurationTimer 1415 after drx-SlotOffset in a subframe meeting Equation 9 below. Here, the drx-SlotOffset means a delay before starting the drx-onDurationTimer 1415. The drx-SlotOffset may be set to, e.g., time or number of slots, and the like.

$$[(SFN \times 10) \text{subframe number}] \text{modulo}(drx\text{-}ShortCycle) = drx\text{-}StartOffset) \text{modulo}(drx\text{-}ShortCycle) \quad \text{Equation 9}$$

Here, the drx-ShortCycle and the drx-StartOffset may be used to define a subframe where the short DRX cycle starts. The drx-ShortCycle and drx-StartOffset may be set as, e.g., time, number of subframes, or number of slots.

DRX has been described above in connection with FIG. 14 according to various embodiments. According to an embodiment, the UE may reduce its power consumption by performing DRX. However, even when the UE performs DRX, the UE does not always receive the PDCCH associated with the UE in the active time 1405. Accordingly, according to an embodiment, a signal for controlling the operation of the UE may be provided to more efficiently save power of the UE.

A carrier aggregation and scheduling method in a 5G communication system is described below in detail.

The UE may access a primary cell (PCell) through initial access, and the base station may additionally configure the UE with one or more secondary cells (SCells). It should be noted that in various embodiments, primary cell and PCell may be used interchangeably, and secondary cell and SCell may be used interchangeably. The UE may perform communication through serving cells including the primary cell and secondary cells configured by the base station.

The base station may additionally configure whether to perform cross-carrier scheduling on the cells configured in the UE. For convenience of description, when cross-carrier scheduling is configured, cells performing scheduling (i.e., cells receiving downlink control information corresponding to downlink assignment or uplink grant) are collectively referred to as a "first cell," and a cell in which scheduling is performed (that is, a cell in which downlink or uplink data is actually scheduled and transmitted/received based on downlink control information) is referred to as a "second cell." If the UE is configured with cross-carrier scheduling for a specific cell A (scheduled cell) by the base station (in this case, cell A corresponds to the "second cell"), the UE does not perform PDCCH monitoring on cell A in cell A but may perform in another cell B indicated by the cross-carrier scheduling, i.e., the scheduling cell (in this case, cell B corresponds to the "first cell.").

To configure the UE with cross-carrier scheduling, the base station may configure the UE with information for the "first cell" performing scheduling on the "second cell" (e.g., the cell index of the "first cell") and the carrier indicator field (CIF) value for the "second cell." For example, the configuration information set forth in Table 27 below may be provided from the base station to the UE through higher layer signaling (e.g., RRC signaling).

TABLE 27

| | |
|---|---|
| CrossCarrierSchedulingConfig ::= | SEQUENCE { |
| schedulingCellInfo | CHOICE { |
| own (self carrier scheduling) | SEQUENCE { - |
| - No cross carrier scheduling | |
| cif-Presence | BOOLEAN |
| }, | |
| other (cross carrier scheduling) | SEQUENCE { - |
| - Cross carrier scheduling | |
| schedulingCellId | ServCellIndex, |
| (scheduling cell index) | |
| cif-InSchedulingCell | INTEGER (1..7) |
| (CIF value) | |
| } | |
| }, | |
| ... | |
| } | |

The UE may monitor the PDCCH for the cell configured by cross-carrier scheduling in a "first cell". The UE may determine the index of the cell scheduled by the DCI received from the value of the carrier indicator field in the DCI format scheduling data, and based thereupon, may transmit/receive data in the cell indicated by the carrier indicator.

The scheduled cell (cell A) and the scheduling cell (cell B) may be configured with different numerologies. The numerology may include a subcarrier spacing, a cyclic prefix, and the like. In a case where cell A and cell B have different numerologies, when the PDCCH of cell B schedules the PDSCH of cell A, the following minimum scheduling offset between the PDCCH and the PDSCH may be additionally considered.

Cross-Carrier Scheduling Method (1) If the subcarrier spacing (μB) of cell B is smaller than the subcarrier spacing (μA) of cell A, a PDSCH may be scheduled from a next PDSCH slot which is X symbols after the last symbol of the PDCCH received from cell B. Here, X may differ depending on μB, and may be defined as X=4 symbols when μB=15 kHz, X=4 symbols when μB=30 kHz, and X=8 symbols when pB=60 kHz.

(2) If the subcarrier spacing (μB) of cell B is larger than the subcarrier spacing (μA) of cell A, a PDSCH may be scheduled from a time, X symbols after the last symbol of the PDCCH received from cell B. Here, X may differ depending on μB, and may be defined as X=4 symbols when μB=30 kHz, X=8 symbols when μB=60 kHz, and X=12 symbols when μB=120 kHz.

Described below in detail is a method for configuring a transmission configuration indication (TCI) state, which is a means for indicating or exchanging quasi co-location (QCL) information between a UE and a base station in a 5G communication system.

The base station may configure and indicate a TCI state between two different reference signals (RSs) or channels via proper signaling, announcing the QCL relationship between the different RSs or channels. Further, the base station may configure and indicate the TCI state for the PDCCH (or PDCCH DMRS) through appropriate signaling. The TCI state is intended for announcing a quasi co-location (QCL) relationship between different RSs or channels and PDCCH (or PDCCH DMRS). When different RS or channels are QCLed, this means that, in estimating channel via reference antenna port A (reference RS #A) and RS antenna port B (target RS #B), which have a QCL relationship, the UE is allowed to apply all or some of large-scale channel parameters estimated from antenna port A to channel measurement from antenna port B.

QCL may be required to associate different parameters depending on contexts, such as 1) time tracking affected by average delay and delay spread, 2) frequency tracking affected by Doppler shift and Doppler spread, 3) radio resource measurement (RRM) affected by average gain, and 4) beam management (BM) affected by spatial parameter. Accordingly, NR supports four types of QCL relationships as shown in Table 28 below.

TABLE 28

| QCL type | Large-scale characteristic |
|---|---|
| A | Doppler shift, Doppler spread, average delay, delay spread |
| B | Doppler shift, Doppler spread |
| C | Doppler shift, average delay |
| D | Spatial Rx parameter |

Spatial RX parameter may collectively refer to all or some of various parameters, such as the angle of arrival (AoA), the power angle spectrum (PAS) of AoA, the angle of departure (AoD), the PAS of AoD, transmit/receive channel correlation, transmit/receive beamforming, and spatial channel correlation.

The QCL relationship may be configured to the UE through RRC parameter TCI-State and QCL information (QCL-Info) as shown in Table 29 below. Referring to Table 29 below, the base station may configure the UE with one or more TCI states, indicating up to two QCL relationships (qcl-Type1, qcl-Type2) for the RS referencing the ID of the TCI state, i.e., the target RS. In this case, the QCL information (QCL-Info) included in each TCI state includes the serving cell index and BWP index of the reference RS indicated by the QCL information, type and ID of the reference RS, and the QCL type as shown in Table 28.

TABLE 29

```
TCI-State ::=                                       SEQUENCE {
    tci-StatedId                                    TCI-StateId,
    (ID of the corresponding TCI state)
    gcl-Type1                                       QCL-Info,
    (QCL information of the first reference RS of RS (target RS) referring
to the corresponding TCI state ID)
    gcl-Type2                                       QCL-Info
                                OPTIONAL,    -- Need R
    (QCL information of the second reference RS of the RS (target RS)
referring to the corresponding TCI state ID)
    ...
}
QCL-Info ::=                                        SEQUENCE {
    cell                                            ServCellIndex
                                OPTIONAL,    -- Need R
    (the serving cell index of the reference RS indicated by the correponding
QCL information)
    bwp-Id                                          BWP-Id
                                OPTIONAL,    -- Cond CST-RS-Indicated
    (BPW index of reference RS indicated by the corresponding QCL information)
    referenceSignal                                 CHOICE {
        csi-rs                                      NZP-CSI-RS-
ResourceId,
        ssb                                         SSB-
Index
    (one of the CSI-RS IP or SSB ID indicated by the corresponding QCL
information)
    },
    qcl-Type                                        ENUMERATED {typeA,
typeB, typeC, typeD},
    ...
}
```

The QoS value or priority value to be applied to various embodiments may be transmitted via a QoS parameter called the 5G QoS identifier (hereinafter, "5QI") in the 5G system. A resource type, a default priority level, a packet delay budget, a packet error rate, a default maximum data burst volume, and a default averaging window may be mapped to one 5QI value, which may be defined as illustrated in Table 30 below.

TABLE 30

| 13 | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 1 | GBR (NOTE 1) | 20 | 100 ms (NOTE 11, NOTE 13) | 10-2 | N/A | 2000 ms | Conversational Voice |
| 2 | | 40 | 150 ms (NOTE 11, NOTE 13) | 10-3 | N/A | 2000 ms | Conversational Video (Live Streaming) |
| 3 (NOTE 14) | | 30 | 50 ms (NOTE 11, NOTE 13) | 10-3 | N/A | 2000 ms | Real Time Gaming, V2X messages Electricity distribution - medium voltage, Process automation - monitoring |
| 4 | | 50 | 300 ms (NOTE 11, NOTE 13) | 10-6 | N/A | 2000 ms | Non-Conversational Video (Buffered Streaming) |
| 65 (NOTE 9, NOTE 12) | | 7 | 75 ms (NOTE 7, NOTE 8) | 10-2 | N/A | 2000 ms | Mission Critical user plane Push To Talk voice (e.g., MCPTT) |
| 66 (NOTE 12) | | 20 | 100 ms (NOTE 10, NOTE 13) | 10-2 | N/A | 2000 ms | Non-Mission-Critical user plane Push To Talk voice |
| 67 (NOTE 12) | | 15 | 100 ms (NOTE 10, NOTE 13) | 10-3 | N/A | 2000 ms | Mission Critical Video user plane |
| 75 (NOTE 14) | | | | | | | |
| 71 | | 56 | 150 ms (NOTE 11, NOTE 15) | 10-6 | N/A | 2000 ms | "Live" Uplink Streaming (e.g. TS 26.238 [76]) |
| 72 | | 56 | 300 ms (NOTE 11, NOTE 15) | 10-4 | N/A | 2000 ms | "Live" Uplink Streaming (e.g. TS 26.238 [76]) |
| 73 | | 56 | 300 ms (NOTE 11, NOTE 15) | 10-8 | N/A | 2000 ms | "Live" Uplink Streaming (e.g. TS 26.238 [76]) |
| 74 | | 56 | 500 ms (NOTE 11, NOTE 15) | 10-8 | N/A | 2000 ms | "Live" Uplink Streaming (e.g. TS 26.238 [76]) |
| 75 | | 56 | 500 ms (NOTE 11, NOTE 15) | 10-4 | N/A | 2000 ms | "Live" Uplink Streaming (e.g. TS 26.238 [76]) |

TABLE 30-continued

| 13 | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 5 | Non-GBR (NOTE 1) | 10 | 100 ms NOTE 10, NOTE 13) | 10-6 | N/A | N/A | IMS Signalling |
| 6 | | 60 | 300 ms (NOTE 10, NOTE 13) | 10-6 | N/A | N/A | Video (Buffered Streaming) TCP-based (e.g., www, e-mail, chat, ftp, p2p file sharing, progressive video, etc.) |
| 7 | | 70 | 100 ms (NOTE 10, NOTE 13) | 10-3 | N/A | N/A | Voice, Video (Live Streaming) Interactive Gaming |
| 8 | | 80 | 300 ms (NOTE 13) | 10-6 | N/A | N/A | Video (Buffered Streaming) TCP-based (e.g., www, e-mail, chat, ftp, p2p file sharing, progressive video, etc.) |
| 9 | | 90 | | | | | |
| 69 (NOTE 9, NOTE 12) | | 5 | 60 ms (NOTE 7, NOTE 8) | 10-6 | N/A | N/A | Mission Critical delay sensitive signalling (e.g., MC-PTT signalling) |
| 70 (NOTE 12) | | 55 | 200 ms (NOTE 7, NOTE 10) | 10-6 | N/A | N/A | Mission Critical Data (e.g. example services are the same as 5QI 6/8/9) |
| 79 | | 65 | 50 ms (NOTE 10, NOTE 13) | 10-2 | N/A | N/A | V2X messages |
| 80 | | 68 | 10 ms (NOTE 5, NOTE 10) | 10-6 | N/A | N/A | Low Latency eMBB applications Augmented Reality |
| 82 | Delay Critical GBR | 19 | 10 ms (NOTE 4) | 10-4 | 255 bytes | 2000 ms | Discrete Automation (see TS 22.261 [2]) |
| 83 | | 22 | 10 ms (NOTE 4) | 10-4 | 1354 bytes (NOTE 3) | 2000 ms | Discrete Automation (see TS 22.261 [2]) |
| 84 | | 24 | 30 ms (NOTE 6) | 10-5 | 1354 bytes (NOTE 3) | 2000 ms | Intelligent transport systems (see TS 22.261 [2]) |
| 85 | | 21 | 5 ms (NOTE 5) | 10-5 | 255 bytes | 2000 ms | Electricity Distribution-high voltage |

TABLE 30-continued

| 13 | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| | | | | | | | (see TS 22.261 [2]) |

NOTE 1:
A packet which is delayed more than PDB is not counted as lost, thus not included in the PER.
NOTE 2:
It is required that default MDBV is supported by a PLMN supporting the related 5QIs.
NOTE 3:
This MDBV value is set to 1354 bytes to avoid IP fragmentation for the IPv6 based, IPSec protected GTP tunnel to the 5G-AN node (the value is calculated as in Annex C of TS 23.060 [56] and further reduced by 4 bytes to allow for the usage of a GTP-U extension header).
NOTE 4:
A delay of 1 ms for the delay between a UPF terminating N6 and a 5G-AN should be subtracted from a given PDB to derive the packet delay budget that applies to the radio interface. When a dynamic CN component of the PDB is used, see clause 5.7.3.4.
NOTE 5:
A delay of 2 ms for the delay between a UPF terminating N6 and a 5G-AN should be subtracted from a given PDB to derive the packet delay budget that applies to the radio interface. When a dynamic CN component of the PDB is used, see clause 5.7.3.4.
NOTE 6:
A delay of 5 ms for the delay between a UPF terminating N6 and a 5G-AN should be subtracted from a given PDB to derive the packet delay budget that applies to the radio interface. When a dynamic CN component of the PDB is used, see clause 5.7.3.4.
NOTE 7:
For Mission Critical services, it may be assumed that the UPF terminating N6 is located "close" to the 5G_AN (roughly 10 ms) and is not normally used in a long distance, home routed roaming situation. Hence delay of 10 ms for the delay between a UPF terminating N6 and a 5G_AN should be subtracted from this PDB to derive the packet delay budget that applies to the radio interface.
NOTE 8:
In both RRC Idle and RRC Connected mode, the PDB requirement for these 5QIs can be relaxed (but not to a value greater than 320 ms) for the first packet(s) in a downlink data or signalling burst in order to permit reasonable battery saving (DRX) techniques.
NOTE 9:
It is expected that 5QI-65 and 5QI-69 are used together to provide Mission Critical Push to Talk service (e.g., 5QI-5 is not used for signalling). It is expected that the amount of traffic per UE will be similar or less compared to the IMS signalling.
NOTE 10:
In both RRC Idle and RRC Connected mode, the PDB requirement for these 5QIs can be relaxed for the first packet(s) in a downlink data or signalling burst in order to permit battery saving (DRX) techniques.
NOTE 11:
In RRC Idle mode, the PDB requirement for these 5QIs can be relaxed for the first packet(s) in a downlink data or signalling burst in order to permit battery saving (DRX) techniques.
NOTE 12:
This 5QI value can only be assigned upon request from the network side. The UE and any application running on the UE is not allowed to request this 5QI value.
NOTE 13:
A delay of 20 ms for the delay between a UPF terminating N6 and a 5G-AN should be subtracted from a given PDB to derive the packet delay budget that applies to the radio interface.
NOTE 14:
This 5QI is not supported as it is only used for transmission of V2X messages over MBMS bearers as defined in TS 23.285 [72].
NOTE 15:
For "live" uplink streaming (see TS 26.238 [76]), guidelines for PDB values of the different 5QIs correspond to the latency configurations defined in TR 26.939 [77]. In order to support higher latency reliable streaming services (above 500 ms PDB), if different PDB and PER combinations are needed these configurations will have to use non-standardised 5QIs.

As shown in Table 30, e.g., 5QI value 82 may be mapped to such parameters as a resource type of Delay Critical Guaranteed Bit Rate (GBR), a default priority level of 19, a packet delay budget of 10 ms, a packet error rate of 10', and a default maximum data burst volume of 255 bytes.

According to an embodiment, to indicate the priority of groupcast data or unicast data, it is possible to set a set of 5QI values that may be possessed by the data which may be transmitted/received in a corresponding carrier or bandwidth part (BWP). For example, when a specific BWP is configured, it may be configured in the BWP that data is transmitted/received which has the 5QI values of 1, 2, 4, 5, 6, 82, 83, and 84. In this case, it may be considered that data having a 5QI value other than the eight 5QI values of {1, 2, 4, 5, 6, 82, 83, 84} is not transmitted/received in the corresponding BWP. In this case, the UE transmitting control information, e.g., DCI, in the corresponding BWP may include a 5QI field in the DCI.

For example, if it is configured that data having 5QI values of 1, 2, 4, 5, 6, 82, 83, and 84 is transmitted/received in the BWP, 3 bits included in the DCI may be used as a 5QI indicator indicating one of the 5QI values of {1, 2, 4, 5, 6, 82, 83, 84}. Accordingly, the UE may receive configuration information for configuring the 5QI value that may be owned by the data corresponding to the BWP configuration. The base station may determine the size of the 5QI indicator field included in the DCI transmitted in the corresponding BWP. For example, when the configuration information indicating the 5QI value is configured to indicate that data transmitted via the BWP may correspond to one of N 5QI values, the 5QI indicator field may have a size of $\lceil \log_2 N \rceil$, but it should be noted that embodiments are not limited thereto. The base station may transmit DCI including 5QI information based on the determined size of the 5QI indicator field. The UE receiving the DCI may interpret the 5QI indicator field included in the DCI and may thus identify the 5QI information applied to the data scheduled via the DCI. According to an embodiment, when one UE transmits the same data to a plurality of UEs or when a base station transmits the same data to a plurality of UEs may be referred to as groupcast or multicast. It should be noted that in various embodiments, groupcast may be used interchangeably with multicast.

Signal transmission/reception methods are proposed according to three embodiments as follows, which are described below in detail.

First Embodiment

The first embodiment proposes a method and device for configuring and operating a BWP for groupcast in a wireless communication system.

According to an embodiment, the base station may configure the UE with a BWP for a groupcast service, and the base station may transmit/receive control information and data for groupcast using the BWP configured for the groupcast service. The UE may receive information for the BWP configured for the groupcast service, from the base station, and the UE may transmit/receive groupcast control information and groupcast data using the BWP configured for groupcast.

According to an embodiment, a BWP for groupcast and a BWP for unicast may be separately configured. For example, the base station may configure the UE with a BWP for groupcast, e.g., BWP A, and a BWP for unicast, e.g., BWP B. In this case, the base station may activate BWP A to transmit/receive groupcast control information and groupcast data to/from the UE and activate BWP B to transmit/receive control information for unicast and data for unicast to/from the UE. According to an embodiment, for ease of description, the control information for unicast is referred to as unicast control information, and data for unicast is referred to as unicast data. According to an embodiment, for ease of description, the BWP for groupcast is referred to as a groupcast BWP, and the BWP for unicast is referred to as a unicast BWP. The UE may be configured with BWP A, which is a groupcast BWP, and BWP B, which is a unicast BWP, by the base station and may thus perform transmission/reception of groupcast control information and groupcast data via BWP A and transmission/reception of unicast control information and unicast data via BWP B.

According to an embodiment, when BWP A, which is a groupcast BWP, and BWP B, which is a unicast BWP, are separately configured, the UE may anticipate that either BWP A or BWP B is to be activated. In other words, the UE may anticipate that only one BWP is to be activated at a specific time and may thus receive either a unicast service or a groupcast service.

According to an embodiment, when BWP A, which is a groupcast BWP, and BWP B, which is a unicast BWP, are separately configured, the UE may anticipate that one or more of BWP A and BWP B are to be activated. In other words, the UE may anticipate that both BWP A, which is a groupcast BWP, and BWP B, which is a unicast BWP, are to be activated at a specific time and may thus receive both a unicast service and a groupcast service.

According to an embodiment, when BWP A, which is a groupcast BWP, and BWP B, which is a unicast BWP, are separately configured, BWP A, which is a groupcast BWP, and BWP B, which is a unicast BWP, may be configured not to overlap each other in time and frequency resources.

According to an embodiment, when BWP A, which is a groupcast BWP, and BWP B, which is a unicast BWP, are separately configured, BWP A, which is a groupcast BWP, and BWP B, which is a unicast BWP, may be configured to overlap each other in time and frequency resources. If BWP A and BWP B are configured to overlap, the subcarrier spacings may be set to be the same. In other words, the UE may not anticipate that BWP A and BWP B having different subcarrier spacings are to be configured to overlap.

According to an embodiment, among one or more BWPs configured in the UE, one or more BWPs may be designated as groupcast BWP(s). In other words, the base station may configure the UE with M BWPs and additionally configure so that among the M configured BWPs, N specific BWPs are to be used as groupcast BWPs. The base station may activate one of the N BWPs designated as groupcast BWPs and transmit/receive groupcast control information and groupcast data to/from the UE via the activated groupcast BWP. The UE may transmit/receive groupcast control information and groupcast data via the activated BWP among the N BWPs designated as groupcast BWPs among the M BWPs configured by the base station.

According to an embodiment, any method for designating a configured BWP as a groupcast BWP may be considered. For example, the following methods may be considered.

(1) Method A1

Method A1 is a method of including information for activating groupcast in BWP configuration information. For example, the BWP configuration information may include a field for enabling groupcast (e.g., groupcast ENUMERATED {enabled}).

(2) Method A2

Method A2 is a method of including BWP index information in groupcast-related configuration information. For example, the groupcast-related configuration information may include a field indicating a BWP index to support a corresponding groupcast service. In this case, one BWP index only or a plurality of BWP indexes may be included.

(3) Method A3

Time and frequency resource information for groupcast may be configured in a specific BWP, and the BWP in which time and frequency resource information for groupcast have been configured may be regarded as a groupcast BWP. For example, the base station may set any time and frequency resource in the BWP configured in the UE as a resource region for groupcast and may perform transmission/reception of groupcast control information and groupcast data in the configured resource region for groupcast. The UE may be configured with a resource region for groupcast in a specific BWP by the base station and transmission/reception of groupcast control information and groupcast data may be performed in the configured resource region for groupcast.

(4) Method A4

A sub-BWP for groupcast may be configured in a specific BWP, and the BWP in which the sub-BWP for groupcast has been configured may be regarded as a groupcast BWP. According to an embodiment, for convenience of description, sub-BWP for groupcast is referred to as a groupcast sub-BWP. In this case, the configuration information for the groupcast sub-BWP may be different from the configuration information for the corresponding BWP. For example, the subcarrier spacing, TCI status configuration information (or beam-related configuration information), control channel information, and data channel information for the groupcast sub-BWP may be set to differ from the subcarrier spacing, TCI status configuration information (or beam-related configuration information), control channel information, and data channel information for the corresponding BWP. The base station may transmit/receive groupcast control information or groupcast data to/from the UE through the groupcast sub-BWP and, in this case, groupcast control information or groupcast data may be transmitted/received based on the configuration information for the groupcast sub-BWP. The UE may be configured with a groupcast sub-BWP by the base station and may transmit/receive groupcast control information or groupcast data through the groupcast sub-BWP and, in this case, the groupcast control information or groupcast data may be transmitted/received based on sub-BWP configuration information.

(5) Method A5

Whether or not to support a groupcast service in any BWP may be implicitly determined based on other configuration information. For example, the base station may configure the UE to monitor PDCCH for groupcast in a specific BWP, and the UE may regard the BWP configured to monitor PDCCH for groupcast as a groupcast BWP. According to an embodiment, PDCCH for groupcast is referred to as a groupcast PDCCH for convenience of description. The method for configuring to monitor the groupcast PDCCH may include, e.g., a method for configuring a CORESET for groupcast, a method for configuring a search space for groupcast, a method for configuring to monitor a DCI format for groupcast, and a method for configuring to monitor a DCI format scrambled to RNTI.

According to an embodiment, there may be only one BWP designated as a groupcast BWP.

According to an embodiment, there may be one or more BWPs designated as groupcast BWP(s).

According to an embodiment, groupcast control information and groupcast data may be transmitted/received in the BWP designated as a groupcast BWP.

According to an embodiment, unicast control information and unicast data, as well as groupcast control information and groupcast data, may be transmitted/received in the BWP designated as a groupcast BWP.

According to an embodiment, the base station may transmit control information including scheduling information for groupcast data to the UE. For example, the base station may transmit, to the UE, a DCI format for groupcast (e.g., DCI format 4_0 for scheduling uplink groupcast data or DCI format 4_1 for scheduling downlink groupcast data) or a DCI format scrambled to an RNTI for groupcast (e.g., G-RNTI or M-RNTI). The UE may receive configuration information for monitoring the DCI format for groupcast from the base station, and may perform monitoring on the DCI format for groupcast based on the configuration information.

According to an embodiment, the DCI format for groupcast may be transmitted in the groupcast BWP or time and frequency resource for groupcast or in the CORESET for groupcast or search space for groupcast.

According to an embodiment, a data channel scheduled via the DCI format for groupcast may be scheduled and transmitted in the groupcast BWP or time and frequency resource for groupcast or in the bandwidth set as the CORESET for groupcast.

According to an embodiment, the frequency resource allocation field size of the DCI format for groupcast may be determined based on the bandwidth size of the groupcast BWP, the bandwidth size of the frequency resource configured for groupcast, or the bandwidth size set as the CORESET for groupcast. As a specific example, the size of bitmap in frequency resource allocation type 0 may be determined considering the bandwidth size of the groupcast BWP, the bandwidth size of the frequency resource configured for groupcast, the bandwidth size set as the CORESET for groupcast, and the RBG size value. As another example, the RB start point in frequency resource allocation type 1 may be determined based on the lowest RB index of the groupcast BWP, the lowest RB index of the frequency resource configured for groupcast, or the lowest RB index of the CORESET configured for groupcast, and the maximum length of continuously allocated RBs may be determined based on the bandwidth size of the groupcast BWP, the bandwidth size of the frequency resource configured for groupcast, or the bandwidth size set as the CORESET for groupcast. Upon receiving the DCI format for groupcast, the UE may interpret the frequency resource allocation field based on the bandwidth size of the groupcast BWP, the bandwidth size of the frequency resource configured for groupcast, or the bandwidth size set as the CORESET for groupcast and, upon receiving the DCI format for unicast, the UE may interpret the frequency resource allocation field based on the size of the bandwidth being currently active.

According to an embodiment, the DCI format scheduling downlink groupcast data and the DCI format scheduling uplink groupcast data may be adjusted to have the same size. As an example, size adjustment may be made to the larger of the DCI format scheduling downlink groupcast data and the DCI format scheduling uplink groupcast data and, in this case, 0 may be inserted into the smaller DCI format. As another example, size adjustment may be made to the smaller of the DCI format scheduling downlink groupcast data and the DCI format scheduling uplink groupcast data and, in this case, the length of some fields of the larger DCI format may be reduced (i.e., truncated). As another example, the size of the DCI format scheduling uplink groupcast data may be adjusted to the size the DCI format scheduling downlink groupcast data, or the size of the DCI format scheduling downlink groupcast data may be adjusted to the size of the DCI format scheduling uplink groupcast data. Upon size adjustment, 0 may be inserted, or the field of the DCI format may be shrunken.

According to an embodiment, unless the limit to the maximum number of configurable DCI formats having different sizes (e.g., the number of DCI formats with different sizes, which may be configured in the UE is limited to a number equal to or smaller than X) is met, the size of the DCI format scheduling groupcast data may be adjusted to the size of the DCI format for unicast.

The UE may decode the SSB/PBCH signal transmitted from the base station and decode SIBs and receive configuration information for groupcast which the UE may receive. The configuration information for groupcast may include information related to the BWP for groupcast, information related to CORESET, and information related to data transmission. The information related to the BWP for groupcast may be transmitted by any one of the following methods, so that control information for groupcast and data for groupcast may be transmitted. Hereinafter, for ease of description, data for groupcast is referred to as "groupcast data," and control information for groupcast is referred to as "groupcast control information."

(1) Method B1

Method B1 is a method of transmitting groupcast control information and groupcast data in an initial BWP. Here, a CORESET for groupcast may be configured to transmit groupcast control information in the initial BWP.

(2) Method B2

Method B2 is a method of configuring a separate BWP different from the initial BWP so as to transmit/receive groupcast control information and groupcast data. In method B2, information related to the BWP for transmitting/receiving groupcast control information and groupcast data may be transmitted via SIB. Here, a CORESET and search space for groupcast to transmit the groupcast control information may be configured in the separate BWP, and the CORESET for groupcast may be configured with the same resources as CORESET #0 of the initial BWP.

When the separate BWP for groupcast is configured, a subcarrier spacing (SCS) for the CORESET for groupcast may differ from the SCS configured in the BWP for groupcast.

According to an embodiment, to transmit groupcast signals to UEs which are in idle state (or inactive state), configuration information for groupcast may be transferred from the base station to the UE via, e.g., system information (e.g., SIB).

According to an embodiment, groupcast-related configuration information that may be transferred via SIB may include the following information, for example.

Configuration information for BWP where transmission/reception of groupcast signal may be performed Configuration information related to PDCCH where groupcast control information may be transmitted. For example, CORESET configuration information and search space configuration information for monitoring PDCCH for groupcast and RNTI information for groupcast According to an embodiment, to transmit groupcast signals to UEs which are in idle (or inactive) state, a BWP for groupcast may be configured via SIB and, unless there is separate BWP configuration information for groupcast, the initial BWP (initial BWP may refer to a BWP configurable via SIB1 for the UE's initial access procedure) may be regarded as a BWP for groupcast. For example, the base station may explicitly configure the UE with a groupcast BWP via SIB1, and the UE may identify groupcast BWP based on the groupcast BWP configuration information received via SIB1 and transmit/receive signals via the groupcast BWP. Unless the base station explicitly configures the UE with a groupcast BWP via SIB1, the UE may regard the initial BWP as a groupcast BWP and transmit/receive groupcast signals via the initial BWP.

According to an embodiment, to transmit groupcast signals to UEs which are in idle (or inactive) state, a CORESET and search space for monitoring DCI format for groupcast (e.g., DCI format scrambled with G-RNTI) may be configured and, unless there is separate CORESET and search space configuration information for groupcast, the UE may monitor DCI format for groupcast via a "default CORESET" and a "default search space."

According to an embodiment, the "default CORESET" may be at least one of the following CORESETs.

CORESET #0 (or CORESET with ID 0) (CORESET #0 may be a CORESET that may be configured through SS/PBCH)

CORESET configured to monitor DCI format for paging (e.g., a DCI format scrambled with P-RNTI)

CORESET configured to monitor DCI format for random access (e.g., a DCI format scrambled with RA-RNTI)

According to an embodiment, the "default search space" may be at least one of the following search spaces.

search space #0 (or search space with ID 0) (search space #0 may be a search space that may be configured through SS/PBCH)

search space configured to monitor DCI format for paging (e.g., a DCI format scrambled with P-RNTI)

search space configured to monitor DCI format for random access (e.g., a DCI format scrambled with RA-RNTI)

Further, the base station may explicitly configure the UE with a CORESET and search space for groupcast via SIB1, and the UE may receive groupcast control information via the CORESET and search space for groupcast received via SIB1. If the base station does not explicitly configure the UE with a CORESET and search space for groupcast, the UE may receive groupcast control information via the "default CORESET" and the "default search space."

Second Embodiment

A method and device for configuring and operating a BWP for groupcast in a wireless communication system has been described above in connection with the first embodiment.

A second embodiment proposes a method and device for transmitting groupcast control information and groupcast data from a base station or a transmitter to a plurality of UEs in a wireless communication system. As used herein, the terms "base station" and "transmitter" (e.g., a transmitter transmitting downlink data) may have the same meaning and, thus, may be interchangeably used in describing embodiments.

The base station may transmit groupcast control information via, e.g., SIB. The groupcast control information may include various types of information, such as resource information, period, frequency and time resource allocation information, information related to determining DCI format and size, BWP information, information type of groupcast (e.g., broadcast channel information or broadcast content information), and CORESET configuration information.

According to an embodiment, the base station may configure a PRACH resource for a random access procedure to allow the UE to access the base station only for transmission/reception of groupcast data via, e.g., SIB.

Upon receiving configuration information for groupcast, the UE may receive groupcast control information and groupcast data in the BWP and CORESET resource corresponding to the configuration information for groupcast. Here, while the UE interprets the groupcast control information, the frequency resource allocation information may be determined based on the size of the BWP for groupcast.

According to an embodiment, the base station may configure UEs with a plurality of RNTIs for groupcast via, e.g., SIB. In other words, the UEs may receive a plurality of RNTIs for groupcast from the base station.

According to an embodiment, the UE may perform a specific operation based on conditions for distance between transmitter and receiver, distance from a reference location, and required communication distance of transmitted/received data while transmitting/receiving control information and data.

As an example, in transmitting/receiving groupcast data, the base station may include reference location information (e.g., the ID value of a zone present in a specific location) in DCI, which is control information, and may include, in the DCI, a reference distance value (e.g., a reference zone ID, a reference distance, or a distance threshold) for determining whether data needs to be decoded.

Upon receiving the groupcast data, the UE decodes and receives the DCI transmitted from the base station and identifies the reference location information and data (i.e., the reference distance value at which PDSCH needs to be decoded) included in the DCI. Upon receiving the DCI, the UE (this term may be interchangeably used with receiver) may determine whether to decode the PDSCH signal scheduled by the transmitter, e.g., whether to decode the PDSCH signal scheduled by the DCI based on the identified reference location information, the reference distance value, and location information for the UE. As an example, if the distance between the reference location and the UE's location is the reference distance value or more, the UE does not decode the PDSCH signal. In contrast, if the distance between the reference location and the UE's location is less than the reference distance value, the UE attempts to decode the PDSCH signal which is groupcast data. The reference location may be the location of a specific transmitter or the location of the base station.

The reference distance value may be specified as a distance value (also referred to as range value) as follows. The distance value may be one of parameters indicating the quality of service (QoS) via a corresponding link.

The distance value which may be one of the parameters indicating the QoS may be interpreted in such a manner that a specific service is performed or a specific type of data needs to be transmitted within the distance value. As an example, the distance value may be a reference for the transmitter and receiver to process data packets. According to an embodiment, the unit of the distance value may be, e.g., meter, and the transmitter and the receiver may receive maximum distance value information indicating the maximum distance value. This may mean that data having the distance value exceeding the maximum distance value indicated in the maximum distance value information, as a QoS parameter, is not transmitted/received by the UE according to the received maximum distance value information. Here, the distance value is not limited thereto, and may be applied in various ways.

Further, the reference distance value used to determine whether to transmit hybrid automatic repeat request (HARQ) feedback information for groupcast data (e.g., an HARQ-acknowledgement (HARQ-ACK)) may be determined depending on the data transmitted via PDSCH, and the reference distance value may be transferred along with the data via higher layer. The reference distance value may be included in the DCI where the base station schedules the PDSCH and be transmitted. In other words, the PDSCH where the data is transmitted may be scheduled via the DCI including the reference distance value for the data transmitted from the base station.

As an example, information indicating the reference distance value may be directly included in the DCI, or an index indicating the reference distance value may be included in the DCI. As an example, any one of n+1 index values (index 0 to index n) may be included in the DCI. The index value k may indicate a specific reference distance value (e.g., 100 m) or a specific reference distance value range (e.g., a range from 100 m to 149 m). As another example, an index value indicating the zone ID of a zone indicating a specific area, as information indicating the reference distance value, may be included in the DCI.

According to an embodiment, the data transmitted via the PDSCH may be transferred in the form of a transport block (TB) from the higher layer. One or two TBs may be transmitted in one PDSCH. One TB may include various types of data. If one TB includes various types of data having different reference distance values, it is needed to determine which one of the different reference distance values is to be included, as a reference distance value, in the DCI.

According to an embodiment, when several types of data having different reference distance values are included in one or more TBs, a representative reference distance value to be included in the DCI may be determined based on any one of the following methods.

A first method is to determine that the maximum or minimum value among the reference distance values for several types of data included in one TB is the representative reference distance value to be included in the DCI. For example, among the reference distance values for several types of data, the reference distance value having the maximum value may be included, as the representative reference distance value, in the DCI. The representative reference distance value may be included in a range value field included in the DCI in which case the range value field may be specified as shown in Table 31 below.

TABLE 31

The UE shall set the "Range Value" field according to the largest range value among those range value(s) indicated by higher layers corresponding to the transport block.

As such, determining the reference distance value having the maximum value among the reference distance values for several types of data included in one TB as the representative reference distance value may be so done to transfer even the data that needs to be delivered farthest from the reference location.

Alternatively, among the reference distance values for several types of data included in one TB, the reference distance value having the minimum value may be included, as the representative reference distance value, in the DCI and, in this case, the range value field may be specified as in Table 32 below.

TABLE 32

The UE shall set the Range Value field according to the smallest range value among those range value(s) indicated by higher layers corresponding to the transport block.

Although in the above-described examples, among the reference distance values for several types of data included in one TB, the reference distance value having the maximum or minimum value is included, as the representative reference distance value, in the DCI, embodiments are not limited thereto. For example, in some contexts, among the reference distance values for several types of data, any one value may be included, as the representative reference distance value, in the DCI, or a pair of the maximum and minimum values may be included, as the representative reference distance value, in the DCI. As such, when several types of data having different reference distance values are included in one TB, various representative reference distance value to be included in the range value field may be chosen depending on contexts based on, e.g., any scheme that may enhance efficiency for groupcast or multicast.

Although the reference distance value included in the range value field in an example where one TB is transmitted in the PDSCH has been described, a similar method may also be applied when two TBs are transmitted in the PDSCH. As an example, the reference distance value having the maximum value among reference distance values for various types of data included in two TBs may be included in the range value field of DCI, which may be specified as illustrated in Table 33 below.

TABLE 33

The UE shall set the "Range Value" field according to the largest range value among those range value(s) indicated by higher layers corresponding to the transport block(s).

Alternatively, the reference distance value having the minimum value among the reference distance values for various types of data included in the two TBs may be included in the DCI.

Alternatively, among the reference distance values for several types of data included in one TB, the reference distance value having the minimum value may be included, as the representative reference distance value, in the DCI and, in this case, the range value field may be specified as in Table 34 below.

TABLE 34

The UE shall set the "Range Value" field according to the smallest range value among those range value(s) indicated by higher layers corresponding to the transport block(s).

Although in the above-described examples, among the reference distance values for several types of data included in two TBs, the reference distance value having the maximum or minimum value is included, as the representative reference distance value, in the DCI, embodiments are not limited thereto. For example, in some contexts, among the reference distance values for several types of data, any one value may be included, as the representative reference distance value, in the DCI, or a pair of the maximum and minimum values may be included, as the representative reference distance value, in the DCI. As such, when several types of data having different reference distance values are included in two TBs, various representative reference distance value to be included in the range value field may be chosen depending on contexts based on, e.g., any scheme that may enhance efficiency for groupcast or multicast.

Although a method for selecting a representative reference distance value from among reference distance values for several types of data included in two TBs has been described above, a method for selecting a representative reference distance value from among reference distance values for several types of data included in three or more TBs may also be implemented in a similar manner to the method for selecting a representative reference distance value from among reference distance values for several types of data included in two TBs. Described next is a second method for determining a representative reference distance value to be included in DCI when several types of data having different reference distance values are included in one or more TBs.

In the second method, a criterion for selecting a representative reference distance value from among multiple reference distance values may be set, so that any one of the multiple reference distance values is selected based on the set criterion. The selected reference distance value may be included in the DCI. As an example, the criterion for selecting a reference distance value to be included in the range value field of the DCI may be set as the maximum, minimum, or average value of the reference distance values for several types of data, and the transmitter may select a reference distance value to be included in the DCI according to the criterion.

Third Embodiment

A method and device for configuring and operating a BWP for groupcast in a wireless communication system has been described above in connection with the first embodiment. A method and device for transmitting groupcast control information and groupcast data from a base station or a transmitter to a plurality of UEs in a wireless communication system has been described above in connection with the second embodiment.

A third embodiment proposes a method and device for transmitting/receiving groupcast control information and groupcast data for a groupcast service when the UE is configured with a plurality of carriers, i.e., when carrier aggregation (CA) is used.

The base station may configure the UE with a plurality of carriers. For example, if the UE performs a process of random access to the base station in a specific carrier and then connects to the base station, the base station may configure the UE to add a separate carrier other than the specific carrier to a secondary cell (hereinafter, "SCell") and activate the SCell. In this case, the UE may perform data transmission/reception with the base station via two carriers including the primary cell (hereinafter, "PCell") and the SCell carrier. In such a case, there may be possible cross-carrier scheduling in which control information for downlink data transmission to the SCell is transmitted to the PCell or self-carrier scheduling in which control information for downlink data transmission to the SCell is transmitted to the SCell.

The base station may deactivate the SCell for the UE and, when the SCell is deactivated, the SCell does not perform data transmission nor does it receive relevant control information.

However, the UE may receive groupcast control information and groupcast data transmitted from the SCell. In this case, the UE may receive relevant configuration information for broadcast and groupcast transmission from the SCell, or may receive such configuration information from the PCell via higher layer signaling or SIB.

According to an embodiment, when the UE is configured with CA including PCell and SCell, it may be possible to receive, from the PCell, control information for scheduling transmission of groupcast data which is transmitted from the SCell. In this case, relevant HARQ feedback information may be transmitted to the PCell.

In the case, HARQ feedback information for unicast PDSCH and HARQ feedback information for groupcast PDSCH together may be transmitted from the base station to the UE, which may be called multiplexing. Or when PDSCHs are scheduled to simultaneously transmit HARQ feedback information for unicast PDSCH and HARQ feedback information for groupcast PDSCH, the HARQ feedback information for unicast PDSCH is transmitted, but the HARQ feedback information for groupcast PDSCH may not be transmitted. This may prioritize HARQ feedback for unicast PDSCH. Conversely, HARQ feedback information for groupcast PDSCH may be transmitted, but HARQ feedback information for unicast PDSCH may not be transmitted. This may prioritize HARQ feedback for groupcast PDSCH. The base station may set, via higher layer signaling, whether to multiplex the HARQ feedback information for unicast PDSCH and HARQ feedback information for groupcast PDSCH or to prioritize either one so that HARQ feedback information is transmitted only for the prioritized PDSCH. The prioritization may be determined based on the QoS value provided according to the second embodiment. The above-described transmission of HARQ feedback information may be applied to operations on a single carrier, as well as CA-considered operations.

Fourth Embodiment

A method and device for configuring and operating a BWP for groupcast in a wireless communication system has been described above in connection with the first embodiment. A method and device for transmitting groupcast control information and groupcast data from a base station or a transmitter to a plurality of UEs in a wireless communication system has been described above in connection with the second embodiment. A method and device for transmitting/receiving groupcast control information and groupcast data for a groupcast service when the UE is configured with a plurality of carriers, i.e., when carrier aggregation (CA) is used has been described above in connection with the third embodiment.

A fourth embodiment proposes a method and device for scrambling, mapping, and transmitting a PDCCH and a PDSCH when an MBS service is provided.

In the NR system, the base station may scramble the PDCCH through a scrambling procedure as set forth in Table 35 below and transmit it to the UEs. The UE may descramble and decode the PDCCH based on a procedure as set forth in Table 35 below. The scheme in which the UE descrambles the PDCCH may be determined to correspond to the PDCCH-scrambling scheme applied to the base station.

TABLE 35

The UE shall assume the block of bits b(0) , ... , b($M_{bit}$ − 1), where $M_{bit}$ is the number of bits transmitted on the physical channel, is scrambled prior to modulation, resulting in a block of scrambled bits $\tilde{b}(0)$, ... , $\tilde{b}(M_{bit} - 1)$ according to
$$\tilde{b}(i) = (b(i) + c(i)) \bmod 2$$
where the scrambling sequence $c(i)$ is given by clause 5.2.1. The scrambling sequence generator shall be initialized with
$$c_{init} = (n_{RNTI} \cdot 2^{16} + n_{ID}) \bmod 2^{31}$$
where
- for a UE-specific search space as defined in clause 10 of [5, TS 38.213],
  $n_{ID} \in \{0,1,...,65535\}$ equals the higher-layer parameter pdcch-DMRS-ScramblingID if configured,
- $n_{ID} = n_{ID}^{cell}$ otherwise and where
- $n_{RNTI}$ is given by the C-RNTI for a PDCCH in a UE-specific search space if the higher-layer parameter pdcch-DMRS-ScramblingID is configured, and
- $n_{RNTI} = 0$ otherwise.

In Table 35 above, a scheme for detecting $c_{init}=(n_{RNTI} \cdot 2^{16}+n_{ID}) \bmod 2^{31}$ necessary to generate scrambling sequence c(i) for scrambling the PDCCH may also be used for scrambling a group-common PDCCH for scheduling MBS and, in this case, $n_{RNTI}$ and $n_{ID}$ may be determined based on, e.g., one or more of methods 1 to 3. According to an embodiment, G-RNTI may be an RNTI value configured for an MBS service, and a plurality of G-RNTI values may be configured for one UE. In the following description, G-RNTI may denote one of the plurality of configured G-RNTI values.

Method 1: In a common search space or group-common search space, or a common search space for MBS, $n_{RNTI}$ may be determined as the G-RNTI value.

Method 2: In a common search space or group-common search space, or a common search space for MBS, if pdcch-DMRS-ScramblingID_MBS is set, $n_{RNTI}$ may be determined as the G-RNTI value. The pdcch-DMRS-ScramblingID MBS above may be a value set for ID information for PDCCH for scheduling PDSCH for MBS or scrambling the DMRS of PDCCH or may be $n_{ID}$ used in the scrambling. In the common search space or group-common search space, or in the common search space for MBS, unless the pdcch-DMRS-ScramblingID_MBS is set, $n_{RNTI}$ may be determined as 0.

Method 3: In a common search space or group-common search space, or a common search space for MBS, if pdcch-DMRS-ScramblingID_MBS is set, $n_{ID}$ may be determined as pdcch-DMRS-ScramblingID_MBS. As an example, this may be based on a method as set forth in Table 36 below.

TABLE 36

- for a UE-specific search space as defined in clause 10 of [5, TS 38.213],
$n_{ID} \in \{0,1,...,65535\}$ equals the higher-layer parameter pdcch-DMRS-ScramblingID if configured, TABLE 36-continued

- for a common search space, $n_{ID} \in \{0,1,...,65535\}$ equals the higher-layer parameter pdcch-DRMS-ScramblingID_MBS if configured,
- $n_{ID} = n_{ID}^{cell}$ otherwise In the NR system, the base station may scramble the PDSCH through a scrambling procedure as set forth in Table 37 below and transmit it to the UEs. The UE may descramble and decode the PDSCH based on a procedure as set forth in Table 37 below.

TABLE 37

Up to two codewords $q \in \{0,1\}$ can be transmitted. In case of single-codeword transmission, $q = 0$.
For each codeword q, the UE shall assume the block of bits $b^{(q)}(0), ... , b^{(q)}(M_{bit}^{(q)} - 1)$, where $M_{bit}^{(q)}$ is the number of bits in codeword q transmitted on the physical channel, are scrambled prior to modulation, resulting in a block of scrambled bits $\tilde{b}^{(q)}(0), ... , \tilde{b}^{(q)}(M_{bit}^{(q)} - 1)$ according to
$$\tilde{b}^{(q)}(i) = (b^{(q)}(i) + c^{(q)}(i)) \bmod 2$$
where the scrambling sequence $c^{(q)}(i)$ is given by clause 5.2.1. The scrambling sequence generator shall be initialized with
$$c_{init} = (n_{RNTI} \cdot 2^{15} + q \cdot 2^{14} + n_{ID}$$
where
- $n_{ID} \in \{0,1,...,1023\}$ equals the higher-layer parameter dataScramblingIdentityPDSCH if configured and the RNTI equals the C-RNTI, MCS-C-RNTI, or CS-RNTI, and the transmission is not scheduled using DCI format 1_0 in a common search space;
- $n_{ID} \in \{0,1, ... ,1023\}$
  - the higher-layer parameter dataScramblingIdentityPDSCH if the codeword is scheduled using a CORESET with CORESETPoolIndex equal to 0;
  - the higher-layer parameter dataScramblingIdentityPDSCH2 if the codeword is scheduled using a CORESET with CORESETPoolIndex equal to 1;
  if the higher-layer parameters dataScramblingIdentityPDSCH and dataScramblingIdentityPDSCH2 are configured together with the higher-layer parameter CORESETPoolIndex containing two different values, and the RNTI equals the C-RNTI, MCS-C-RNTI, or CS-RNTI, and the transmission is not scheduled using DCI format 1_0 in a common search space;
- $n_{ID} = n_{ID}^{cell}$ otherwise and where $n_{RNTI}$ corresponds to the RNTI associated with the PDSCH transmission as described in clause 5.1 of [6, TS 38.214].

In Table 37 above, a scheme for detecting $c_{init} = n_{RNTI} \cdot 2^{15} + q \cdot 2^{14} + n_{ID}$ necessary to generate scrambling sequence c(i) for scrambling the PDSCH may also be used for scrambling a group-common PDSCH for data transmission for MBS and, in this case, $n_{RNTI}$ and $n_{ID}$ may be determined based on, e.g., one or more of methods 1 and 2. According to an embodiment, G-RNTI may be an RNTI value configured for an MBS service, and a plurality of G-RNTI values may be configured for one UE. In the following description, G-RNTI may denote one of the plurality of configured G-RNTI values.

Method 1: In a common search space or group-common search space, or a common search space for MBS, $n_{RNTI}$ may be determined as the G-RNTI value.

Method 2: In a common search space or group-common search space, or a common search space for MBS, if dataScramblingIdentityPDSCH MBS is set, $n_{ID}$ may be determined as dataScramblingIdentityPDSCH MBS. In a common search space or group-common search space, or a common search space for MBS, if a specific DCI format is scheduled, $n_{RNTI}$ may be determined as the G-RNTI value.

The base station and the UE may determine $n_{RNTI}$ and $n_{ID}$ based on the above-described methods and perform PDCCH and PDSCH scrambling and descrambling, corresponding to the scrambling, respectively, and may accordingly perform transmission/reception operations.

A structure of a base station according to an embodiment is described below with reference to FIG. 15.

Figure 15:
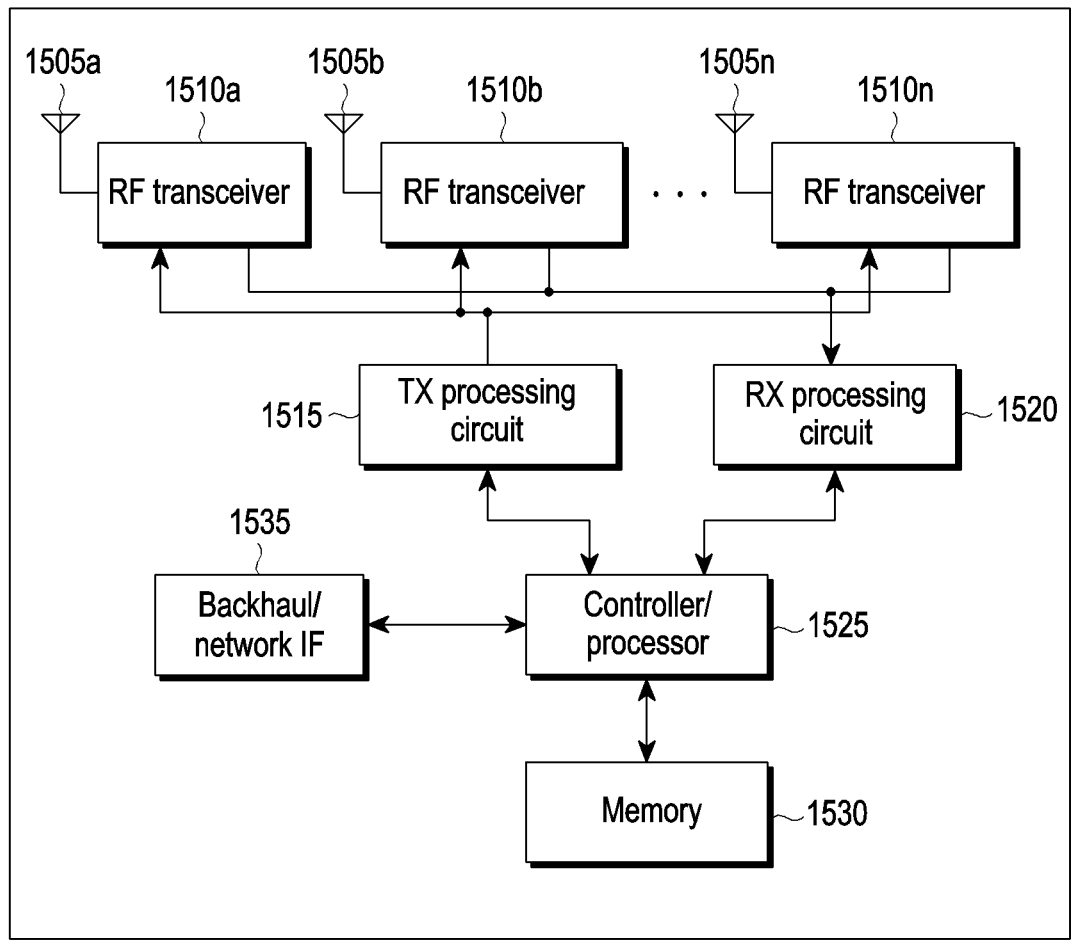
FIG. 15 is a view schematically illustrating a structure of an example base station according to an embodiment of the disclosure.

FIG. 15 is a view schematically illustrating a structure of an example base station according to an embodiment of the disclosure. The embodiment of the base station illustrated in FIG. 15 is for illustrative purposes only, and the scope of the disclosure is not limited thereto.

Referring to FIG. 15, the base station includes a plurality of antennas 1505a to 1505n, a plurality of radio frequency (RF) transceivers 1510a to 1510n, a transmit (TX) processing circuit 1515, and a receive (RX) processing circuit 1520. The base station further includes a controller/processor 1525, a memory 1530, and a backhaul or network interface 1535.

The RF transceivers 1510a to 1510n receive input RF signals, such as signals transmitted from UEs in the network, through the antennas 1505a to 1505n. The RF transceivers 1510a to 1510n down-convert the input RF signals, generating intermediate frequency (IF) or baseband signals. The IF or baseband signals are transmitted to the RX processing circuit 1520, and the RX processing circuit 1520 filters, decodes, and/or digitizes the baseband or IF signals, generating processed baseband signals. The RX processing circuit 1520 sends the processed baseband signals to the controller/processor 1525 for further processing.

The TX processing circuit 1515 receives analog or digital data, such as speech data, web data, emails, or interactive video game data, from the controller/processor 1525. The TX processing circuit 1515 encodes, multiplexes, and/or digitizes the output baseband data, generating processed baseband or IF signals. The RF transceivers 1510a to 1510n receive the processed baseband or IF signals output from the TX processing circuit 1515 and up-convert the baseband or IF signals into RF signals which are to be transmitted through the antennas 1505a to 1505n.

The controller/processor 1525 may include one or more processors or other processing devices that control the overall operation of the base station. In one example, the controller/processor 1525 may control reception of forward channel signals and transmission of reverse channel signals by the RF transceivers 1510a to 1510n, the processing circuit 1520, and the TX processing circuit 1515 according to known principles. The controller/processor 1525 may support additional functions, such as more advanced wireless communication functions.

According to an embodiment, the controller/processor 1525 performs overall operations related to signal transmission/reception schemes for groupcast or multicast. In particular, the controller/processor 1525 performs overall operations related to a method for configuring and operating a BWP for groupcast in the first embodiment of signal transmission/reception schemes for groupcast or multicast.

The controller/processor 1525 performs overall operations related to a method for the base station or transmitter to transmit groupcast control information and groupcast data to a plurality of UEs in the second embodiment for signal transmission/reception schemes for groupcast or multicast.

Additionally, the controller/processor 1525 performs overall operations related to a method for transmitting/receiving groupcast control information and groupcast data for a groupcast service when the UE is configured with a plurality of carriers, i.e., when carrier aggregation (CA) is used, in the third embodiment for signal transmission/reception schemes for groupcast or multicast.

Further, the controller/processor 1525 performs overall operations related to a method for scrambling, mapping, and transmitting PDCCH and PDSCH upon providing an MBS service in the fourth embodiment for signal transmission/reception schemes for groupcast or multicast.

Further, the controller/processor 1525 may support beamforming or directional routing operations in which signals output from the plurality of antennas 1505a to 1505n are differently weighted to efficiently steer the signals output in a desired direction. Any of other various functions may be supported by the controller/processor 1525 in the base station.

The controller/processor 1525 may also execute programs and other processes, e.g., operating system (OS), resident in the memory 1530. The controller/processor 1525 may move data as required by a running process to the memory 1530 or the outside of the memory 1530.

The controller/processor 1525 is connected with the backhaul or network interface 1535. The backhaul or network interface 1535 allows the base station to communicate with other devices or systems over a backhaul connection or over a network. The interface 1535 may support communications over any appropriate wired or wireless connection(s). For example, when the base station is implemented as a part of a cellular communication system (such as a cellular communication system supporting 5G, LTE, or LTE-A), the interface 1535 allows the base station to communicate with other base stations via a wired or wireless backhaul connection. When the base station is implemented as an access point, the interface 1535 allows the base station to communicate with a larger network (e.g., the Internet) via a wired or wireless local area network or a wired or wireless connection. The interface 1535 includes an appropriate structure to support communications through a wired or wireless connection, such as Ethernet or RF transceiver.

The memory 1530 is connected to the controller/processor 1525. A portion of the memory 1530 may include a random access memory (RAM), and another portion of the memory 1530 may include a flash memory or a read-only memory (ROM).

Although FIG. 15 illustrates an example base station, various changes may be made thereto. As an example, the base station may include any number of such components as illustrated in FIG. 15. As an example, an access point may include a plurality of interfaces 1535, and the controller/processor 1525 may support routing functions to route data between different network addresses. Although FIG. 15 illustrates that the base station includes a single instance of the TX processing circuit 1515 and a single instance of the RX processing circuit 1520, the base station may include multiple instances (e.g., one for each RF transceiver). Various components of FIG. 15 may be combined together, or each component may be further divided or some components may be omitted or, as necessary, more components may be added.

A structure of a UE according to an embodiment is described below with reference to FIG. 16.

Figure 16:
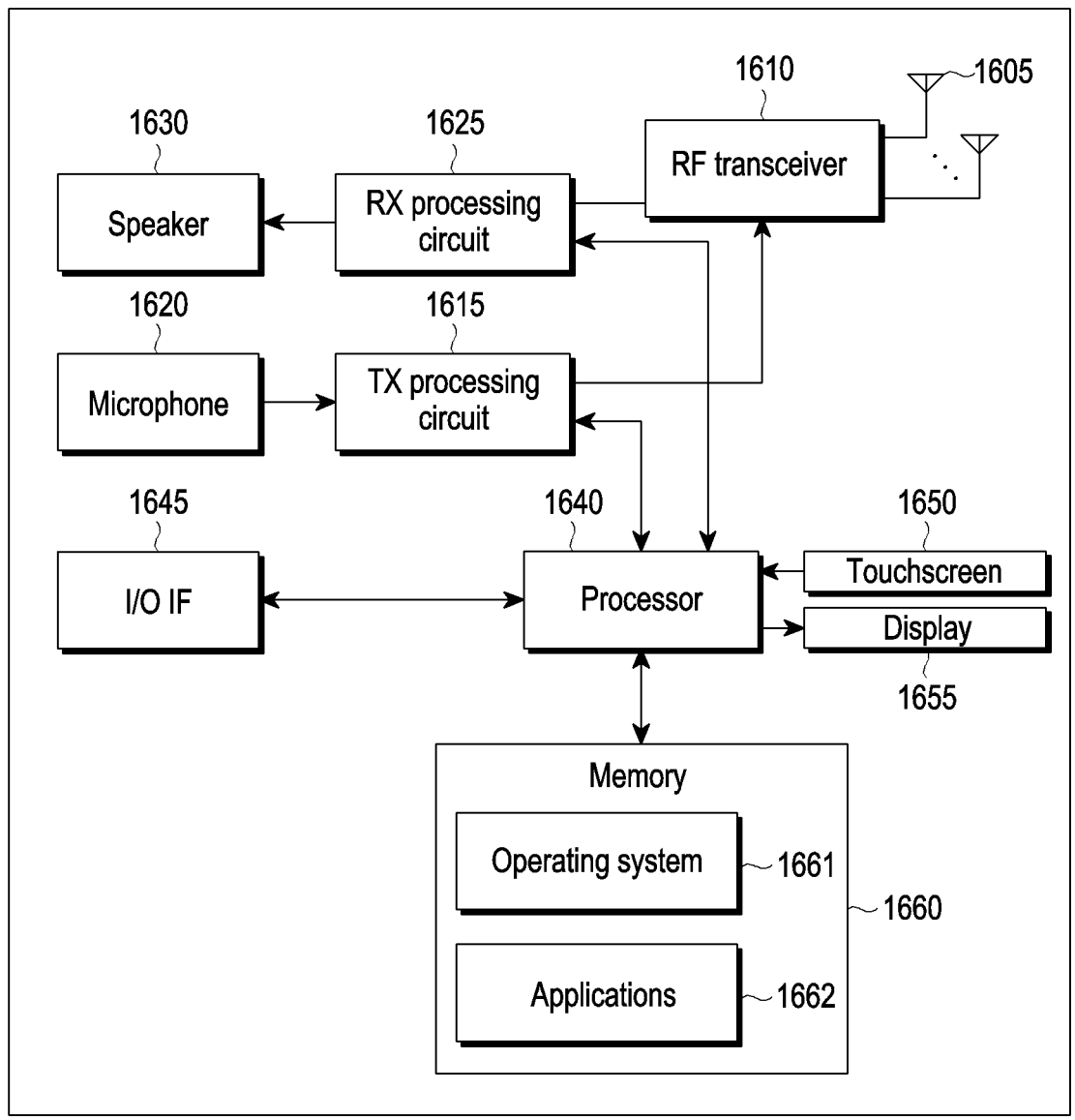
FIG. 16 is a view schematically illustrating a structure of an example UE according to an embodiment of the disclosure.

FIG. 16 is a view schematically illustrating a structure of an example UE according to an embodiment of the disclosure.

The embodiment of the UE illustrated in FIG. 16 is for illustrative purposes only, and the scope of the disclosure is not limited thereto.

Referring to FIG. 16, the UE may include an antenna 1605, a radio frequency (RF) transceiver 1610, a transmit (TX) processing circuit 1615, a microphone 1620, and a receive (RX) processing circuit 1625. The UE further includes a speaker 1630, a processor 1640, an input/output (I/O) interface (IF) 1645, a touch screen 1650, a display 1655, and a memory 1660. The memory 1660 includes an operating system (OS) 1661 and one or more applications 1662.

The RF transceiver 1610 receives an input RF signal transmitted from a base station in a network, via the antenna 1605. The RF transceiver 1610 down-converts the input RF signal, generating an intermediate frequency (IF) or baseband signal. The IF or baseband signal is transmitted to the RX processing circuit 1625, and the RX processing circuit 1625 filters, decodes, and/or digitizes the baseband or IF signal, generating a processed baseband signal. The RX processing circuit 1625 sends the processed baseband signal to the speaker 1630 (e.g., for speech data) or the processor 1640 (e.g., for web browsing data) for further processing.

The TX processing circuit 1615 receives analog or digital speech data from the microphone 1620 or other output baseband data (e.g., web data, emails, or interactive video game data) from the processor 1640. The TX processing circuit 1615 encodes, multiplexes, and/or digitizes the output baseband data, generating a processed baseband or IF signal. The RF transceiver 1610 receives the processed baseband or IF signal output from the TX processing circuit 1615 and up-converts the baseband or IF signal into an RF signal which is to be transmitted through the antenna 1605.

The processor 1640 may include one or more processors or other processing devices, and may execute the OS 1661 stored in the memory 1660 to control the overall operation of the UE. As an example, the processor 1640 may control reception of downlink channel signals and transmission of uplink channel signals by the RF transceiver 1610, the RF processing circuit 1625, and the TX processing circuit 1615 according to known principles. According to an embodiment, the processor 1640 includes at least one microprocessor or microcontroller.

According to an embodiment, the processor 1640 performs overall operations related to signal transmission/reception schemes for groupcast or multicast. In particular, the processor 1640 performs overall operations related to a method for configuring and operating a BWP for groupcast in the first embodiment of signal transmission/reception schemes for groupcast or multicast.

The processor 1640 performs overall operations related to a method for the base station or transmitter to transmit groupcast control information and groupcast data to a plurality of UEs in the second embodiment for signal transmission/reception schemes for groupcast or multicast.

Additionally, the processor 1640 performs overall operations related to a method for transmitting/receiving groupcast control information and groupcast data for a groupcast service when the UE is configured with a plurality of carriers, i.e., when carrier aggregation (CA) is used, in the third embodiment for signal transmission/reception schemes for groupcast or multicast.

Further, the processor 1640 performs overall operations related to a method for scrambling, mapping, and transmitting PDCCH and PDSCH upon providing an MBS service in the fourth embodiment for signal transmission/reception schemes for groupcast or multicast.

The processor 1640 may execute other processes and programs embedded in the memory 1660, such as processes for CSI feedback on the uplink channel. The processor 1640 may move data into or out of the memory 1660 as required by a running process. According to an embodiment, the processor 1640 is configured to execute the applications 1662 based on the OS program 1661 or in response to signals received from base stations or the operator. The processor 1640 is coupled to the I/O interface 1645, and the I/O interface 1645 provides the UE with connectability to other devices, e.g., laptop computers and handheld computers. The I/O interface 1645 is a communication path between these accessories and the processor 1640.

The processor 1640 is also connected to the touch screen 1650 and the display unit 1655. The operator of the UE may input data into the UE using the touch screen 1650. The display 1655 may be a liquid crystal display, a light emitting diode display, or other displays capable of rendering text and/or at least limited graphics, such as from websites.

The memory 1660 is connected to the processor 1640. A portion of the memory 1660 may include a random access memory (RAM), and the remainder of the memory 1660 may include a flash memory or a read-only memory (ROM).

Although FIG. 16 illustrates an example UE, various changes may be made thereto. For example, various components of FIG. 16 may be combined together, each component may be further divided, or some components may be omitted, or other components may be added as necessary. As an example, the processor 1640 may be divided into multiple processors, such as one or more central processing units (CPUs) and one or more graphics processing units (GPUs). Although the UE is configured like a mobile phone or a smart phone in FIG. 16, the UE may be configured to operate as a different type of mobile or stationary device.

Each of the UE and the base station for carrying out the embodiments may include a transmitter, a receiver, and a processor.

According to an embodiment, when a BWP for groupcast is configured and operated, and the base station or transmitter transmits groupcast control information and groupcast data to a plurality of UEs and configure the UEs with a plurality of carriers, i.e., carrier aggregation (CA) is used, the receiver, processor, and transmitter of each of the base station and the UE to transmit/receive groupcast control information and groupcast data for a groupcast service are supposed to operate according to the embodiments described above. The base station may be a terminal performing transmission in the sidelink or may be a general base station. The terminal may be a terminal that performs transmission or reception in the sidelink.

An internal structure of a UE according to an embodiment is described below with reference to FIG. 17.

Figure 17:
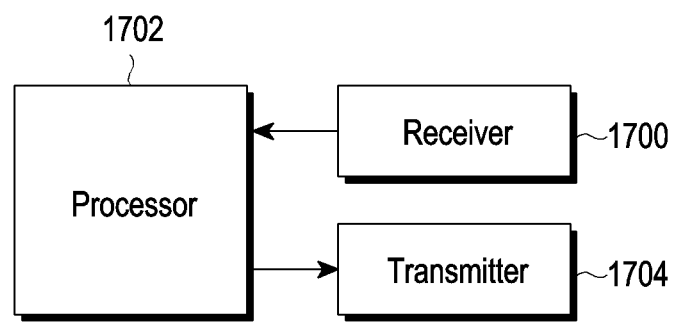
FIG. 17 is a block diagram schematically illustrating an internal structure of a UE according to an embodiment of the disclosure.

FIG. 17 is a block diagram schematically illustrating an internal structure of a UE according to an embodiment of the disclosure.

Referring to FIG. 17, the UE may include a receiver 1700, a transmitter 1704, and a processor 1702. The receiver 1700 and the transmitter 1704 may collectively be referred to as a transceiver according to an embodiment. The transceiver may transmit/receive signals to/from the base station. The signals may include control information and data. To that end, the transceiver may include an RF transmitter for frequency-up converting and amplifying transmitted signals and an RF receiver for low-noise amplifying and frequency-down converting received signals. The transceiver may receive signals via a radio channel, output the signals to the processor 1702, and transmit signals output from the processor 1702 via a radio channel. The processor 1702 may control a series of processes for the UE to operate according to the above-described embodiments.

An internal structure of a base station according to an embodiment is described below with reference to FIG. 18.

Figure 18:
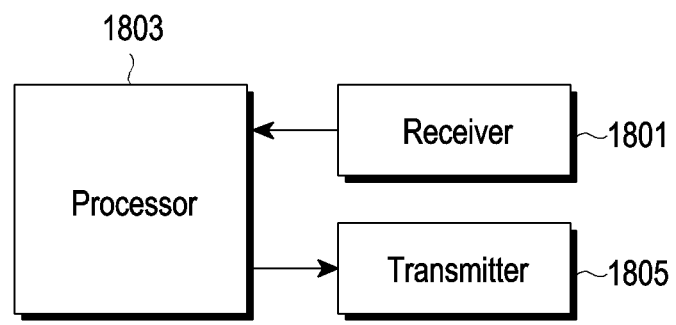
FIG. 18 is a block diagram schematically illustrating an internal structure of a base station according to an embodiment of the disclosure.

FIG. 18 is a block diagram schematically illustrating an internal structure of a base station according to an embodiment of the disclosure.

Referring to FIG. 18, the base station may include a receiver 1801, a transmitter 1805, and a processor 1803. The receiver 1801 and the transmitter 1805 may collectively be referred to as a transceiver according to an embodiment. The transceiver may transmit/receive signals to/from the UE. The signals may include control information and data. To that end, the transceiver may include an RF transmitter for frequency-up converting and amplifying transmitted signals and an RF receiver for low-noise amplifying and frequency-down converting received signals. The transceiver may receive signals via a radio channel, output the signals to the processor 1803, and transmit signals output from the processor 1803 via a radio channel. The processor 1803 may control a series of processes for the base station to be able to operate according to the above-described embodiments.

The embodiments herein are provided merely for better understanding of the disclosure, and the disclosure should not be limited thereto or thereby. In other words, it is apparent to one of ordinary skill in the art that various changes may be made thereto without departing from the scope of the disclosure. Further, the embodiments may be practiced in combination. For example, the first embodiment and the second embodiment may be combined and applied. The above-described embodiments may be changed or modified based on their technical spirit and applied to LTE systems or 5G systems.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a base station in a wireless communication system, the method comprising:
generating a signal including configuration information for at least one bandwidth part (BWP); and
transmitting the signal,
wherein at least part of the at least one BWP is configured as a resource for multicast transmission,
wherein the at least one BWP is a BWP for unicast transmission in case that the resource for multicast transmission is for a terminal that is in a radio resource control (RRC) connected state, and
wherein the at least one BWP is an initial BWP in case that the resource for multicast transmission is for a terminal that is in an RRC idle state or in an RRC inactive state.

2. The method of claim 1,
wherein the signal is a system information block 1 (SIB1) message, in case that the at least one BWP is the initial BWP.

3. The method of claim 1,
wherein the signal is a physical downlink control channel (PDCCH) signal in case that the at least one BWP is the BWP for unicast transmission.

4. A method performed by a terminal in a wireless communication system, the method comprising:
receiving a signal including configuration information for at least one bandwidth part (BWP);
identifying the at least one BWP based on the configuration information; and
receiving a multicast signal via at least part of the at least one BWP,
wherein at least part of the at least one BWP is configured as a resource for multicast transmission,
wherein the at least one BWP is a BWP for unicast transmission in case that the resource for multicast transmission is for a terminal that is in a radio resource control (RRC) connected state, and
wherein the at least one BWP is an initial BWP in case that the resource for multicast transmission is for a terminal that is in an RRC idle state or in an RRC inactive state.

5. The method of claim 4,
wherein the signal is a system information block 1 (SIB1) message in case that the at least one BWP is the initial BWP.

6. The method of claim 4,
wherein the signal is a physical downlink control channel (PDCCH) signal in case that the at least one BWP is the BWP for unicast transmission.

7. A base station in a wireless communication system, the base station comprising:
a transceiver; and
at least one processor,
wherein the at least one processor is configured to:
generate a signal including configuration information for at least one bandwidth part (BWP), and
transmit the signal via the transceiver,
wherein at least part of the at least one BWP is configured as a resource for multicast transmission,
wherein the at least one BWP is a BWP for unicast transmission in case that the resource for multicast transmission is for a terminal that is in a radio resource control (RRC) connected state, and
wherein the at least one BWP is an initial BWP in case that the resource for multicast transmission is for a terminal that is in an RRC idle state or in an RRC inactive state.

8. The base station of claim 7,
wherein the signal is a system information block 1 (SIB1) message, wherein in case that the at least one BWP is the initial BWP.

9. The base station of claim 7,
wherein the signal is a physical downlink control channel (PDCCH) signal in case that the at least one BWP is the BWP for unicast transmission.

10. A terminal in a wireless communication system, the terminal comprising:
a transceiver; and
at least one processor,
wherein the at least one processor is configured to:
receive, via the transceiver, a signal including configuration information for at least one bandwidth part (BWP),
identify the at least one BWP based on the configuration information, and
receive, via the transceiver, a multicast signal via at least part of the at least one BWP,
wherein at least part of the at least one BWP is configured as a resource for multicast transmission,
wherein the at least one BWP is a BWP for unicast transmission in case that the resource for multicast transmission is for a terminal that is in a radio resource control (RRC) connected state, and
wherein the at least one BWP is an initial BWP in case that the resource for multicast transmission is for a terminal that is in an RRC idle state or in an RRC inactive state.

11. The terminal of claim 10,
wherein the signal is a system information block 1 (SIB1) message, in case that the at least one BWP is the initial BWP.

12. The terminal of claim 10,
wherein the signal is a physical downlink control channel (PDCCH) signal in case that the at least one BWP is the BWP for unicast transmission.

* * * * *